United States Patent
Beigel

(10) Patent No.: US 11,442,134 B1
(45) Date of Patent: *Sep. 13, 2022

(54) SYSTEM FOR LOCATION IN ENVIRONMENT AND IDENTIFICATION TAG

(71) Applicant: Daedalus Technology Group, Inc., New York, NY (US)

(72) Inventor: Michael L. Beigel, Encinitas, CA (US)

(73) Assignee: Daedalus Technology Group, Inc., New York, NY (US)

( * ) Notice: Subject to any disclaimer, the term of this patent is extended or adjusted under 35 U.S.C. 154(b) by 0 days.

This patent is subject to a terminal disclaimer.

(21) Appl. No.: 15/345,282

(22) Filed: Nov. 7, 2016

Related U.S. Application Data

(63) Continuation of application No. 12/287,218, filed on Oct. 6, 2008, now Pat. No. 9,489,813, which is a
(Continued)

(51) Int. Cl.
   *G01S 5/02* (2010.01)
   *A01K 11/00* (2006.01)
   *G06F 16/29* (2019.01)

(52) U.S. Cl.
   CPC .............. *G01S 5/02* (2013.01); *A01K 11/006* (2013.01); *G06F 16/29* (2019.01)

(58) Field of Classification Search
   CPC ........... G06K 7/10099; G06K 7/10089; G06K 7/10386
   See application file for complete search history.

(56) References Cited

U.S. PATENT DOCUMENTS

| | | |
|---|---|---|
| 2,741,759 A | 4/1956 | Parker et al. |
| 3,474,460 A | 10/1969 | Huebscher |

(Continued)

OTHER PUBLICATIONS

Sirtrack Wildlife Tracking Solutions web page, Glue On, www.sirtrack.com, printed Sep. 17, 2007, 1 page, New Zealand.

*Primary Examiner* — Hai Phan
*Assistant Examiner* — Son M Tang
(74) *Attorney, Agent, or Firm* — Patent Law Works LLP

(57) ABSTRACT

A system for location of animals and/or objects in an environment includes a signal processing and signal generation system consisting of electromagnetic tags on animals (or other objects) in an environment (typically a three dimension outdoor natural environment) where the animals or objects are physically present at arbitrary locations, and an electro-magnetic signal generating, signal receiving, and signal processing system that can move through or in relation to the environment. The system can compute the location and identity of the animals or objects based on signals received from their associated tags, including the calculated location of the ID tags, which function as "Reader-Locators." The calculated location is enhanced by information about the environment provided by maps, satellite photos, GPS, GIS and/or other data specific to the probability of the location of the animals or objects within certain regions of the environment. The system includes a physical and electromagnetic modeling operation that is interactive with the environmental information derived from the actual environment, either historically or in "real-time" as the monitoring process occurs.

17 Claims, 35 Drawing Sheets

Related U.S. Application Data continuation-in-part of application No. 12/148,215, filed on Apr. 15, 2008, now abandoned, which is a continuation-in-part of application No. 11/904,035, filed on Sep. 24, 2007, now abandoned.

(60) Provisional application No. 60/994,937, filed on Sep. 21, 2007, provisional application No. 60/846,687, filed on Sep. 22, 2006.

(56) References Cited

U.S. PATENT DOCUMENTS

| | | | | |
|---|---|---|---|---|
| 3,512,154 | A | 5/1970 | Farrar | |
| 3,944,928 | A | 3/1976 | Augenblick et al. | |
| 4,025,791 | A | 5/1977 | Lennington et al. | |
| 4,040,054 | A | 8/1977 | Overman | |
| 5,387,915 | A | 2/1995 | Moussa et al. | |
| 5,525,992 | A | 6/1996 | Froschermeier | |
| 5,606,323 | A | 2/1997 | Heinrich et al. | |
| 5,798,693 | A | 8/1998 | Engellenner | |
| 5,839,816 | A | 11/1998 | Varga et al. | |
| 5,942,977 | A | 8/1999 | Palmer et al. | |
| 5,959,568 | A | 9/1999 | Woodley | |
| 6,170,748 | B1 | 1/2001 | Hash et al. | |
| 6,317,049 | B1* | 11/2001 | Toubia | G01S 5/10 340/539.1 |
| 6,456,239 | B1* | 9/2002 | Werb | G01S 5/02 235/385 |
| 6,462,647 | B1 | 10/2002 | Roz | |
| 6,499,656 | B1 | 12/2002 | Marsh et al. | |
| 6,804,578 | B1 | 10/2004 | Ghaffari | |
| 6,853,294 | B1 | 2/2005 | Ramamurthy et al. | |
| 6,870,461 | B2 | 3/2005 | Fischer et al. | |
| 6,900,762 | B2 | 5/2005 | Andrews et al. | |
| 7,034,683 | B2 | 4/2006 | Ghazarian | |
| 7,071,867 | B2* | 7/2006 | Wittenberg | G01S 13/726 342/157 |
| 7,082,344 | B2* | 7/2006 | Ghaffari | G05B 19/00 700/115 |
| 7,159,298 | B2 | 1/2007 | Lieberman | |
| 7,183,913 | B2 | 2/2007 | Hughes et al. | |
| 7,187,998 | B2* | 3/2007 | Okamoto | B25J 5/007 318/568.12 |
| 7,295,114 | B1* | 11/2007 | Drzaic | A62B 99/00 235/385 |
| 7,312,752 | B2* | 12/2007 | Smith | H04W 64/00 342/464 |
| 7,336,181 | B2 | 2/2008 | Nowak et al. | |
| 7,339,523 | B2* | 3/2008 | Bye | G01S 5/0252 342/451 |
| 7,348,875 | B2* | 3/2008 | Hughes | G06K 19/0717 340/10.1 |
| 7,408,456 | B2 | 8/2008 | Whitesmith et al. | |
| 7,446,646 | B2 | 11/2008 | Huomo | |
| 7,536,152 | B2 | 5/2009 | Inano et al. | |
| 7,589,616 | B2* | 9/2009 | Klatsmanyi | G08B 13/2462 340/10.1 |
| 7,602,338 | B2* | 10/2009 | Smith | G01S 5/021 342/451 |
| 7,646,330 | B2 | 1/2010 | Karr | |
| 7,667,575 | B2* | 2/2010 | Husak | G06K 17/0029 340/10.2 |
| 7,764,191 | B2* | 7/2010 | Hall | G05B 19/042 340/12.51 |
| 8,035,488 | B2 | 10/2011 | Shiotsu et al. | |
| 8,258,957 | B2 | 9/2012 | Mickle et al. | |
| 9,489,813 | B1* | 11/2016 | Beigel | G08B 13/2417 |
| 9,979,650 | B1* | 5/2018 | Sheth | H04L 45/748 |
| 2002/0118108 | A1* | 8/2002 | Carrender | H03H 7/38 340/572.1 |
| 2005/0134434 | A1 | 6/2005 | Nagai | |
| 2005/0246094 | A1* | 11/2005 | Moscatiello | G06K 7/0008 701/408 |
| 2006/0071790 | A1* | 4/2006 | Duron | G06K 17/00 340/572.1 |
| 2006/0122007 | A1* | 6/2006 | Savarese | G06K 19/07758 473/351 |
| 2007/0018820 | A1* | 1/2007 | Chand | G01C 21/206 340/572.1 |
| 2007/0173214 | A1* | 7/2007 | Mickle | H02J 50/70 455/127.1 |
| 2014/0028447 | A1* | 1/2014 | Howard | G06Q 10/087 340/10.6 |

* cited by examiner

Scope
spectrum
analyzer
GPS
compass
computer
COMMS

"LAYERS" OF TAG DETECTION, LOCATION, ID, DISPLAY SYSTEM

SYSTEM 500

Detection

Direction

Location

ID - may be independent of location, or computed at various stages of location

---

TRANSMISSION 510

Tortoise Model

Tag Model

Close environment model

---

SIGNAL PROCESSING 520

Terrain and foliage model

Reader antenna location and characteristics

Preliminary signal process

Location probability 2nd or 3rd process

Terrain map access based on LP process

---

530

Compare and compute most probably locations

Display

Communicate to remote station

Fig. 5

Fig. 16A
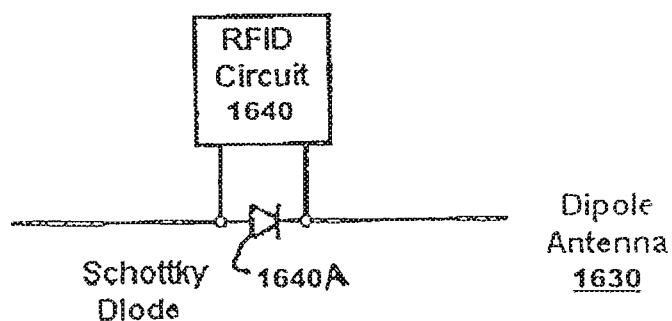
Fig. 16B
"ON" State:
Rectified signal
with harmonics.
Fig. 16C
"OFF" State:
Without harmonics.
Fig. 16D Capacitive Impedance Switch Inductive Impedance Switch Shorting Resistive Switch Resistor-Capacitor Combined Switch Resistive Switch

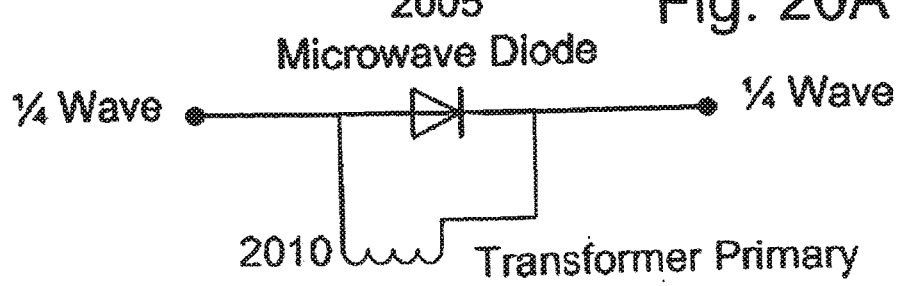

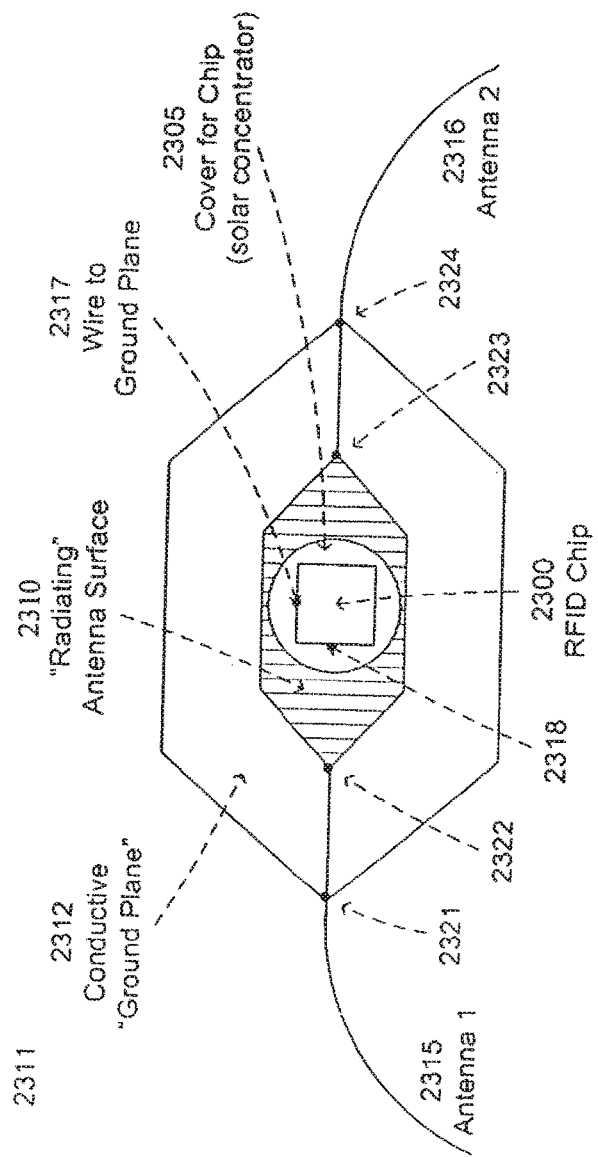
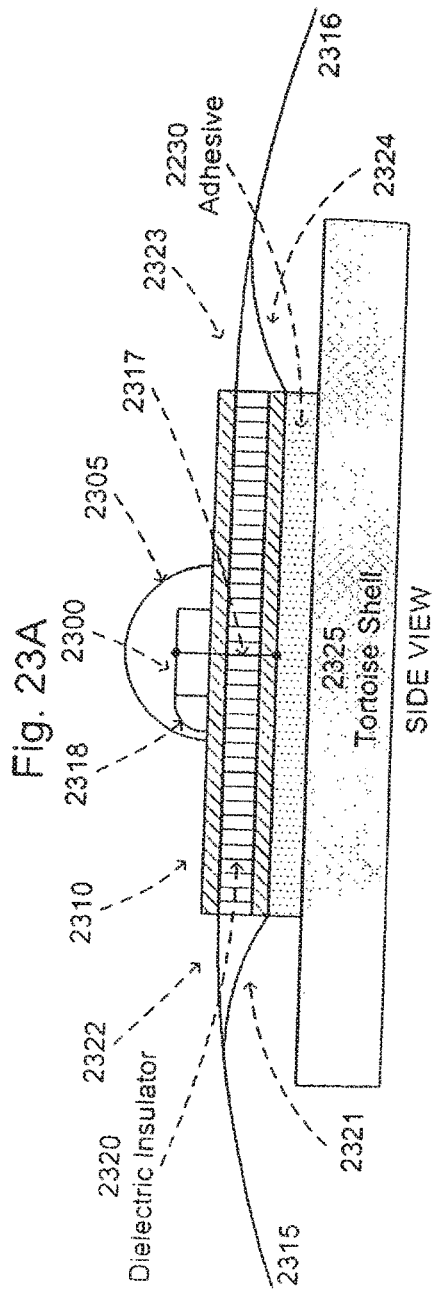
Fig. 23A
TOP VIEW: Scute shaped tag with patch antenna and dual "wire" antennas attached to patch antenna plane
Fig. 23B
SIDE VIEW

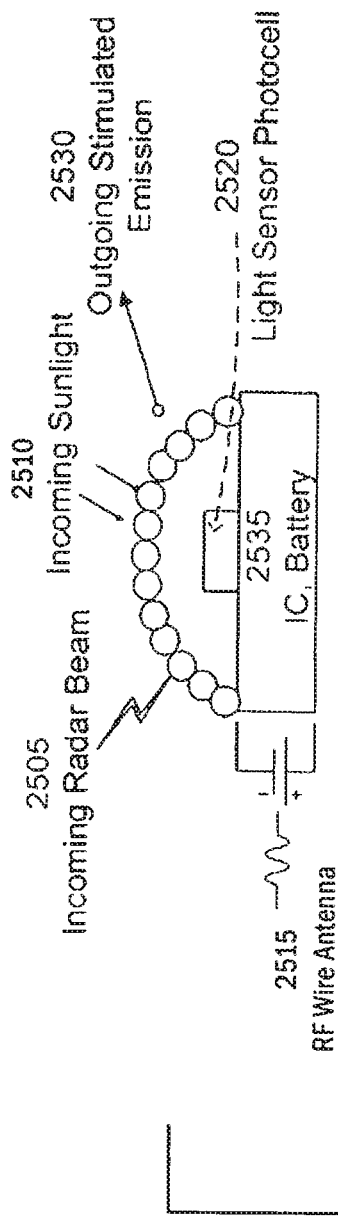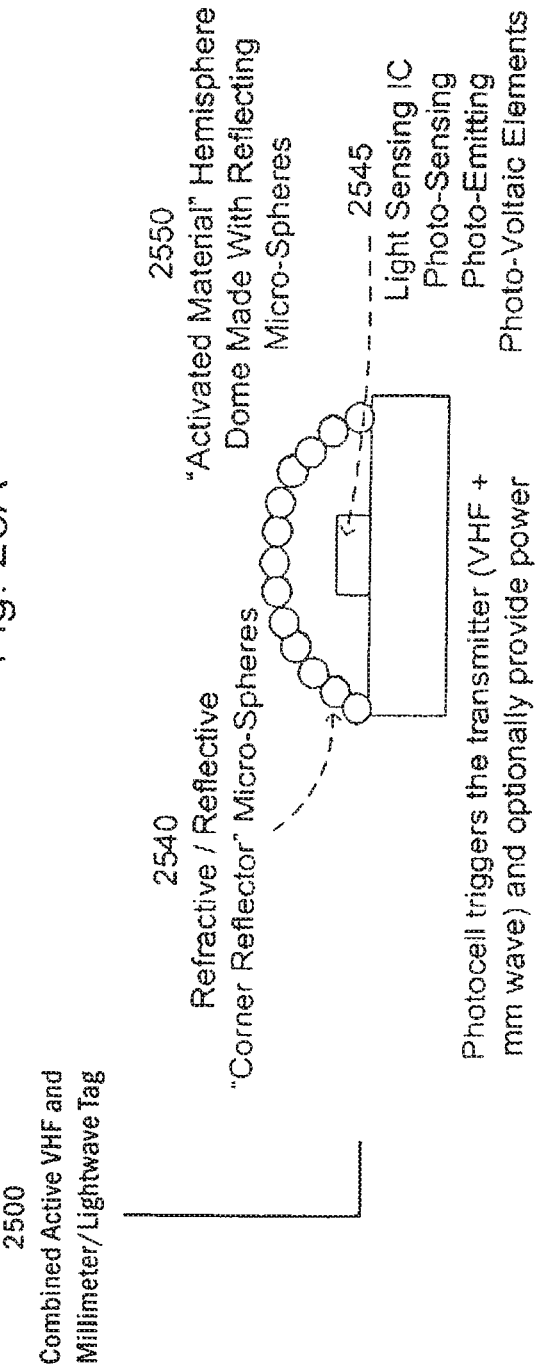
Fig. 25A
Fig. 25B

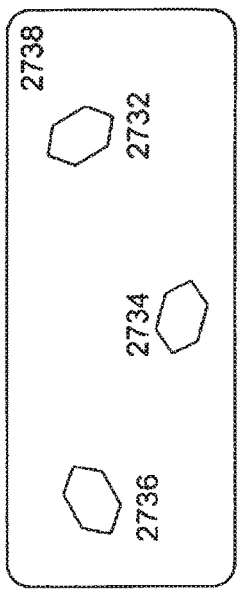
Fig. 27A — 2700
Fig. 27B — 2710, 2712
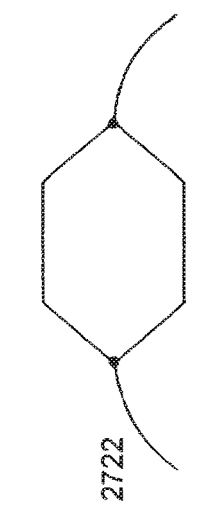
Fig. 27C — 2720, 2722
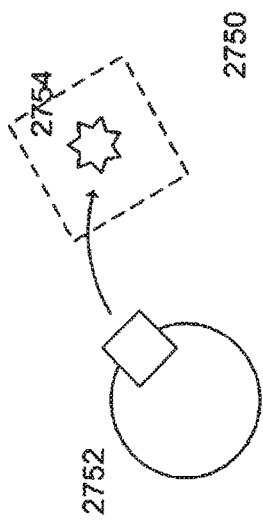
Synchronized Set of Patches
Fig. 27D — 2730, 2732, 2734, 2736, 2738
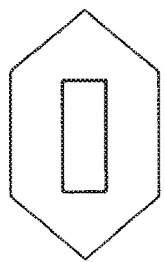
Fig. 27E — 2740
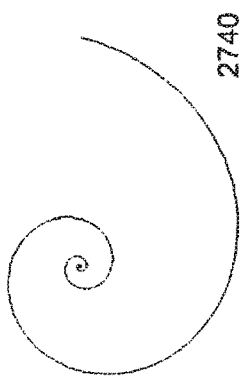
Ring Plus Harmonic Diode
Fig. 27F — 2750, 2752, 2754

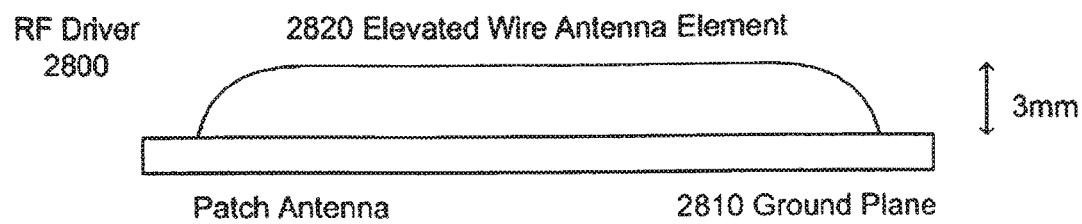
Fig. 28A
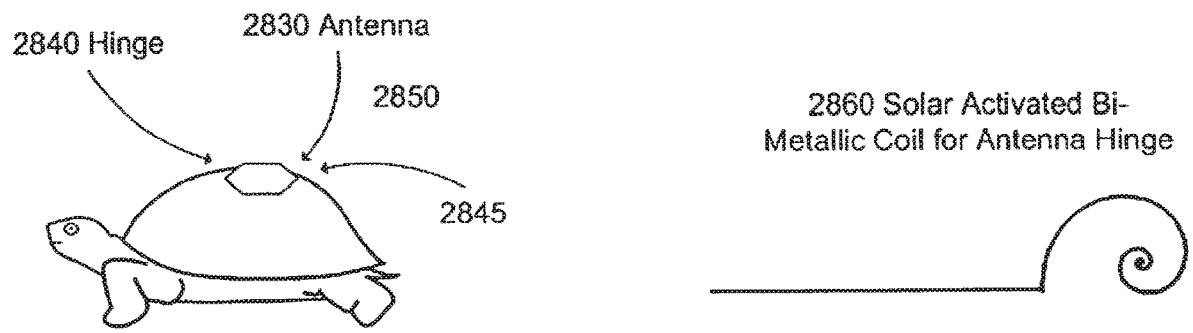
Fig. 28B
Fig. 28C
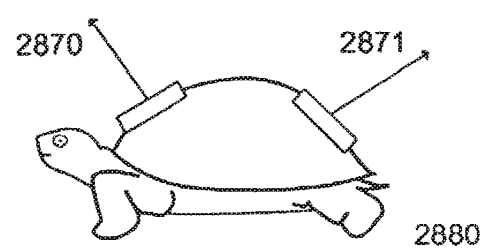
Use of Tortoise Body as Dielectric Material Between Two Self Synchronizing Toys
Fig. 28D Patch antenna
with pyramid emitting
electrode

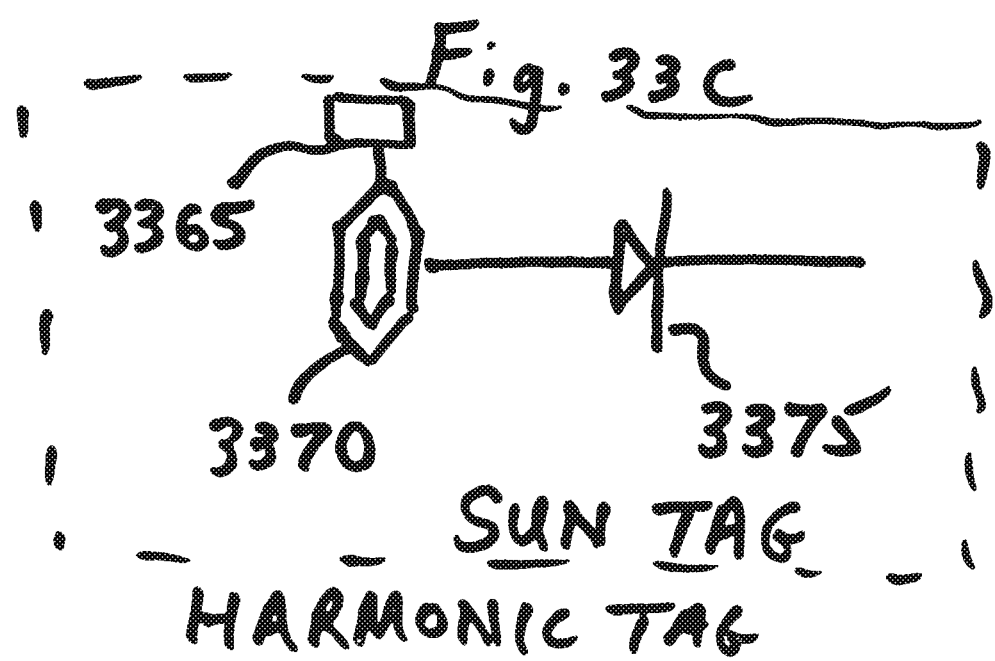

SYSTEM FOR LOCATION IN ENVIRONMENT AND IDENTIFICATION TAG

CROSS REFERENCE TO RELATED APPLICATION(S)

This application claims priority from U.S. patent application Ser. No. 12/148,215 filed Apr. 15, 2008, Ser. No. 11/904,035, filed Sep. 24, 2007, U.S. Provisional Patent Application Ser. No. 60/846,687 filed Sep. 22, 2006, and from U.S. Provisional Patent Application Ser. No. 60/994,937, filed Sep. 21, 2007, and which are all incorporated by reference herein, including all appendices thereto.

STATEMENT OF GOVERNMENT INTEREST

The development of this invention was supported at least in part by the Small Business Innovation Research Contract No. FA930206M0012. Accordingly, the United States Government may have certain rights in the present invention.

BACKGROUND OF THE INVENTION

Field of the Invention

The present invention relates to an electronic identification and tracking of mobile or arbitrarily located objects, particularly wild animals, within a three-dimensional environment. Its primary applications involve automated tracking from distances of "zero" up to 1 km or more using small, light-weight devices (tags) that require no direct power source or regular maintenance or servicing.

Background

This disclosure describes an improved system for tracking and uniquely identifying individual wild animals and other objects. Tracking wildlife has become an extremely important tool for studying and managing both endangered species and animals of economic and scientific importance including wildlife and pests. Traditional methods of tracking wildlife, using VHF transmitters, are problematic because they often require post-processing and triangulation to calculate location with wide margins of error, involving much wandering or meandering to locate a signal, and use transmitters that are often too large or heavy to be used with much efficiency on small or growing animals.

SUMMARY OF THE INVENTION

A goal of the present invention is to achieve a system that will provide identification and location information for objects or animals, such as desert tortoises, within a defined geographic area and over a definite time-period. A thorough consideration of the available and emerging technologies lead the present inventor to conclude that a combination of technologies is preferred as most appropriate to satisfy a three-stage or multi-stage process for tracking (or locating) objects such as tortoises.

Stage One involves acquiring location, and perhaps identity, data likely from an airborne platform (e.g., airplane, UAV, satellite, etc.) that will cover the entire study area relatively quickly and greatly reducing signal loss and degradation from ground and vegetation effects. This could possibly be done by using temporary mast-mounted antennas in fixed locations, to be moved sequentially through the study area during the survey process, or moving arrays of antennas with fixed or known spatial relationship to each other. GPS data maybe gathered regarding the location of the arrays, or individual antennas.

Using GPS-based data from Stage One, Stage Two would use a small or mid-sized vehicle, such as an SUV, van or all-terrain vehicle. Stage Three would use a lightweight backpack-mounted receiving system, with short-range antenna, borne by a person, robot or moving platform such as a Segway® transporter, to hone in more on the study objects or animals for more accurately to provide real-time location and possibly identification. If an aircraft is not available or allowed, a two stage system may be used (ground based mobile vehicle and backpack mounted apparatus).

Finally, Stage Three would allow for direct observation and retrieval of the study animals and guarantee positive identification. The tortoise location and ID project which provided background application for the invention precluded the use of fixed structures like towers, since these provide nesting and observation platforms for their worst predators; ravens. For this reason the "mobile" approach was mandated.

The present inventor considered use of a simple combination of two or even three different technologies such as a harmonic radar tag and passive RFID to provide locating functionality at medium to long range, and individual identification at close range. The present inventor determined the practicality of combining functionality into a single package or a single device, such as a passive or active RFID tag that also functions as a harmonic radar target, and other combinations of relevant technologies and associated apparatus.

As noted above, an objective of the preferred embodiment is to achieve this extremely high performance through a systems approach, in which each component of the system is an integral part of the process and the efficiency and accuracy of the readings and the design process is conducted accordingly. Such a system consists of several components or subsystems: 1.) tag(s) (transmitting device(s) located on a tortoise or other wildlife or object); 2.) reader (receiver to "activate" tag and receive data or to simply receive data); 3.) data interface; 4.) computer system; 5.) "dynamic database" consisting of data storage, complex computation, presentation, and real-time interpretation capabilities; and 6.) real-time bi-directional data transmission network between all "reader" devices or stations and the main database, and utilizing non-interfering data gathering signal frequencies or protocols between tag and readers. The design features of each component of an "ideal" system are constrained by a series of (1) tortoise; (2) (object or asset), reader (or data-gathering station); and (3) study-imposed constraints, as discussed above. Depending on the embodiment, frequency, bandwidth, and other signal generating, coding, and propagation factors are made to yield the optimum combination of transmission range location accuracy, power-efficiency, etc. within constraints for lawful and practical operation.

BRIEF DESCRIPTION OF THE DRAWINGS

FIG. 5 describes a process by which information on the tag's identity, direction, distance and location are received and processed by the described ID and locator system.

FIGS. 16A to 16D provide a diagram of function of a combined harmonic radar and RFID tag and idealized traces of emitted signals in the On and Off states. Specifically, FIGS. 16A and 16B show a combination of several RF modules to create a multifunctional tag with RFID and Harmonic Radar capabilities, and FIGS. 16C and 16D show a carrier signal is seen in the data stream as a series of on and off periods dependent on the presence of harmonics.

FIG. 20A is a diagram of harmonic RFID radar tags with inductive coupling.

FIG. 20B shows an internal system embodiment of an example tag circuit;

FIG. 23A is a diagram of a "patch antenna" transmitter tag in one embodiment.

FIG. 23B is a diagram of a "patch antenna" transmitter tag, in one embodiment, showing how it would be attached to the shell of a tortoise.

FIGS. 25A-25B are diagrams of another embodiment of the solar power components of the patch transmitter tag, in which light is focused onto a photo-sensitive portion of an IC tag, including photo-active material in the focusing apparatus.

FIGS. 27A to 27F, except for 27D, are diagrams of various antennas arrangements arranged or attached to a patch transmitter tag.

FIG. 27F is a ring-shaped harmonic-generating antenna.

FIG. 27D is a diagram of a synchronized set of patch tags arranged to maximize signal transmission efficiency.

FIG. 28A is a diagram of an elevated wire antenna element on a patch transmitter tag.

FIG. 28B is a diagram of a patch transmitter tag with a hinged antenna.

FIG. 28C is a diagram of a solar-activated bi-metallic coil for the hinged antennas depicted in FIG. 28B.

FIG. 28D illustrates how a tortoise's domed body can be used as dielectric material between two synchronized tags.

FIGS. 33A to 33C show an embodiment of a solar activated transmitter tags.

DESCRIPTION OF THE PREFERRED EMBODIMENT(S)

Figure 1:
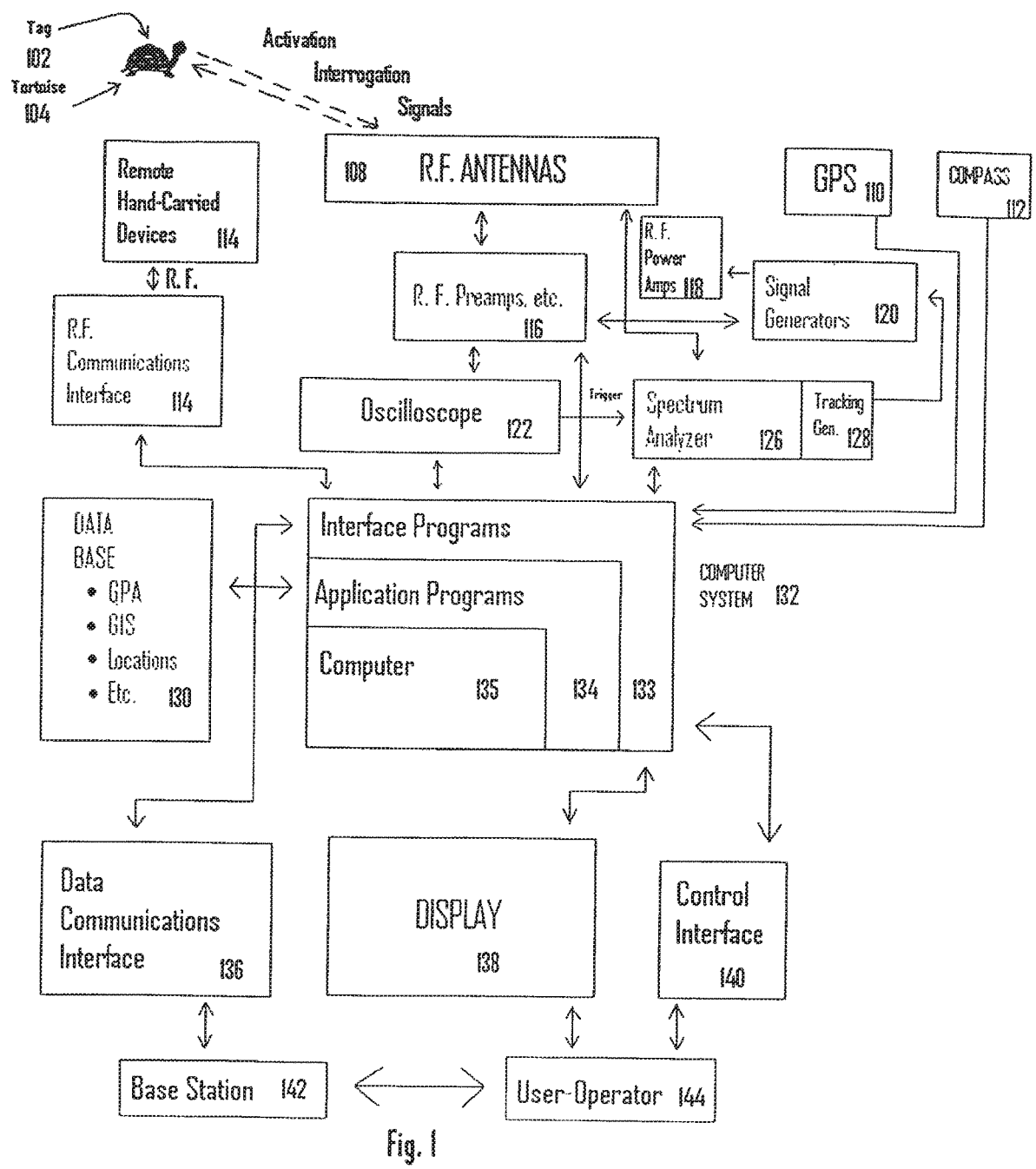
FIG. 1 is a representative flow chart of how the entire described system functions to detect, identify, and locate the tracking tags in three-dimensional space, and represent the data in a dynamic database.

In light of the difficulties with using any one particular technology to satisfy all of the needs of this system, a multi-staged process is preferred. For example, a wide beamed interrogation signal would be emitted into the area to stimulate a passive or semi-active tag to transmit its signal with sufficient energy to be detected up to 1 km away. In addition and alternatively, a self programmed beacon signal would be emitted by the system that would then be switched to Stage-two, which would more narrowly beam a more directed signal to the desired tag, thus stimulating location and identity information from a separate, RFID-based passive tag, which can be received at 30-100 m or more. For wildlife applications, we also recommend for life-long identity assurance, a traditional low frequency ultra miniature (8 mm×2 mm) (e.g., 134.2 MHz) RFID tag be implanted into all animals for identification at distances of several cm up to approximately 1 m.

Tracking Tags

The tracking tag is a unique design that combines one or more battery powered beacon signal generators in addition to other ID/location signal generators. The signal generator would be operated by a combination of scheduled transmissions initiated by either an internal clock-calendar integrated circuit (IC) and/or an externally generated wakeup signal generated by readers. The system would include semi-active UHF or VHF tag generating either in backscatter, harmonic reflective, or active transmission made in response to an RF interrogation signal emitted by a reader unit at mid-range, likely 1 to 50 m. Power for various tag operations is obtained from a primary battery, secondary battery, or super capacitor energized by energy-harvesting elements on the tag (such as photovoltaic cell, motion sensing microelectronic generator, or RF absorbing and rectifying apparatus), for obtaining power from an ambient RF signal from a nearby interrogation unit. The medium-range function may also be a SAW element, which is most efficient, and not an "active" electronic circuit; (HR) harmonic radar reflector element; standard UHF-RFID IC; combination SAW-HR-RFID element; or, in certain situations, the beacon transmitter could be activated by sufficiently powerful external energy supply (sunlight or nearby RF source and wake-up signal).

In the preferred mode of operation, the tag will spend most of its time (as does the tortoise to which it is attached) in a sleep mode. To save power and increase the life of the unit, a clock-calendar (which runs for the operational life of the tag, supplied by the primary battery plus any other energy that can be harvested and diverted to it) has a sleep-wake schedule programmed into it at the time of deployment. During periods of time pre-arranged for the location/ID surveys by the survey scheduling teams (or computer algorithm), the tag status shifts to a receptive condition. This means that the tag can be activated to transmit a beacon signal, presumably at a time when population surveys are planned to be conducted by the project team.

If the tag is exposed to sunlight, or energy is generated by tortoise movement, then the internal solar cells will charge either a secondary battery or a super capacitor to provide enough energy for a strong beacon signal. The presence of sunlight also means that the tortoise is above ground and signal transmission is likely to be at an optimum condition for reception by a distant receiver-reader. If there is no sunlight (or energy harvest of other type) during the receptive time period, then the tag can emit a lower-level beacon signal at a specific time period, which will provide a worst-case opportunity for surveyors to detect a signal and take other measures to locate the tag (likely by performing a more detailed sweep over the general area in which the signal is detected). The beacon pulse from the tag may be a short burst of RF signal from an RF oscillator tuned to a specific frequency, or it may simply be an impulse into a highly resonant antenna that will generate an exponentially decaying burst at the selected frequency.

Beacon pulses can be combined in timed pairs to provide ID information in addition to a location burst. The first pulse of each sequence is provided according to a relatively long (e.g., 1 to 10 seconds) time interval. The second pulse is provided at an "identifying" time interval with respect to the first pulse.

A sequence of these pulse-pairs is repeated over a period of time (for example 1-5 minutes) in which many repetitions of the pulse codes are made. The tag is decoded by the reader based on the proportionality of the time between the two pulses. Since many tags may be present and active at a given time period, the pulse codes are to be designed so that tag ID indeterminacy is eliminated. Given the relatively small number of ID codes, the short time-length of the signal pulses and the relatively long time gap between pulses, such a "collision-proof" code system will be feasible.

An active tag includes a battery and sends a burst signal on receipt of a stimulating signal or at a pre-programmed time interval. It would be possible to recharge the battery at close range with the tortoise held in the charging field using energy harvesting. Tags functioning in the 900 MHz and 2.4 GHz bandwidths may be able to take advantage of existing active and passive radar technologies, including ground-penetrating radar, however, a strong burst signal could be possibly too strong to be safe for the tortoise, but not for other non-endangered animal or inanimate objects. Energy harvesting sources for recharging active tags could include the sun or a microelectronic mechanical system that recovers energy from the tortoises' movements (much like a self-winding wristwatch, except generating electrical charge for storage or immediate operation).

The tag also includes a passive or semi-passive element for location at intermediate range (1-30 meters) to save energy from the battery when more frequent integrations and responses are needed to located the tag precisely from an intermediate range. This may be a SAW (surface acoustic wave), harmonic radar, energy-accumulating discharge "flashbulb", standard passive UHF RFID, or combination. This allows the tag position to be located exactly once the long-distance locating system has determined its most probable area of location and a person (or robot, etc) with a "hand-carried" medium/short range locator/ID reader has moved close to the location that was predicted. No energy from the tag's primary battery is required for this medium-to-close-range location technique. One possible embodiment is inductive coupling of the code generator to the antenna using a coupled inductor to another inductor that also functions to tune the resonance of the harmonic reflector circuit, and frequency conversion may be as needed, such as 114 or 164 MHz.

A recent technological advance is the ultra miniaturization of 164 MHz radio transmitters used since the 1960s for tracking larger wildlife including adult desert tortoises. One recent study effectively affixed 0.600 mg battery-powered radio transmitters to dragonflies (and studies have been done with sparrows). Although the operational life of the tags were only 2-3 weeks, their effective tracking by land vehicle and airplane suggests that this traditional radio transmitter technology can possibly be used after further modifications, according to the present invention.

Energy harvesting, micropower clocks, improved antenna design, plus a number of recently evolved enhancements to the reader/locator system including a spatial probabilistic data filter and processing system, can all potentially result in successful use of this technology according to the length of lifetime and effective range requirements. One significant advantage would be that biologists might be able to use existing telemetry equipment, thus saving financial resources in projects that might not require the high accuracy and long life of the present requirement, or could be used in conjunction with or in addition to the reading/locating equipment of the present invention in cases in which the location of the animal or object has been determined recently, and not much variation in location is expected.

The tag for tracking tortoises would be designed to fit on a single scute of a juvenile desert tortoise. The tag base can function as a patch antenna. In addition, one or two wire antennas could additionally be attached to the tortoise shell on a number of scutes, but permitting growth of the tortoise by a flexible wire that can be pulled through separate guide-tubes on each scute as the tortoise grows. Tags can be custom designed to any particularly animal species or other asset that needs to be tracked, in terms of size, distance of location, tag longevity, power supply, mounting on animal or object, etc., within the scope and limitations of the invention described within.

A signal received by the tag from an activating reader antenna, which can be at a resonant frequency of the tag's antenna (likely 165 MHz, 916 MHz, 2.4 GHz, or microwave), including other bands in which licensed operation is not required, would activate a passive diode-detector "switch-on circuit" or "wake-up" (which requires no operating power from the battery-powered circuit).

The tag thus activated would emit an additional, closely spaced series of RF bursts. The reader will be within a relatively close range (1-100 meters). When the tag is located, found and accessed it can be re-programmed and possibly re-charged using a reasonably strong RF field or light source over a period of several minutes. Even if no solar power is available, the tag can be instructed to use power from its primary battery to perform re-programming of tag data to alter the initially pre-determined "beacon" signal schedule.

The schedule override may be activated optimally from an aircraft based platform, sending a strong microwave signal towards the ground and moving across a "grid" pattern to cover all area to be studied or activated for un-scheduled surveys. This method can also be utilized for the scheduled surveys when the tag is in the receptive mode already, to more precisely trigger the timing of tag transmission of beacon bursts and thus economize more energy. In the absence of an aircraft-based wake-up operation, the operation might have to be performed by vehicle or hand-carried apparatus at much closer range than permitted by the specified 2 km road spacing indicated in the tortoise tracking system of the invention. Other systems might have different specifications.

Receiving Reader-Locator and Antenna System

Tag readers-locators and the structure of the data encoding the ID invention are integral parts of the same system. The reader must be able to send an optimal interrogation signal of the appropriate frequency and amplitude to stimulate the tag device (except for scheduled tag-beacon signals). In passive RFID and Harmonic Radar systems, the interrogation signal must also include sufficient power to energize the tag to operate effectively and send its encoded or beacon identification. The reader must then be able to detect the returned signal or beacon and decode and analyze it to determine the tag's identity (for RFID) and/or its location.

The reader consists of: 1) electronics package for energy transmission and and/or data to the tag, 2.) Antenna or antennas: at least one for sending power and/or interrogation signals, and at least one (or more) for receiving tag signals. The same antenna might in some cases be used for both sending and receiving. 3.) Receiver and analog signal processing for acquiring tag signal and a digital processor for digital signal computations, and 4.) two-way independent of tag communication, RF communication of reader data to main system or other communication network nodes.

One subsystem of the tortoise reader system is a receiver-only system, if the tag (or one of multiple tag devices) is self-activated or otherwise independent of a reader signal (cf., active RFID technology or telemetry beacon signaling). The reader antenna system, consisting of two or more antennas mounted on poles at a distance of at least 3 meters between antennas, will likely be vehicle-mounted for widest range. This portable version would probably use a single directional antenna. The antenna would likely emit a RADAR interrogation signal and possibly an RFID type signal, if needed for close-up identification. In addition, the hand carried unit may contain one or more temporary antenna stations affixed to short poles or a tripod and would be in communication with the on-foot researcher and the mobile laboratory. These combined antenna locations can provide for triangulation of the signal source to further improve range and accuracy.

For example, the on-foot researcher would have a mobile locating device and optionally an auxiliary fixed point antenna. The antenna might be placed in a fixed position where a possible clear signal is first received. It would either have its own GPS/compass or its location/orientation would be entered by the on-foot researcher. The on-foot researcher then proceeds in search. The signals received by the fixed antenna would be transmitted to the locator computer either in the main lab vehicle or locally to the researcher location device. This enables powerful triangulation and time-of-arrival data from two/or more local receivers as opposed to just one. Alternatively, a single antenna carried by the researcher may be used as the search device.

The on-foot researcher also employs appropriate transport vehicles for use in difficult terrain, for example the Dean Kamen patented, U.S. Pat. No. 7,131,706 and other two-wheeled self balancing transport device. Also numerous new miniature aerial remote-controlled vehicles could be deployed to operate at low altitude by researchers.

It should be noted that a probabilistic spatial filter may be used in widely varying location acquisition contexts. For example, if the survey period is relatively frequent compared to the speed of the tortoise (or object or asset being tracked) then a factor of the location probability would be the maximum distance that the tortoise (asset or object) could have traveled in any given direction, from the time of its last confirmed location, based on its "top speed" and the time elapsed between surveys. This calculation can be further refined by referencing the terrain map and compensating for topographical factors that preclude travel in a given direction to set a limit on a "top speed" of movement in that direction.

In cases where the asset is fast-moving (hundreds or thousands mile per hour) and surveys are the high frequency (second, milliseconds, microseconds, etc) this same technique still provides computational advantage over other location-projection mechanism.

In addition to location, the same method might just as well provide probability of direction and speed traveled, or other information about aspects of location and trajectory that can be related to "known maps" and characteristics of the animal, asset or object. Finally, it should be noted that even without a location or a data tag on the animal, asset or object, the PSF (Probabilistic Spatial Filter) method is still applicable, as long as its (animal or asset) possible location can be estimated by any signal acquisition method (radar, etc) and any data regarding the probability function of an object in the 3D space exists, and any prior location information (exact or approximate) regarding the object exist. This extends the utility of the PSF to virtually any location system that can derive a signal from the animal or assets with or without a prior knowledge of identity.

Operationally, the system would work as follows. One or more trackers would be looking for the beacon signal from the air or a ground-based lab-vehicle, using a sensor network and real-time computer-based map. When a signal is received, the tracker's location and/or telemetry is relayed to the database along with the exact time of detection and information (if any) of the direction and distance to the tag. The dual antennas on the lab-van would allow for signal detection and direction finding by at least one or more of: time-of-arrival, phase, and signal strength or other detection signals. The database stores the information and compares it to a map or other coordinate location reference. The database computes the direction and distance to the object based on historical data, reported observations, and computer model of tortoise habitat. The database then sends probable location data to the trackers who use it to refine their search. The process continues until the actual location is determined.

Signal Processing Database and Probabilistic Spatial Filter (PSF)

The dynamic database, programmed within the receiver system, would serve two sets of functions using essentially the same dataset. It can be pre-loaded with all available GIS-based and other spatial data about the terrain, from various resources and also updated with real-time information during the search (photographs, video, etc.). The first function is a probabilistic spatial filter to be used in conjunction with real-time data from the antenna system in connection with preliminary location calculations. These data would pre-define the probability function of a valid signal from a tortoise within the terrain. The probability function would be based on a prior knowledge of the terrain features, previous data, if any, on tortoise or burrow locations, and a probability function of tortoise location based on terrain features and tortoise knowledge. For example, a probability of 0.0 would be assigned for inside a large boulder; 1.0 for flat ground in the open near a burrow, 1.0 for foliage patches known to be attractive to the tortoises. Probability values between 0 and 1 may be used based on finer gradations of knowledge of the geographical and other features in the area, and the baits of the animals or usual movement trajectories of objects in and through the area or volume. For example, variable likelihood will depend on known tortoise presence at each location based on historical data from the local tortoise population. When a beacon signal is received by the system, the database probability function would be combined with the reader antenna probability function according to one or more computational algorithms to reduce artifacts like reflections, noise, and degradations, and give a more concentrated cloud of estimated locations, thus greatly increasing the probability that the tortoise is within the area defined based on received signal and probability map.

The system operator would have the option to use either the original signal cloud, the probability corrected cloud or an overlay of both, over laid on a map-like or photographic representation of the area in which the search is being conducted. The PSF will be based on fully updated 3-D real-time database that 1) computes probable location and 2) displays tortoise locations. Therefore the second function of the database is the more obvious one of displaying the geographic terrain data along with all recorded measurements of tortoise-related information accrued through this study, prior studies, or related studies that can be used in this context. This real-time graphical database information can additionally be utilized online by anyone who needs access to its information. Our initial system design utilizes (besides the real-time communications network of operational systems) USGS Digital Elevation Models (DEM's) as a preliminary basis for our geographic database with real-time GPS inputs. The real time GPS/compass inputs will establish the exact location and orientation of each reader unit and help compute the predicted tortoise location. The actual database will eventually consist of GIS-based data layers, such as soils and land cover types acquired from various public and commercial sources. The computation of initial probability cloud by antenna signal analysis and further refinement by the probability map are considered essential functions of the locating system's signal processing routine.

With this refined real-time probability of location information (likely obtained from the vehicle mounted system with the longest possible range), a more specific search (likely by a hand carried reader antenna) will be made, to successively approximate the location of the tag until it is found and verified. The need for hand-carried or even smaller sized mobile tracking units is based on the assumption that the primary land vehicle might not have the capacity to explore dense shrubbery or other habitats inaccessible to the large vehicle. The exact location would then be entered automatically into the historical database, which further modifies the pre-defined model. The hand-carried unit also interacts in real-time by cellular or independent telemetry with the mobile unit; both are updated immediately by information detected at the hand-carried unit. Instead of guiding the hand-carried unit by antenna positioning and beep loudness, a real time map-like visual display of the reader, the terrain and the likely tortoise location will be used in addition to the antenna orientation of the medium range reader.

This real-time database is an integral part of the tracking system because it provides increasingly accurate information about exact locations and possible movements of tortoises for display and archival purposes, as well as providing the real-time probability function for computation of estimated location during a survey or search. For initial surveys, the PSF system will help the on-foot researcher locate the animals accurately with minimum effort. As the system gains historical data (and improves on estimation algorithms), it is possible that it will provide a single step process (mobile tracking only) and eliminate the need for on-foot tracking in the majority of surveys where only the animal's location is needed.

In FIG. 1 the full scope of the location and identification system can be realized from the combination of the various individual parts that make it. A tortoise 104 has an affixed tag 102, which (in some embodiments) is activated by interrogation signals sent by RF antennas 108. The same antenna 108 receives long range burst signals from tag 102 and the signal, likely amplified by RF preamps 116 recorded with equipment such as an oscilloscope 122 or spectrum analyzer 126. These may later be replaced by receiving and analysis systems that do not have displays. The outputs of these preamp/signal analysis instruments are sent (digitized) to the computer system 132 in the primary location system. A GPS 110 and compass 112 determine the position of the primary location system, assuming it is a mobile system. The computer system 132 computes a probable location of the activated tag which is combined with GPS 110 and compass 112 data as well as historical data 130 in order to calculate a refined area of probable location. This process is accomplished by SOFTWARE resident in the computer 135. The software consists, at least, of INTERFACE Programs to link the external devices to the computer and digital information processing programs (application programs 134). These application programs provide at least the following functions: computation of the location of the LOCATING SYSTEM at which the signals from the tag are being received; computation of the DETECTION of a signal from at least one tag; computation of a probability function indicating the DIRECTION from which the signal is apparently located and computation of the probable function DISTANCE at which the tag signal is located. This determines the first approximation of the LOCATION of the tag. This approximation is refined by a SPATIAL PROBABILISTIC FILTER program, to be explained later. The resulting information of the location system and the PROBABLE LOCATION of the tag are then displayed on a MAP of the relevant area in terms of terrain, geographical position, geological and other features supplied from the DATA BASE 130. The DISPLAY 138 conveys this visual information within the primary location system, and also transmits a reproduction of the display information to one or more remote stations (later diagram). All these functions are accessible through the CONTROL INTERFACE 140, likely resident in the primary location system and accessible by the user-operator 144. Information may also be sent to a remote BASE STATION 142 for permanent and nonvolatile storage. The information from the main display 138 and other relevant information are sent, through a separate COMMUNICATION CHANNEL or RF COMMUNICATION INTERFACE 114 to one or more REMOTE LOCATING DEVICES 106. One possible embodiment of remote devices 106 can be used to verify the location of tag 102. Note that the remote device also has antennas and can be used with different RF technologies for closer range location of the tag, and could have its own GPS and COMPASS to determine its position within the larger map of the primary location device, and generate a closer-range map (possibly in communication and cooperation with the primary location device), and so the close range system and its operator are also guided by visual display maps and possibly other indicators to help determine the close-range location of the tag. All close-range data is communicated to the primary location system and the location map is continuously refined until the tag is exactly located. All data is recorded into database 130 and may be uploaded to a base station 142 for further analysis. In the case that the tag 102 is activated by an ACTIVATION SIGNAL sent from the primary location system, that activation signal may be generated by the COMPUTER which controls and activates a signal generator 120 that feeds RF power amplifier 118, which transmits the radio signal using the same or different RF ANTENNAS that are used to pick up the Beacon and/or ID signal from the tag. Note that the ID of the tag may be implicit in the beacon signal and thus established upon detection of the tag in the range of the primary location system, or the ID of the tag may only be established at close or zero range by the secondary (on foot) location system(s). Note also that the Remote (hand carried) device 108 may also send out activation signals to the tag. Either the primary location system or the remote location system may also send out sufficient RF POWER to supply operating power to the tag. All signals of this type (activation and/or interrogation signals from either remote or close range transmit/receive antennas to/from the tag) are denoted by 146.

Figure 2:
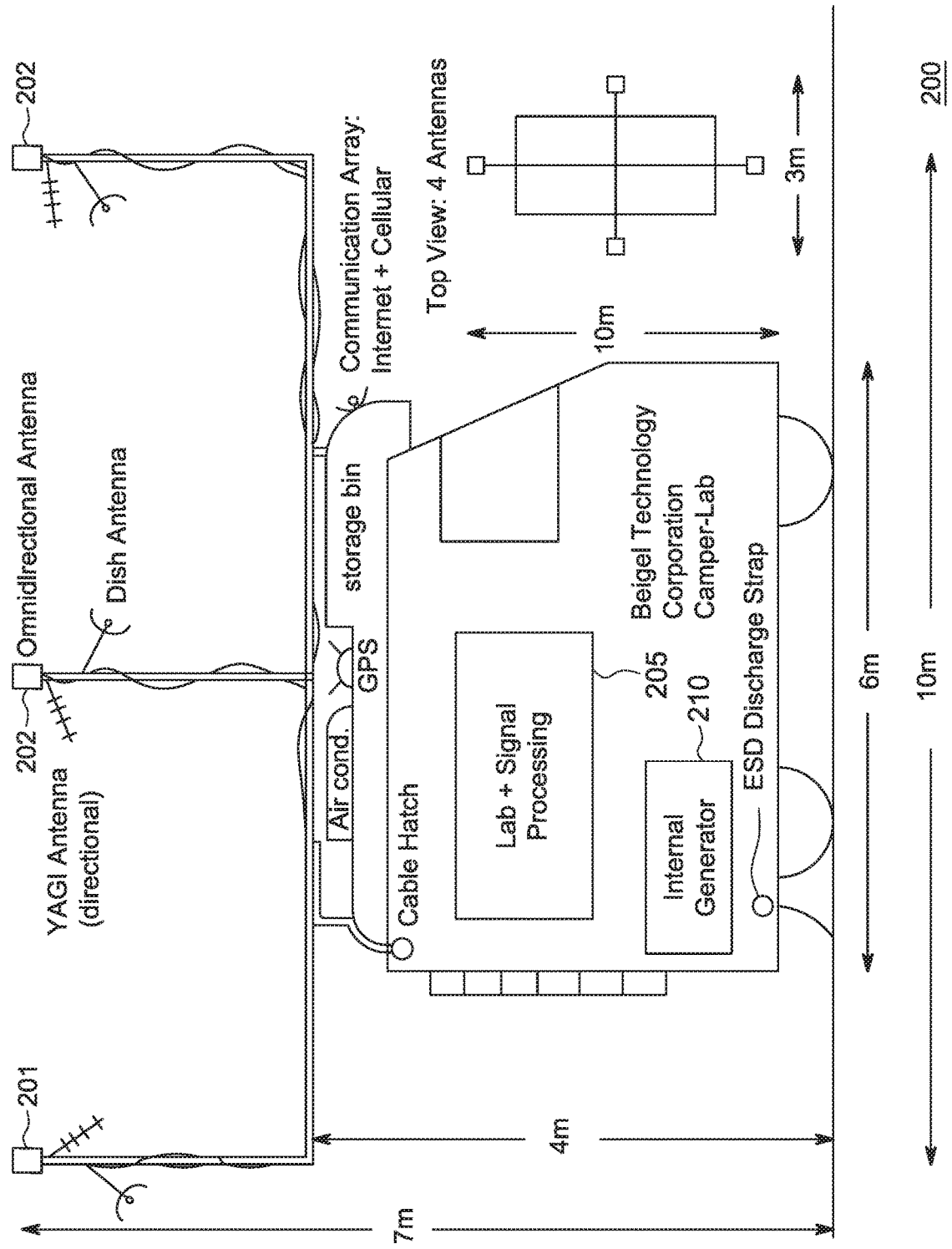
FIG. 2 is a diagram showing the design of the field lab and tracking vehicle with antennas attached for transmitting the interrogation signal and receiving the signal from the tags, as well as communicating with second or third-stage data gathering stations.

FIG. 2 shows a mobile lab which eliminates the need for fixed location antennas and may serve as a local lab and signal processing station 205 which can communicate data to and from a fixed base station. This may be especially useful for medium and/or close range location systems.

The mobile lab carries all instrumentation and powering equipment, and, in addition, provides a comfortable living/walking space for extended missions in hostile climate areas. The mobile lab and its equipment depicted here are just one of any number of specific embodiments for the "primary location system" mentioned previously in FIG. 1.

The Mobile Lab 200 is constructed from a modified camper-van which is able to navigate desert dirt roads in most seasonal conditions. As such, it provides all necessities for multiple day trips through the desert, including overnight accommodations, cooking, hygiene and internal toilet, and air conditioning. To support the operation of the lab during fixed location surveys, a 3000 watt gasoline powered generator 210 is provided for running air conditioning, all electrical services, and stable AC power. AC is needed for running all the electronic test and computer equipment 205 used both in the Research and Development phase for the system and final embodiments of the electronic and computer equipment. The lab-van has attached to its top a removable antenna support structure 212, which can be disassembled, such that the vehicle can use surface roads and freeways in traveling to its destinations in the desert for its survey work. When assembled on top of the van, the antenna system is made as long, wide and high as the vehicle will support, either for slow but continuous travel on desert dirt roads for taking measurements for faster survey completion or for stopping at definite locations along the survey route and taking measurements for greater accuracy. In a preferred embodiment the antenna structure has four vertical masts extending to a total height of about 7 meters or more. Height of antennas is very important in finding signal sources that are either embedded or are on the surface of the desert substrate. Preferably the sources are as far as possible above foliage and rocks which progressively attenuate radio signals in a straight line path between the lab-van and the tags. This will be discussed in more detail later. Distance between antennas is also maximized to provide the best possible accuracy in "triangulation" estimate of tag locations. These estimates are based on arrival time of tag signals at different antennas, amplitude of signals, and other aspects of signal that can be sensed at different but precisely co-located antennas. A GPS/compass antenna at a central (or other definite) location of the antenna array provides the location of the lab structure and consequently the location of each antenna on it.

Many types of antennas may be used, and it is contemplated that multiple antennas will be used on each mast. For example, antennas 201, 202 and 203 and 204 may be omnidirectional "whip" antennas at ¼ wave or ½ wave lengths, depending on the frequency in use. The omnidirectional antennas, while not as sensitive as some other types, provide a well defined receiving point from which arrival time, waveform shape and other location-determining information may be derived from any signal source equally, in any direction from the antenna array. Antennas numbered 207 (for all locations on array) may be directional "YAGI" type antennas which provide good signal gain at the resonant frequency, in a particular direction as differentiated from other directions. These antennas may be mounted facing at fixed directions to obtain better differentiation of direction of incoming signals. Alternatively they may be mounted on rotatable mechanisms. In this embodiment they may be swept circularly like radar, to scan the area omnidirectionally but with more signal gain than with nonpolarized antennas. The antennas may also be selectively rotated until the highest signal input is obtained from each antenna, further helping to accurately calculate the apparent position and distance of the signal source.

More directional antennas such as parabolic beam-forming reflectors may also be mounted on the mast and used in a manner similar to the directional YAGI antennas. Additionally the highly focused beam-forming properties of parabolic antennas (or similarly motivated designs) may be used to direct outgoing "wake-up" or powering energy to directions of likely tag location, delivering signals that may be strong enough to either "wake up" or even power a tag for return-signal generation. Less directional antennas would not direct enough energy.

The van-lab may also carry temporary fixed point masts and antennae (not shown in diagram) which might be powered either by a cable from the van or self-powered by battery, solar or generator power. These antennas would provide more distant "triangulation" points without the deleterious effect of permanent masts (that could provide housing or vantage points for predators).

Figure 3A:
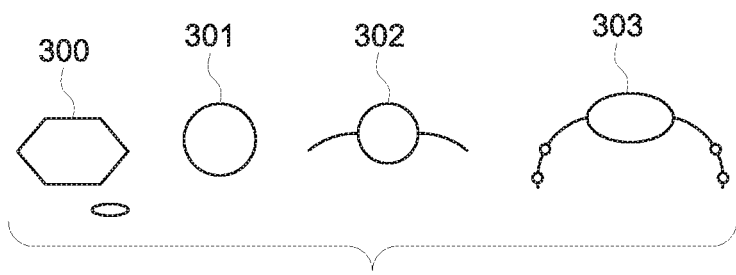
FIGS. 3A-3G are drawings of transmitting tags and receiving systems.
Figure 3B:
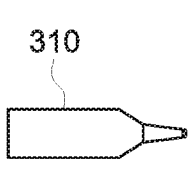
Figure 3C:
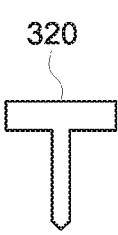
Figure 3D:
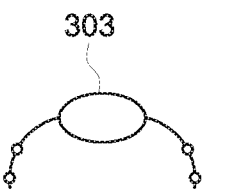

FIGS. 3A and 3B show tags that are shaped as to fit on the scute of a tortoise where it will least obstruct the animal from its daily activities and growth. A special glue 310, such as presently used for larger tortoises, can be used to affix tags onto tortoise scutes that will last and not adversely affect the animal in the long run. FIG. 3C shows location marker tags can be used to mark historical locations of tortoises.

Figure 3E:
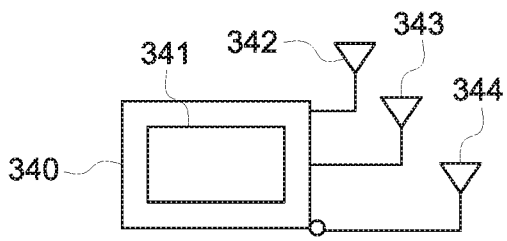

FIG. 3E shows a medium to close range handheld or backpack mounted reader-locator that is used in order to find and validate the location of a tortoise given a probable location provided by the spatial probabilistic filter. Two antennas 343 and 344 can be used to triangulate a close range RF signal from the tag, and this information can be uploaded to the primary location system with a communications antenna 342. The advantage in this is that the close-range locator may not have the computation power to perform location within its own processor, but the information could be computed by the primary location system (computer) or tags and relayed back by the communication channel. This also allows the primary system to keep track of all secondary location units (of which a plurality may be dispersed to find the tag at closer range). This handheld locator has a display similar to a GPS display, but with specific information for its operations terrain, and continuously updated probabilistic location information derived from its own signal receptor and data processing. The secondary locating device may have its own GPS and compass to provide its exact location back to the main system, or this may be accomplished by the main system through triangulation of the more powerful communication or tag interrogation signals emitted by the secondary locating device. The secondary locating device may use different tag location and ID technologies and/or frequencies than the primary unit, since, at close range, a tag may be more easily powered by externally generated E-M fields. Because various close-range (1 to 100 meters) RF transaction activities take place between the tag and the secondary reader, a wide variety of technology, antenna and form factor choices for both the tag and the secondary reader/locator occurs as a result of the "multi-stage, multi-technology" approach.

Figure 3F:
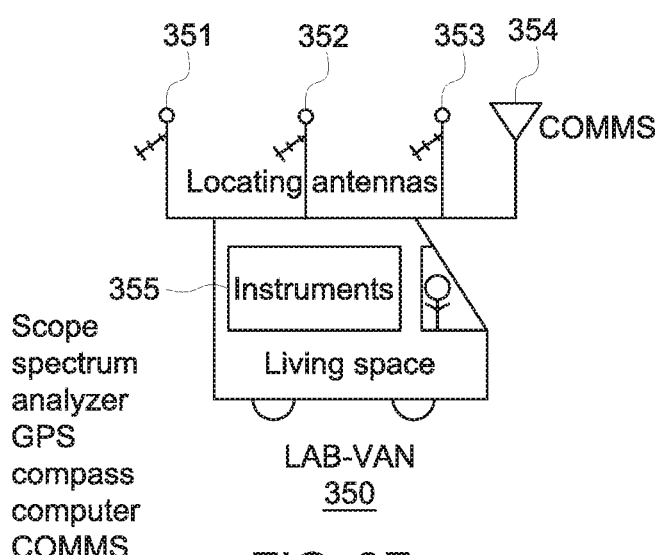

FIG. 3F shows a mobile lab that eliminates the need for fixed location antennas and may serve as a local lab and signal processing station which can upload data to a fixed base station. Likely not necessary in view of FIG. 1.

Figure 3G:
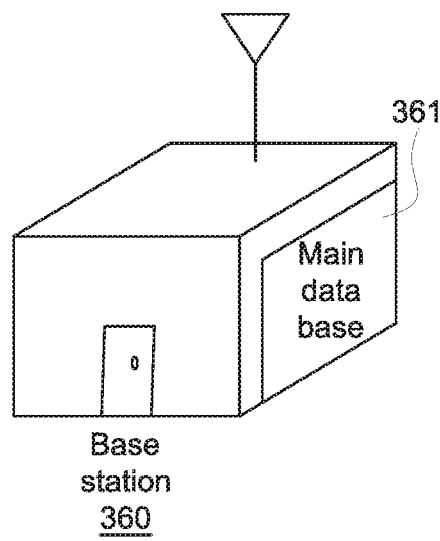

FIG. 3G shows a relatively fixed-location base station 360 that collects all the information from all sources (or from the primary mobile location system via a stronger ratio channel) and compiles them into a main database that can be used for further analysis.

Figure 4:
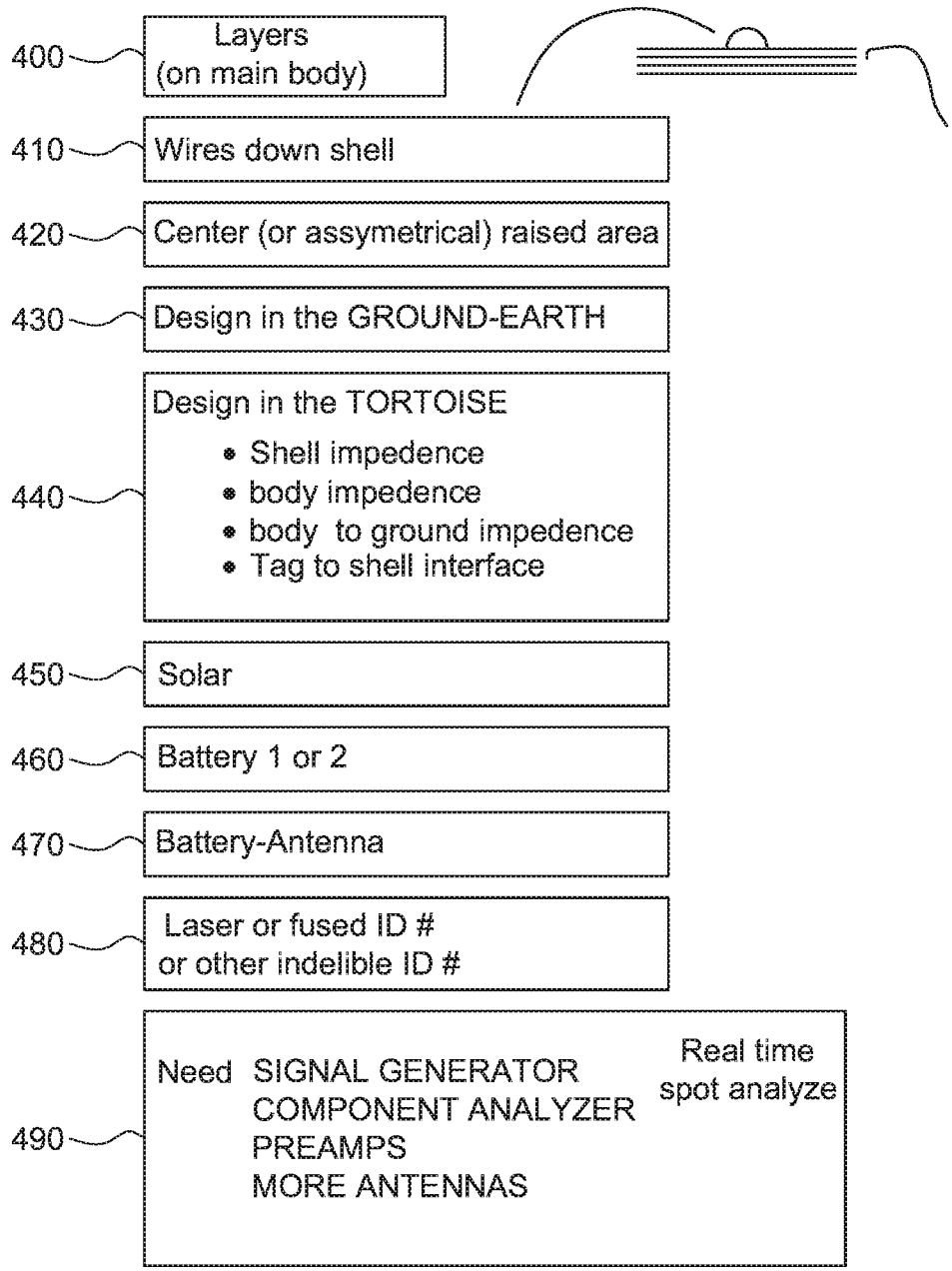
FIG. 4 lists some important design features incorporated into the described system.
Figure 6:
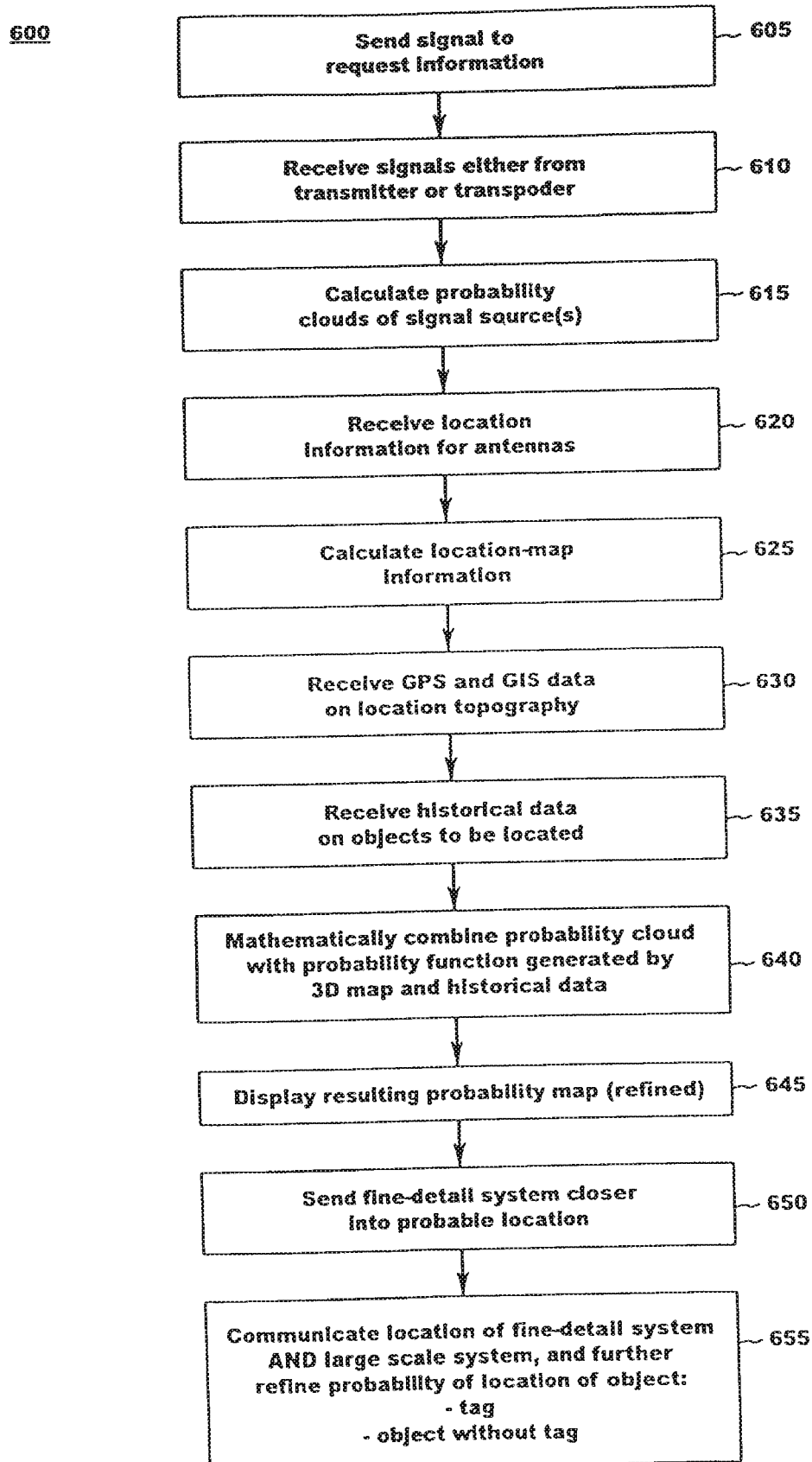
FIG. 6 is a flow chart representing an embodiment of how the receiver signal processing and probabilistic spatial filter work to improve defining the location of the tag.

FIGS. 4 5, 6 are charts showing the engineering trade-offs encountered in all forms of technology evaluation and product design as applied to this particular specific system for tortoises. These charts also show the construction of an "end-to-end" physical and electromagnetic model of the entire environment of the operation of the system to be designed. This model will then serve as an aspect of the probabilistic spatial filter system, which depends on a model of every determinable aspect of the system operation (in general and in each specific "location and ID search" performed by the operational system. Before certain modeling and simulation tools (interactive systems of Solidworks, COMSOL, E-M software, circuit modeling software) were available, the concept would be too complex to be executed by available computing power, and thus inoperative. However, this model itself (physical model, electromagnetic signal model, circuit models, and system models) in its real-time operable mode is now not only feasible, but serves also an intrinsic element of the location system, acting in real-time with observation data and signals, location maps, spatial probabilistic filter, display generators, and two-way real-time communication links between all separate location apparatus of the system. At this time, it is possible to create an interactive data feedback system with a correctly designed model, detailed data on the physical environment, and detailed data on the animal the tag is attached to and a model of the interaction of the primary locating vehicle with the actual terrain (as well as that of the secondary locating vehicles). This system is an improvement over prior art techniques, in that it would be able to facilitate the most effective system design and continuously optimizes the probabilistic location filter process and thus the actual operation of the system for each location task in its useful operational life. A beginning point may be the association of the tag with the tortoise and the tortoise with the substrate in which it lives.

FIG. 4 is a system evaluation diagram, stratifying the various aspects that are important to designing the best tag to fit on a juvenile desert tortoise. The tag is to be a device that may fit on a single scute of the young tortoise and also accommodate its growth. The tag may contain layers 400 of conductive, semiconductive, insulating or other electrically active materials. The bottom of the tag is attached to the outer shell on one of the scutes. The scute-shaped tag body may be used as antenna or part of an antenna. The attachment (glue or tape) might be conductive or nonconductive. Wires 410 may extend over the shell as long as they can be made to be harmless to the tortoises growth, which involves the accretion of the material between the scutes that hardens into different growth rings around each scute. Wires down the shell may be useful as antennas or parts of antennas. At the central part of the tag there may be a raised area 420, as long as it would not exaggerate the natural shape of the shell too much. A raised area would be convenient for locating electronic components comprising part of the tag.

Note that the tortoise will almost always be in physical contact with the substrate or ground 430 on which it lives. The electrical impedance of this contact may possibly be used as a design factor, or alternatively it may be eliminated as a design factor if no good use for the variable impedance connection can be found and no significant effect on operation is expected. The impedance and surface features of the substrate (ground, earth, sand, burrow, clump of plants) on which the tortoise lives will affect the electromagnetic design whether or not the impedance from the tortoise to the ground is utilized in the system design. The distance between the tag elements and the ground surface will affect the radiation and reception of the antenna, and it is sure to vary as the animal rests, moves, hibernates, and grows. In general the following aspects of the tortoise itself as a physical object must be considered in the tag and system design: Shell surface impedance, shell to bony layer impedance, internal body impedance (to varying degrees of detail), body-to-ground impedance, tag-to shell interface impedance, etc. 440. These aspects of the tortoise-as-system-component are listed in 440.

Items 450, 460 and 470 concern sources possible for powering the tag. Since tortoise always go out in the sun when not in hibernation to heat their bodies to optimum levels for metabolism and movement, a solar cell on the tag surface is optimum for powering the tag as well as for determining when the tortoise is in the optimal position/location for its tag to be read. The presence of sunlight means the tortoise is generally above ground and in relatively clear overhead space. Therefore the presence of sunlight makes and solar power converters 450 possible a battery-less active tag, and in addition can work with other circuitry in the tag to utilize as much sun-power as possible to broadcast beacon and ID signals, as well as to charge any secondary batteries or capacitors (or super capacitors) in the tag circuit.

One or more batteries 460 may be a part of the tag circuitry. In the case of a secondary battery, it can be used to power the tag electronic systems and can be re-charged by a number of energy-harvesting techniques (solar, motion-generated electricity, electromagnetic field), or even directly electrically recharged if the tortoise is able to be physically handled. A primary battery may be used as a circuit component to power a clock-calendar circuit. These batteries and the ultra-low power drain circuitry mentioned, as used in digital watches, have life spans of several years when running ordinary watch and LCD circuitry. If used to power a clock-calendar circuit that schedules the times, days and months that surveys are likely to be successful, their only function would be to turn ON or OFF a CMOS switch to enable tag activation. This should allow the battery to operate much longer, and battery life to approach its shelf-life and certainly long enough to power only a scheduling memory for any passive OR active tag functions that might be utilized. Since batteries can now be made very thin and flexible, either or both batteries might also serve a double function by occupying a large surface area of the tag and utilizing one or both conductive terminals as part of the tags antenna structure 470. The function of a battery serving as part or all of an antenna is known in prior art. (e.g., Beigel prior patent application and/or patents) Related to the tag design is the implementation of an indelible identification number associated with the tag and/or the tortoise. The most reliable method of providing an indelible memory element in a tag is laser or otherwise physically/electrically fused PROM tag number 480. In addition to being indelible electrically, it can also be examined microscopically and read optically if only remnants of a non-working tag or deceased tortoise are found. This also brings up the possible desirability of subcutaneously implanting a PIT (Passive Implantable Transponder) under the skin of the juvenile tortoise. Present PIT tags can be made small enough for this purpose without causing a weight burden or danger of infection to the tortoise, and therefore should be able to serve as a "back-up" to any more advanced long-range transponder mounted on the shell of the tortoise.

The external components (not connected and distant from the tortoise) listed in 490 indicate some of the components of the reader-locator system at the "other end" of the system design, for example, Signal generator, component analyzer, preamps, antenna, computer system, DSP and database software. In addition the environment between the tortoise, tag and reader-locator (not numbered) must be considered in the SYSTEM APPROACH to the design, modeling and ACTUAL OPERATION during the deployment of the system. This basically summarizes the "end-to-end" approach in which simulation, design, physical implementation of components, and operation of the entire system during its entire life-cycle are part of a UNITARY FUNCTIONAL METHOD of providing this tag and location system.

FIG. 5 shows a tag detection location and identification system that works according to a tiered hierarchy of function plus utilization. The SYSTEM 500 consists, as discussed in FIG. 4, of the tortoise or object or asset, the tag or identifying modality, the environment in which the ID/Location system operates, the locating/identifying hardware/software/transport, and the real-time database that computes, displays, tracks, and possible predicts the location of all the tortoises, objects or assets, covering the past, present and predictable future time line of the study being conducted.

The stratification of this system in 500 depicts the notion of "layers" within the process of system components, operation, and useful output. The elements in 500 are the primary stages of system functions for locating the tortoise: Detection (finding a signal that may be from an ID tag), Detection of any signal that could be a tag signal, Direction (as determined by time-of-arrival, relative signal strength, etc at the primary location system's antennas), Distance (which may be obtained if sufficient signal allows accurate triangulation), and Location (which derives from the first three "D"s and the known location and orientation of the "reader" system. Identification may be independent of location (it could be implicit in the signal pattern, or it might only be found by directly accessing the animal). The Location process 500 may also proceed in stages, in which a provisional location is computed by the primary location system and the precise location is determined by additional short-medium range location system(s) dispatched to the area of approximate location.

System aspect 510 concerns the models of electromagnetic signal transmission from tortoise (or asset) to primary and secondary location systems. It is "layered" in the sense that first the "tortoise" model is considered, then the tag model. Together they form the first transmission model. They (tortoise & tag) interact with the "close environment" (ex. Borrow, pallet, open space, sand, etc.) model of the environment, substrate, nearby vegetation or RF obstructions, and taken together form a sub-system that could be considered a "transmitter" into the mid-range and long range spatial models. The close range objects that interact with the antenna can be lumped together since they may determine the signal strength, directivity and polarization of the outgoing signal that traverses the (possibly) much longer distance through the environment to the long range location station (as an example). Likewise, a corresponding transmission model from the "reader" to the tag would be constructed for system types in which the reader sends a signal (either providing power or query information) to the tag.

Signed processing 520 refers to a "macroscopic" mid and long-range models of transmission of the signal through foliage and air, including major obstructions, air attenuation, and major reflections. This aspect applies to both "tag to reader" and "reader to tag". Signals reaching the antenna structures pass through an additional model of the antennas and the preliminary signal processing. The signal (presumably now digitized) passes into the detection, direction, distance models, the output of which is mapped onto the terrain map model. At this point the spatial probabilistic filter model 530 interacts with location probability clouds generated by the preliminary location processing system, and determines the most likely location areas, which can be multiple on account of reflections, etc. A second round of computation (not shown in FIG. 5) occurs when sub-location information is transmitted by the short range location systems, and the probability map is updated until, by successive approximation of location, the tortoise, object or asset is positively located and identified. In other words, the location process is repeated. This data point becomes a historical asset for the entire location system. The display functions at the primary and secondary location systems then involve the human operator's intelligence and experience in discerning the graphic map information with real life in order to actually locate the tortoise. In this way, the concept of layered models becomes the process by which the system operates and improves its function by accumulation of historical information and successive correction of the various computational models corresponding to the physical object of interest, the physical environment, the electromagnetic environment, the hardware and software locating devices, and also the improvement of human interpretation of data and use of the system.

FIG. 6 shows a procedure followed by the spatial probabilistic filter, which may be resident as software or firmware in the primary (long range) location system and possibly also the secondary (short range) location systems.

Flow chart 600 shows PROCEDURE STEPS IN IMPLEMENTATION OF SPATIAL PROBABILISTIC FILTER:

Step 605 is Send signal to request tag information (optional, tag may be self-activated) in "beacon signal" mode Step 610 is Receive signals either from transmitter or transponder (amplitude, phase, arrival time, etc.

Step 615 is Calculate first probability clouds of signal source(s) relative to the antenna system geometry Step 620 is Receive location information for antennas (i.e. the GPS based location of the antenna bearing device (long range or short range location systems)

When the signal coming in from a tag is analyzed by a particular location-estimating algorithm based on the relative signal values at the antenna locations, it is unlikely, especially in the case of a weak signal in a complex environment, to be a single "location" calculated. More likely there will be a probability density function of possible locations clustered around one or more central locations (in the case of reflections, it is likely that numerous "locations" will be calculated with no real way to decide a preference of one over another. This is the first "probability cloud" generated by the signal processing of antenna signal data.

Then, there is the second probability map based upon the topography of the general area in which the antenna data are received. The generation of a "probability map" from a topographical map requires an understanding of numerous aspects of both the topography, terrain, and the possibilities and habits of locomotion of the tortoise (or other animal, object, asset, etc). Some obvious examples in the case of the juvenile tortoise serve to illustrate—only superficially— what the art and science of constructing a "probability map" can entail. In the simplest model, one can impose a binary (0,1) model: either the tortoise can possibly be at a certain location or cannot possibly be there. For example, a tortoise cannot be inside the center of a large solid boulder: so probability=0 for an area or volume occupied by such an object. In a sunny area free from obstructions, the probability might be defined as 1 because the tortoise COULD be there. From this crudest "possible/impossible" weighting function for the 3D space in consideration, one would develop finer gradations based on more detailed study or statistical experience of locations confirmed. For tortoises, the knowledge that they like to nest in certain clumps of plants, or the locations of known tortoise burrows, or could not be in closed buildings into which they cannot access, can build up a "gray scale" of probability density regarding the various known aspects of the geographical area under study. Changes in the area must not be neglected. Removal of foliage, change of terrain due to flooding of wash areas, etc. must be monitored and the probability map updated to maintain the best accuracy and relevance.

This probability map concept can apply to the acquisition of position data for any item of interest in any environment. The requisite conditions are a map or diagram of the environment and the structures within it, or other dimensionally calculable aspects which would affect the likelihood of a target object occupying any point in the space. The location of the system making the measurement of distance and direction to the target object must be known. The history, if any, of sightings of the objects within the environment should be known if possible. The size of the object, its characteristics regarding movement direction and speed, capability of sustained motion, etc should be known. The object does not have to be tagged, for example, visual sightings or radar images might be used to estimate its location instead of tag transmission data. Thus, the probability of one or more objects being in a given space in relation to the location finding system may be established to varying degrees of accuracy, and the over-all accuracy of the estimation of the objects position may be enhanced by the mathematical combination of the probability map with all other location data (and uncertainty) obtained by the measurement system. However, this process is only the first of a possible sequence of steps taken to provide the exact location of the object.

Step 625 is Calculate location-map information: Place the location system (readers, antennas) within a map model of the local environment GPS based on history and new information (step 630).

Step 630 is Receive GPS and GIS data on location topography: add detailed data regarding substrate, foliage, objects, topography) corresponding to possible location.

Step 635 is Receive historical data on objects to be located, based on previous confirmed locations and computation of all possible trajectories from previous historical records that could place an object (tortoise) within the general location area based on its maximum travel rates, possible travel paths, etc.

Step 640 is Mathematically combine first probability cloud with a second probability function generated by 3D map and historical data.

Step 645 is Display resulting location probability map (refined): Assuming a human operator (since a robotic or automatic artificial intelligence operator might also be used and a display map not needed), the display would for example show a topographic map of the area in which the measurement search is taking place. The location of the primary locating system and the orientation of its antennas would be displayed on the map display, derived from GPS and compass measurements. The probability cloud of possible object locations would also be displayed on the map. The spatial probability function (based on either human judgment or possibly an algorithmic derivation) would be superimposed on the map, in regions corresponding to the probability cloud. Finally, the enhanced probability cloud would be displayed or accentuated within the total display.

Step 650 is Since multiple tags may be detected simultaneously by the system, a refined probability cloud for each tag would be separately projected onto the display and differentiated from any identifiably different tag probability clouds. Send fine-detail system closer into probable location: At this point, if a more accurate or completely exact location of the tortoise is desired, the second (or nth) stage of location equipment would be brought into the situation. For example, the backpack mounted or handheld location system (which may use an entirely different technology for location and/or ID) would be dispatched to the area or areas of highest likelihood of location.

Step 655 is Communicate location of fine-detail system AND large scale system, and further refine probability of location of object:

The close range system's position and orientation, likewise derived by GPS and transmitted on a "communications channel" to the primary location system, would then begin seeking the tagged tortoise. Since its range is short, it might not have data to report until it has come closer to the tortoise. However, its trajectory would be tracked by its own GPS system, relayed to the primary station and displayed on the terrain map. Since the close range system also has a display, and receives a visual image of its location, orientation and trajectory from the primary system, the close range seeker will not be aimlessly wandering in search of the tortoise. If it has traversed all possible area in the probable location region and found nothing, it can then move to another region of probable location. Since the range of the close range system is known to a relative extent, it can even be directed as to how closely to survey the area to avoid needless repetition with out missing an area. Assuming the tortoise is located precisely; its position is marked on the main map. Its ID is read and any physical handling necessary may be performed. If its ID tag is rechargeable by electromagnetic field, the short range reader might be brought close to it for the required period of time for a re-charge. The system described is a two-stage system, but there is no need to limit the system operation to two stages if the geographic area is very large, or increased accuracy is needed, or the limitations of locating equipment require more stages to exactly locate the object. The probability map is also then updated and the probability functions corrected by the exact location information, and possibly an analysis of "wrong guesses" and traversal by the short range system.

TAG: The above description described a tagged object, however similar methods may be used to find un-tagged objects if methods of successively estimating its location are available, and the notion of a spatial probability map applies to successively accurate estimation and final exact location.

Tracking Software

Mathematically, the antennas will pick up a signal y from the tortoise in position x. This signal will be complicated, potentially including components from reflections and interactions with the terrain, along with noise, w. The problem can be posed as one of finding the position x from the measurement y. That is, we want to maximize the probability that we would receive the measurement y under the assumption that the source is at position x for a given set of (antenna) parameters, θ. Mathematically, the problem is maximizing the conditional probability with a set of constraints $$\max_{x,\theta} Pr\{y \mid x, \theta\}, \text{ s.t. } \|x - x_{previous}\| \le vt, \|x - x_{rock}\| \ge \delta_{rock}, \quad (1)$$

$$\|x - x_{surface}\| \le \delta_{surface}$$

The constraints listed here may not be exhaustive, but rather serve as an illustration of the kinds of constraints envisioned at this point. The constraint $\|x-x_{previous}\| \le vt$ says that a given tortoise cannot move farther than vt since the previous observation at time interval t in the past. The software should record the time of each observation of each tortoise and thereby eliminate erroneous detections by proper choice of the maximum velocity v. Of course detection at very long distances might still be a valid detection if the tortoise was carried by a predator, flood, or other unusual event—and the software might want to record these events as well. Similarly, the last two constraints say the position cannot be within rocks or a distance farther than $\delta_{surface}$ from the surface.

To solve this problem, we first formulate a model that contains information about the terrain, and estimates the measured signals y that would be detected from a source at x for some set of parameters θ. This model may be of the form y=f(x,θ)+w. If the noise is Gaussian white noise, then we can write this problem as one of searching for the position x that minimizes the estimation error e=$\|y-f(x,\theta)\|$. This is a standard optimization problem (Boyd 2004) and SC Solutions (a California company, for example) has developed tools for solving these types of problems.

Thus for the software development there are three main tasks. The first is a model that estimates the antenna signals that would be detected for a source at a specified location with possible variable parameters associated with brush, moisture, and other variable factors that can affect the transmission for the RF signal. This task will be undertaken using commercially available software (COMSOL). The source strength and directional pattern will be assumed known (and calculated from the "end to end" electromagnetic system model).

The second main task is that of integrating a terrain map and the transmission model into an optimization module that reports the detection of a tortoise position by solving Eq. (1). For the full implementation, the software must detect multiple tortoises and perform the necessary transformations from the coordinates of various antennas mounted on (Mobile Laboratory, Hiker, UAV, etc.) to the coordinates necessary for solving the optimization problem. For example, the model described above (y=f(x,θ)+w) will be duplicated for each antenna with its unique parameters θ associated with its position within the terrain so that the global position predicted, x, will be accurate. Since the models for various antenna/detection schemes may be different for the various modes of detection and are likely to evolve and improve with time, this model integration should be sufficiently modular and generic to allow easy accommodation of future detection improvements.

The third main task will be to integrate location information of the tortoises with a real-time geographical database. The database will also serve as a repository for historical data as well as real-time GPS and GIS data. It can be used to help the on foot searcher locate the animals more accurately and provide updates to the model y=f(x,θ)+w in terms of terrain features.

Algorithm projects spatial probability cloud onto GIS map powered by USGS.

Compares the projected probability code with a pre-computed spatial probability surface derived from the known information about the locality Historical; geological; temperature; solid objects; etc.

Projects a refined spatial probability display on the map surface based on the comparison algorithm in which Tag emits an id/location signal:

Long range detection system picks up at least part of the signal

Assigns a direction based on time of arrival, frequency modulation, other signal properties Assigns a distance according to signal analysis, amplitude, Doppler, frequency content, etc.

Assigns an ID based on code or signal burst distance

Computes a preliminary probability cloud of direction, distance, ID based on calculations from above signals and signal processing algorithm derived from the signal properties and a general topology of the surface or 3D volume within range of signal reception.

Figure 7:
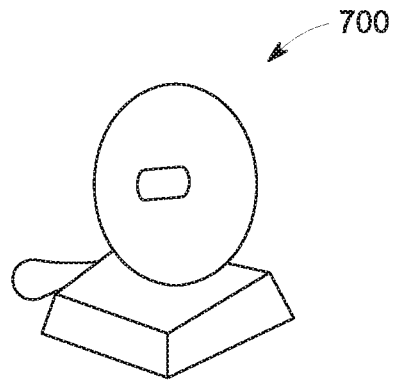
FIG. 7 shows a parabolic antenna, although other reader antennas may be used such as Omnidirectional, Directional, Polarized, etc.

FIG. 7 shows a parabolic antenna. This type of antenna is very efficient for forming a beam-like signal dispersion pattern, resulting in the most efficient transfer of energy to a tag or reception of signal from a tag at longest distance. However, the antenna must be large compared to the wavelength of the signal or the effect cannot be successfully achieved. Accordingly, this type of antenna would be restricted to UHF or microwave frequencies for effective use on a mobile platform, because otherwise the antenna size would be too large to carry. Note also that a beam-forming antenna is appropriate only when a reasonable estimate of the object's position is already known, or when there is sufficient time available to rotate the antenna to cover all possible directions with sufficient overlap between beam patterns for transmission and reception of signal or for power.

Figure 8:
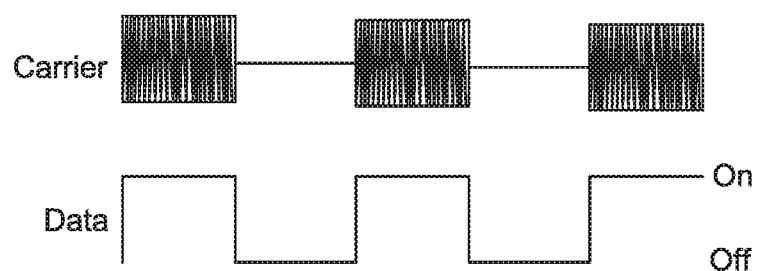
FIG. 8 represents the signal structure of a pulsed modulated signal means for encoding the tag's identity.

FIG. 8 shows that a carrier signal is seen in the data stream as a series of on and off periods. Of the many possible ways for signal power and/or data to be transferred, a method called "on-off-keying" may be used. This simple method turns a carrier signal on or off according to a predetermined pattern which may represent the ID code or other fixed or variable information.

Figure 9:
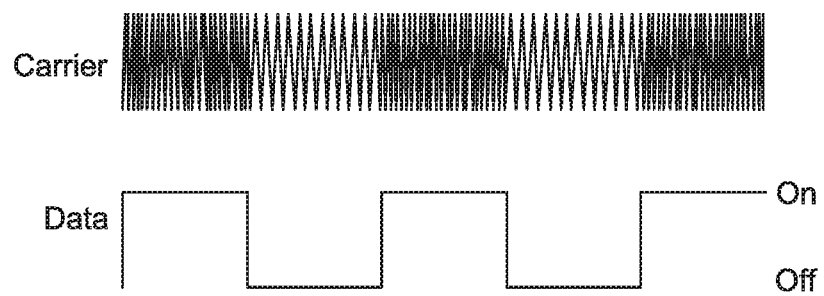
FIG. 9 represents the physical structure of a frequency-modulated continuous signal means for encoding the tag's identity.

FIG. 9 shows FSK MODULATION TRANSITION OF RF ENERGY.

In another common modulation method, the signal is transmitted continuously, but the frequency is different for each "value" of information to be transmitted. As shown, periods of determined time value or numbers of cycles of frequency F1 and periods of frequency F2 (both within resonance capture by an appropriately designed antenna) may correspond to digital "0 and 1" respectively, while allowing the advantage of a continuous RF signal for (example) powering a remote tag.

Note also that a first carrier wave of a first frequency which is one half the frequency of a second carrier wave, and e.g., the same amplitude, may be modulated by a digital wave where "zero" uses the first carrier and "one" users the second carrier, for a modulated resultant wave.

Figure 10:
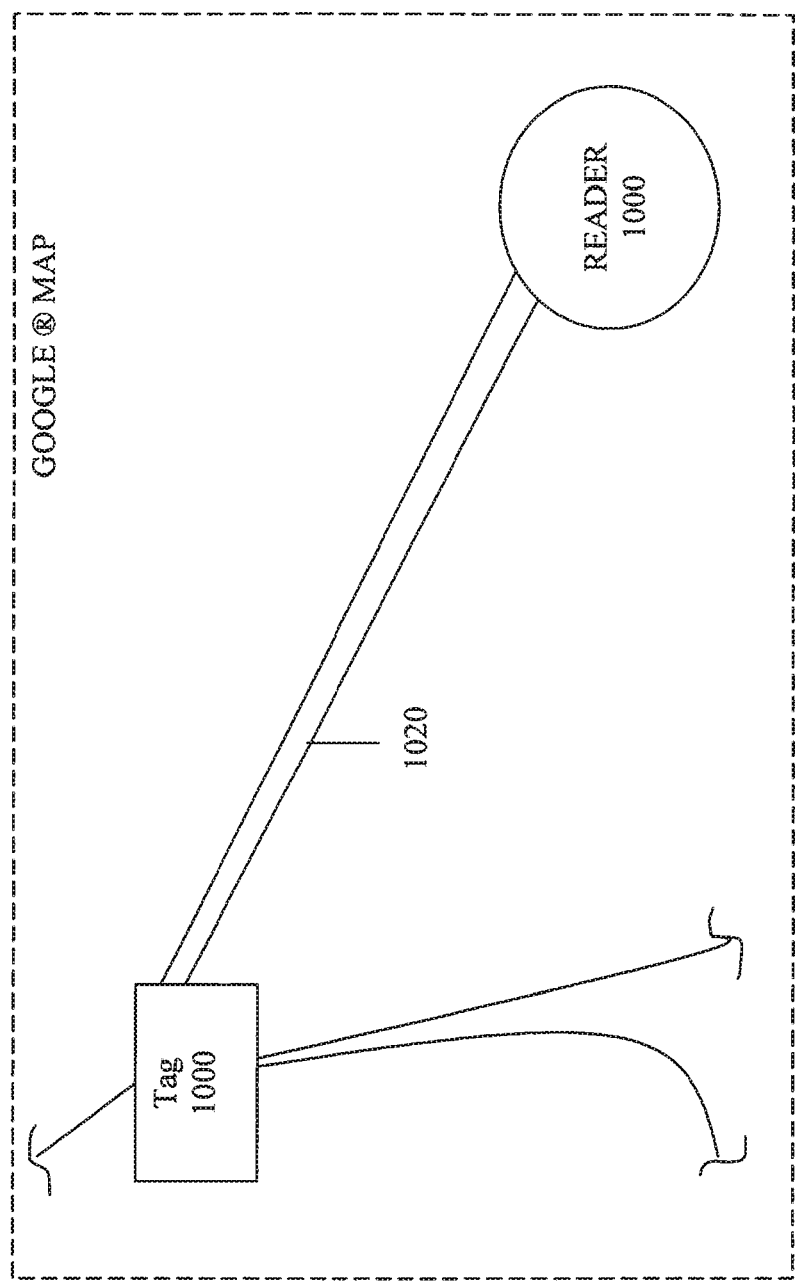
FIG. 10 is an example of spatial location map with the tag and reader locations and a distance/direction line drawn between them.

FIG. 10 is a Spatial location map of a tag and reader and the associated direct distance/direction line. (NOTE: this diagram might be placed in proximity with FIG. 6 for clarity). An example display in connection with a "spatial map" might appear as in FIG. 10, which itself depicts a "landscape" at an appropriate scale and orientation relevant to the location search. Item 1010 may depict the center point of location of the primary and secondary location systems. Item 1000 may depict the center of a probability cloud of estimated location of the tag. Item 1020 depicts a "straight line" trajectory between the locator and the tag, indicating both the approximate direction and approximate distance from the locator to the tag.

Figure 11:
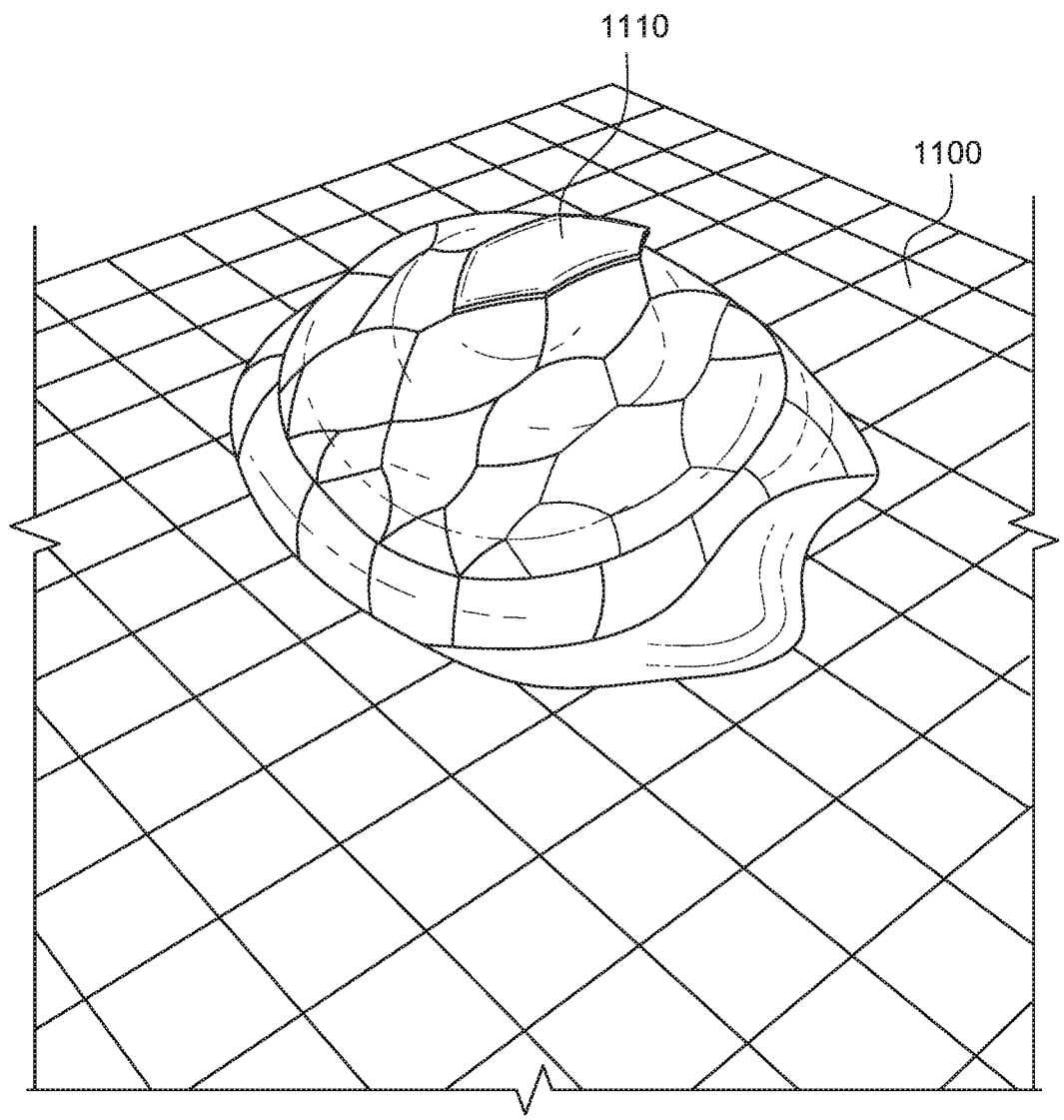
FIG. 11 a computerized model of a tortoise shell with a "patch" tag/antenna designed to fit on a single scute of a juvenile desert tortoise.

FIG. 11 shows a simulation of a "scute tag" on a tortoise shell and also illustrates some aspects of the physical modeling system. In the figure, 1100 depicts the close-range substrate in the locality of the tortoise shell. A mock-up drawing of the outline surface of a TAG 1110 is designed to fit on top of a particular scute of the tortoise. However, this illustration is over-simplified in that it does not (and cannot in a still-life illustration) show the powerful modeling system beneath it, which creates the images. The tortoise shell itself can be viewed from any perspective, at any distance. Furthermore, the shell can "grow" in size while the tag components remain at their original size and position on the portion of the scute they started on. Likewise, the SUBSTRATE can be viewed from any position or scale of distance. The shell can be filled in with detailed simulation of the "inside" of the tortoise, as a simple impedance or detailed with internal organs. The PHYSICAL MODEL of the tortoise and tag can interface with the ELECTROMAGNETIC model of the tortoise, tag antenna, near, medium and far environment. The circuitry on the tag can be simulated with a circuit simulation program that connects to the antenna radiation simulator, and so on, such that the entire physical domain from microscopic to multi-kilometer, along with the electromagnetic domain of the same range of scales, along with the circuitry and signal processing simulations of the components and signals can be "seamlessly" simulated with available technology, i.e., COMSOL and ORCAD and SOLIDWORKS and others. As mentioned previously, these models can be linked to the results of field measurements for verifying and improving the correspondence between model and experiential measurement. At a certain point of development, the correspondence may be determined to be so accurate that the need for fine-scale verification may become less important, and the periodic "inventory" process of tortoises (objects or assets) in a given environment or survey space, may be greatly simplified as the process of model-verification-feedback-improvement matures. Model, actual devices surveys, and database, are interactively optimized at chosen time intervals creating a continuous incremental improvement of all of these aspects of the "project operation" based on: experiment history, technology advancement, continuous model, survey and database improvements.

Figure 12:
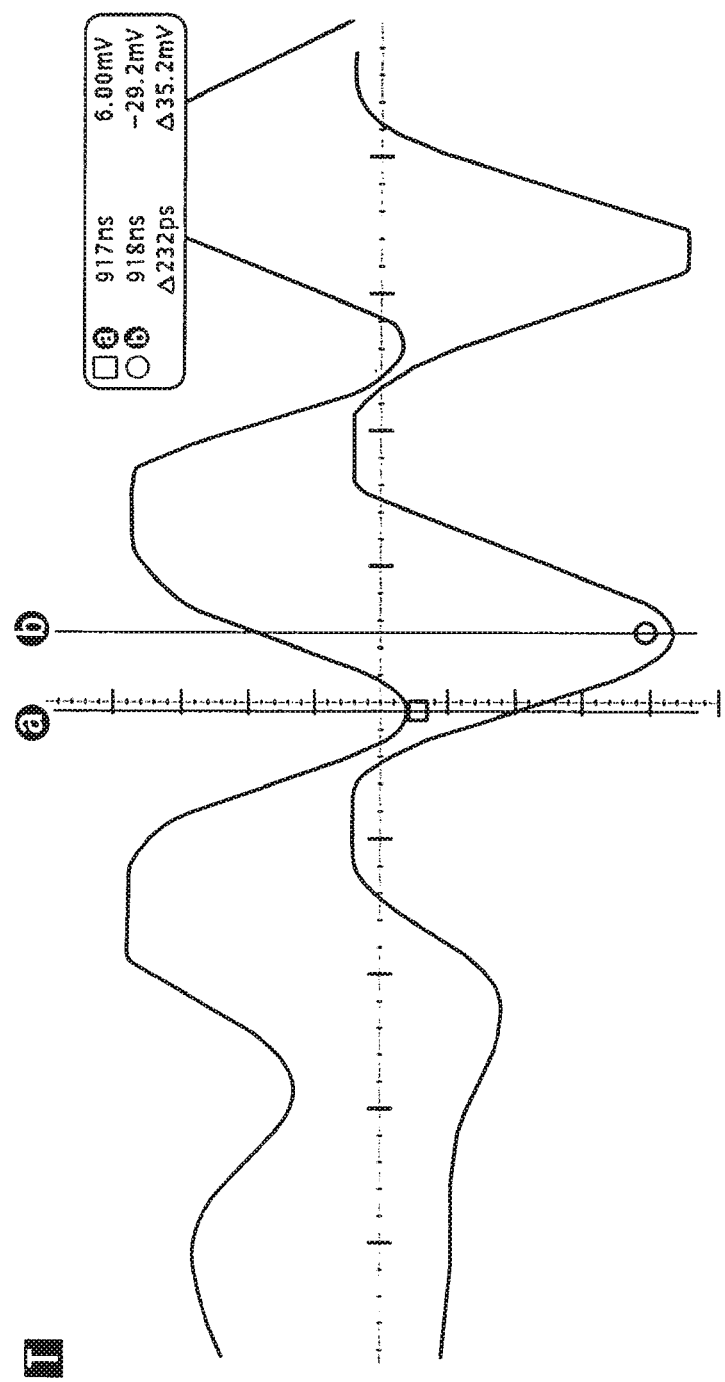
FIG. 12 is an oscilloscope tracing showing the time-of-arrival detection in the locator system antennas from a single signal sent out by a single tag.

FIG. 12 shows an oscilloscope trace which shows the time of arrival differences from a distant electromagnetic pulse source, received by two resonant antennas as an array located at nearby but different points in space. As an example of an input-stage signal processing method for signals received for tags, the fast (300 picoseconds per division) horizontal scale of a 1 GHz oscilloscope shows the pattern of a single signal generated by a "pulse" source received by each of two identical YAGI antennas about one foot apart and parallel to each other, both pointed in the general direction of the pulse source. Antenna 1 signal (upper signal) and antenna 2 signal (lower signal) appear on channel 1 and channel 2 as decaying sinusoidal waveforms created by the resonant antenna response to the pulse signal. The small difference in time of reception of the signals indicates an angular displacement of the pulse source from a center line between the two antennas. Based on this angle (and possibly also the average amplitude and relative amplitudes between the signals from each antenna), a calculation of estimated DIRECTION AND DISTANCE of the DETECTED signal provide the basis for calculating the "probability cloud" estimation of the pulse source's position. More than two antennas may be used for better estimation of directionality and distance.

Figure 13:
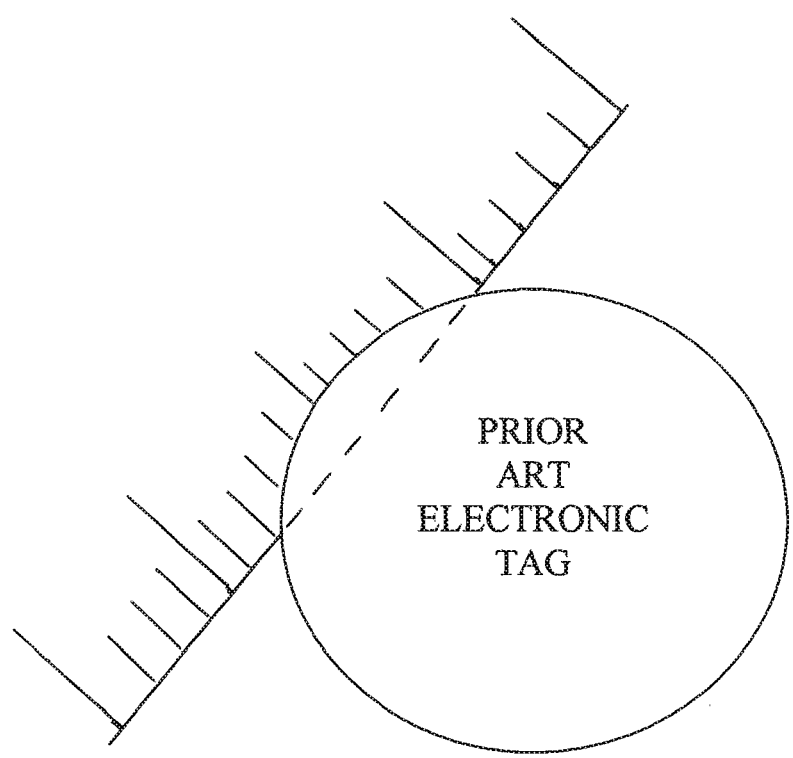
FIG. 13 is a sample tag commercially available with numerous components including a light sensor, signal processing circuit, and visible LEDs (Light Emitting Diode) in such size that could fit on a juvenile tortoise scute.

FIG. 13 shows the diameter and details of a prior art miniature electronic tag which provides a complex function for visual detection of pet animals in the dark. Such a tag is within the skill of those of ordinary skill in the art. The facing surface of the tag is approximately 1.0 centimeters in diameter. Not shown on the tag are a pattern of printed circuit traces, electronic components including resistors, capacitors, a control IC (integrated circuit) and an array of LED's are all arranged on a substrate coated with a photo resistive material. The assembly is covered by a clear epoxy dome. Although it is powered by batteries larger than would be employed on the "tortoise tag" of the present invention, this commercially, reasonably priced item shows that a complex tag with various sensing, control and signaling functions can be produced on a platform the size of a juvenile tortoise scute.

Figure 14A:
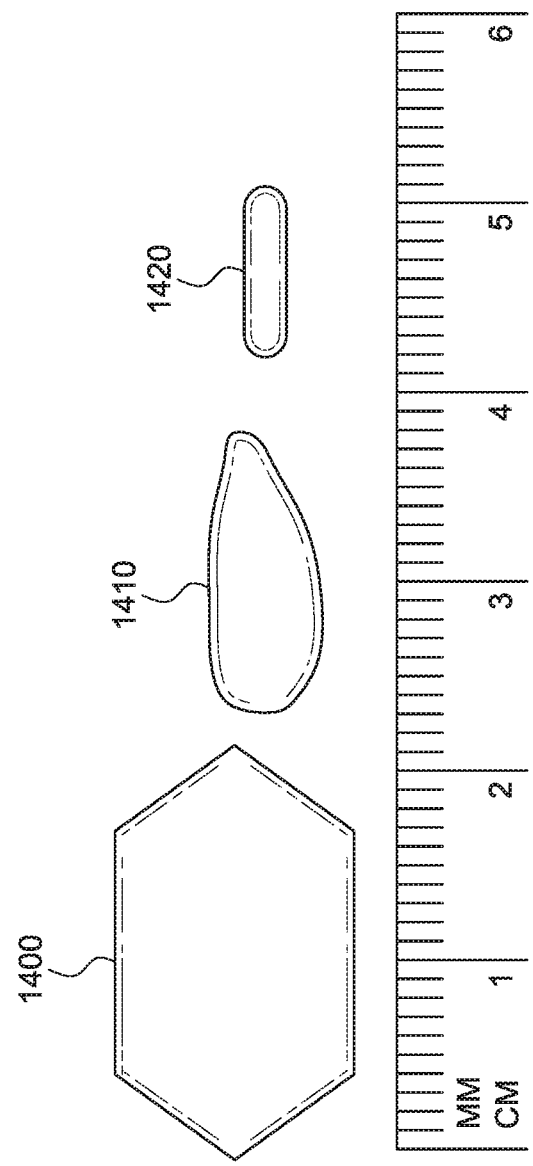
FIG. 14A is a photograph of a telemetry tag mounted on a scute-shaped conductive patch antenna (left) and a VHF transmitter (middle), and a low-frequency passive integrated transponder (PIT) tag (right) shown for size and shape comparison.

FIG. 14A shows various small telemetry tags. Item 1400 shows a piece of conductive foil, cut to a typical "scute" size and shape appropriate for a juvenile desert tortoise scute. Placed on the foil is an actual size PHOTO of a telemetry tag that has been developed and successfully deployed on large dragonflies, and tracked as they migrate through the air. While the device developed for the dragonflies would NOT work for the tortoises for many reasons, the picture adequately demonstrates that a device of similar complexity but different specific components and function could be deployed on a "scute" tag. Item 1410 is the same photo of the "dragonfly tag", but not mounted on the scute shaped conductor. Item 1420 is an actual working "PIT" (passive implantable/injectable transponder) tag that is 8 mm in length, and which provides close range (under 50 centimeters) identification at a 134.2 KHz low-frequency inductive-coupled technology platform, and could be mounted on a scute-tag substrate, or on another surface location on the shell of a tortoise, or even implanted under the skin of a juvenile tortoise as a form of permanent positive ID tag and/or portable database.

Figure 14B:
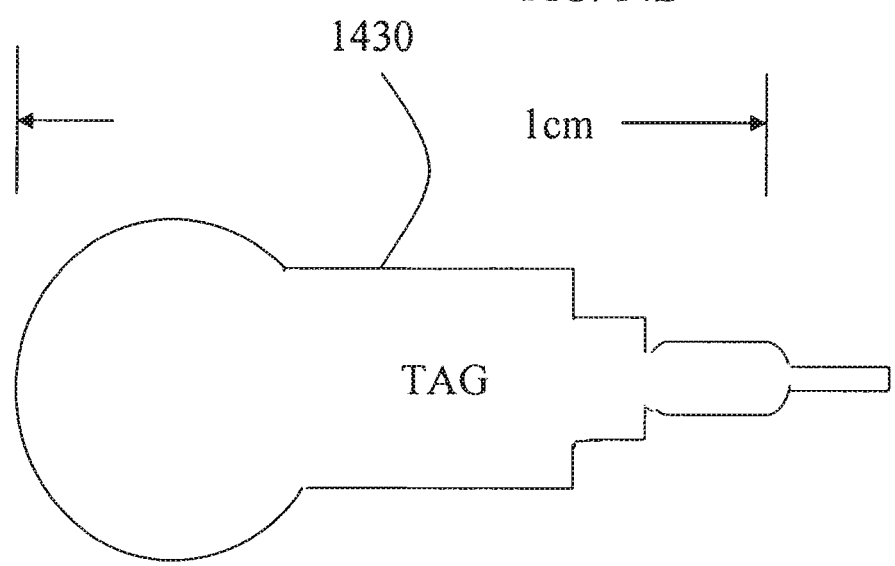
FIG. 14B is a photograph of a VHF "beacon" transmitter mounted on a dragonfly, functioning as a telemetry tag to track dragonflies in flight.

FIG. 14B shows a small tag. Such a telemetry tag may be used to track dragonflies in flight. Dragonfly tags, made by Sparrow Systems Inc, have been used to track migrating dragonflies for time lengths up to about a week. They use a relatively low (165 MHz) telemetry frequency and have a range of over a kilometer when the dragonfly is in the air. They need a thin wire antenna about 2 inches long, perpendicular to the fly's body to attain this.

Figure 15:
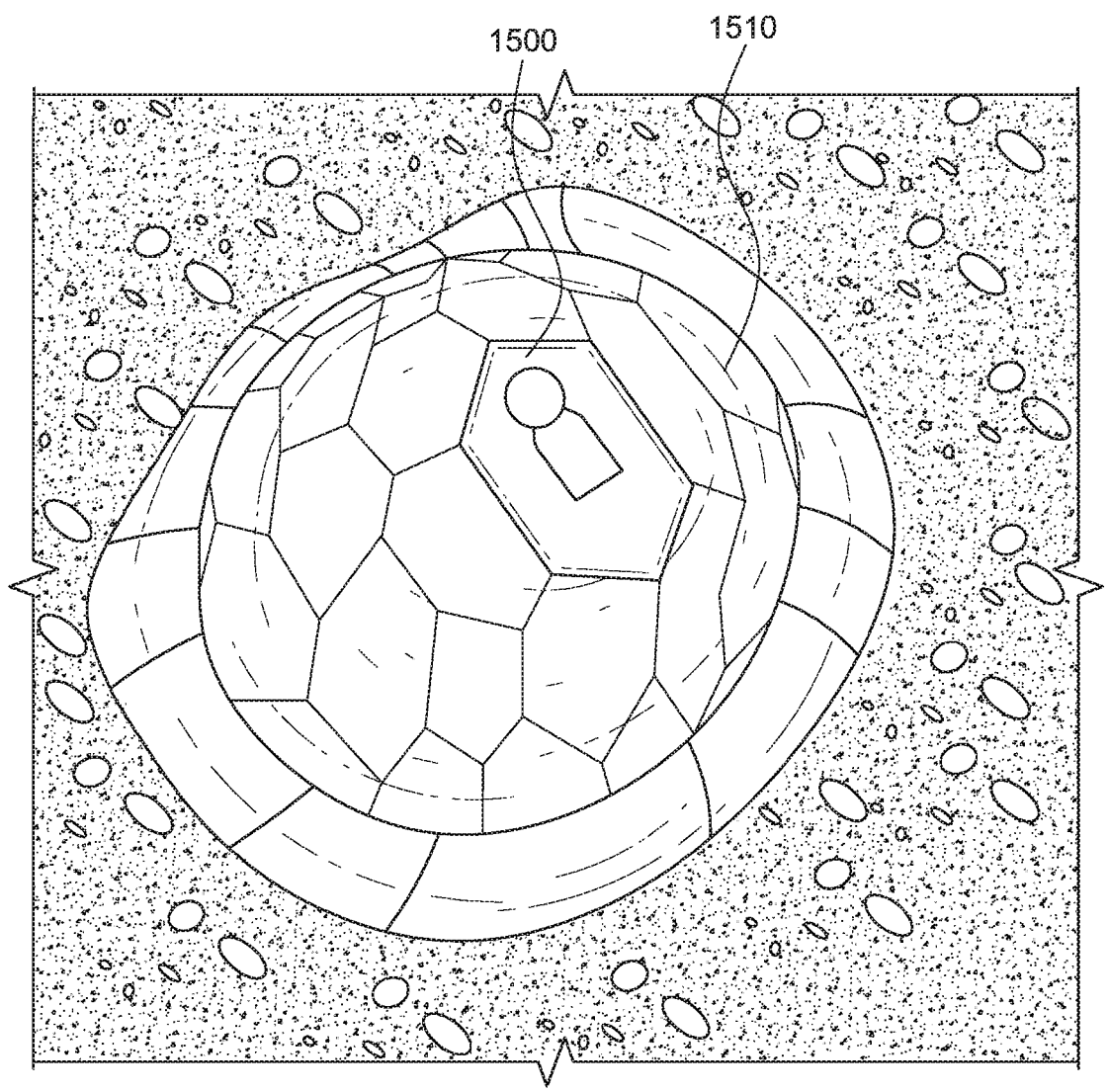
FIG. 15 is a photograph of a mock-up patch-like tag on a juvenile desert tortoise shell.

FIG. 15 shows a mockup of a tag on a tortoise in a desert environment. The tag 1500 fits over a scute of a juvenile tortoise 1510 (for this photo a tortoise shell is used as well as the sand, gravel and small rocks are commonly found in a "close range" desert environment) and setup for this demonstration photo.

FIGS. 16A, 16B show a combination of several RF modules to create a multifunctional tag with RFID and Harmonic Radar capabilities. The following diagrams depict inventive designs that would fulfill the requirements for tags that could be mounted on small (and growing) juvenile desert tortoises, and would meet the necessary conditions of size, weight, performance and durability required for the tracking and censusing project that led to this invention development. The requirements include:
A Detection range of 1 KM
Location to an exact point during survey
Unique ID for a population under 1000
Acceptable to use multiple ID technologies/location methods or multiple tags on one animal
A Tag weight of less than 2.5 grams
A Tag operation of at least 1 year with no servicing
The tag must stay on the animal as it grows The next diagrams describe various approaches, methods and components to providing the required tag for the tortoise example. Providing a general purpose tag for small animal, large animal, object and asset location may use any of the features described in the present invention, as well as other features appropriate to the size and shape of the animal or asset to be tagged and tracked.

FIG. 16A shows HARMONIC RADAR AND RFID WITH SAME ANTENNA:

A combination of several RF modules to create a multifunctional tag with RFID and Harmonic Radar capabilities. Prior art had demonstrated 16 mm long wire/diode tags that could be mounted on flying insets, but could not provide individual ID, and further required kilowatts of power in a radar beam at 9.3 GHz directed primarily above the ground surface (and to some extent also above foliage cover). For implementation of the same concept on ground-living tortoises, the long range detection goal could not be achieved because of ground absorption of the signal and possible interference with the harmonic generated by the tag on account of semi conductive mineral objects on the ground substrate which could also generate harmonics. However, it is anticipated that medium range (10 meters to 30, and possibly up to 100 meters) detection and location range can be achieved with longer wavelength signals at lower powers (i.e. 900 MHz-2.4 GHz fundamental frequencies). To add individual ID capability to a harmonic radar tag the present invention provides: ANTENNA 1600 is a dipole or patch or bowtie (or other form) of antenna that can receive the incoming signal at fundamental frequency, and which can contain a microwave (and/or schottky) diode in the geometric middle or other viable geometric section of the antenna so that the antenna can re-radiate the second harmonic of the incoming frequency when it (the incoming power at the incoming frequency) contains sufficient energy to drive the diode into its nonlinear conductivity region.

NON-LINEAR DEVICE 1610: the nonlinear device may be a microwave or schottky diode, or in general any electrical component that has a strong nonlinear response at a relatively low power input. A pair of diodes may also provide a nonlinear, but symmetric transfer function. 1620 RFID CIRCUIT connected across, for example, a single schottky diode may be an RFID circuit (either passive, semi-passive, semi-active, or active) that is activated either at the same input power level as the nonlinear divide in the case of battery or other "assisted power" RFID circuit, or at a higher power level in the case of a passive RFID circuit, and which modulates an individuating code or other signal either as a secondary modulation of the harmonic generated by the nonlinear device, or as an additional signal to the nonlinear device-generated signal.

FIG. 16B depicts an RFID device in parallel with a harmonic radar tag. The harmonic radar tag functions as usual, providing second harmonic energy across the two quarter-wave sections of a half-wave tuned antenna. When the RFID device functions (either passively, as the energy level of the signal allows a sufficient DC potential to develop in a circuit across the diode and power the RFID circuitry or semi-passively or semi-actively in which the signal across the diode provides a "wake-up signal to a battery or solar powered RFID device), it may for example close a switch according to a predetermined ID code sequence. The switch may provide a relative short circuit across the diode for brief time periods, allowing the reflective second-order harmonic signal to be modulated by the RFID code (while still allowing enough power to remain in general across the diode circuit to keep the RFID device activated or powered.

DIPOLE ANTENNA 1630: Preferably tuned to resonate at the chosen transmission frequency band (for example 902 to 928 MHz for UHF or 2.45 GHz for microwave tags)

RFID CIRCUIT 1640: May be any type of circuit design that either derives power from a signal impressed across the diode, or that is appropriate for the generation of harmonics when driven above its nonlinear threshold SCHOTTKY DIODE 1640A: Passively powered and is activated (or "awakened") by the electrical signal across the diode received by the DIPOLE ANTENNA 1630

FIGS. 16C, 16D show a carrier signal that is seen in the data stream as a series of on and off periods if the diode is open circuited, or a full sine wave if the diode is short-circuited by a shorting switch across the diode terminals within the RFID circuit, as known in prior art RFID circuits.

Figure 17A:
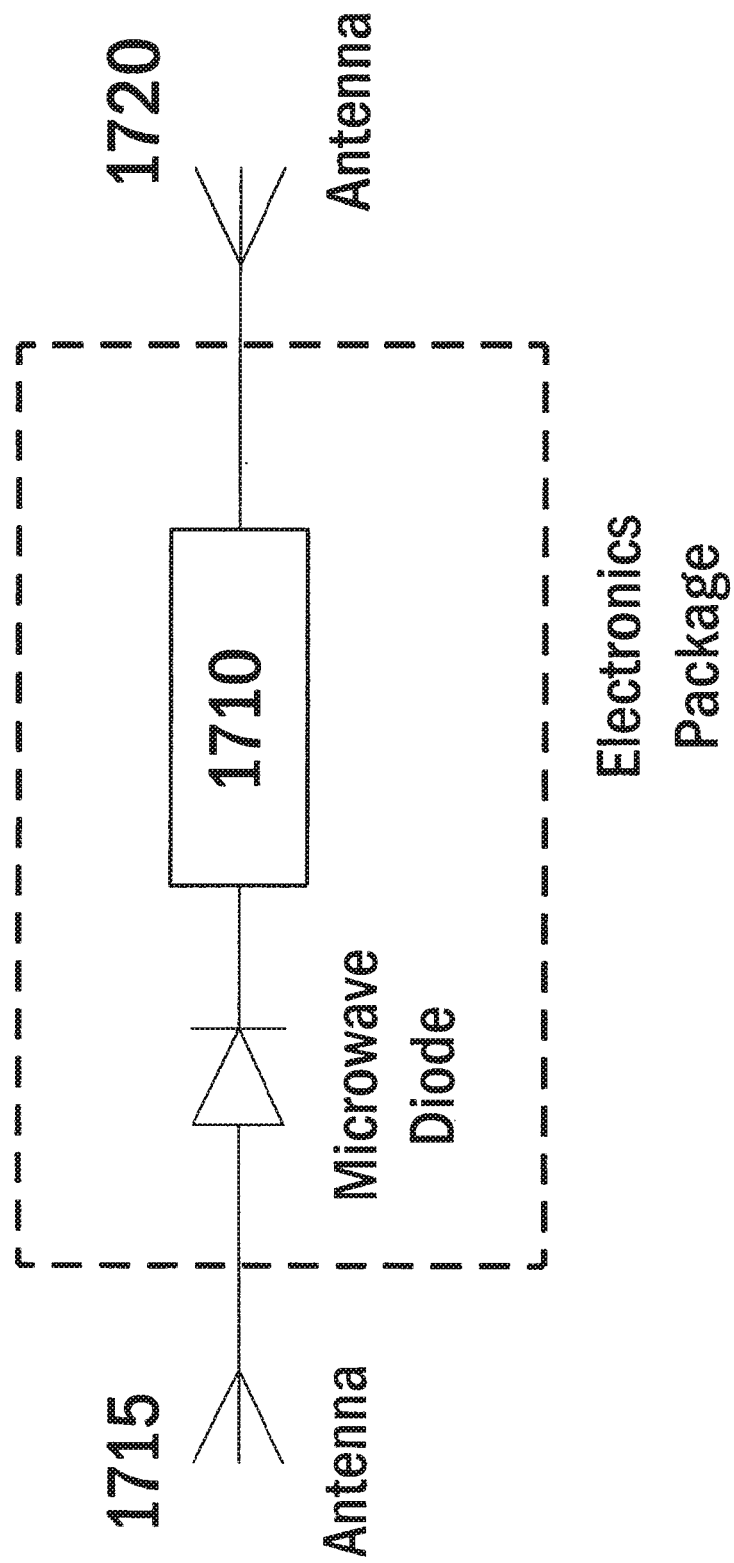
FIG. 17A is a diagram of a "series" version Harmonic Radar, RFID tag.
Figure 17B:
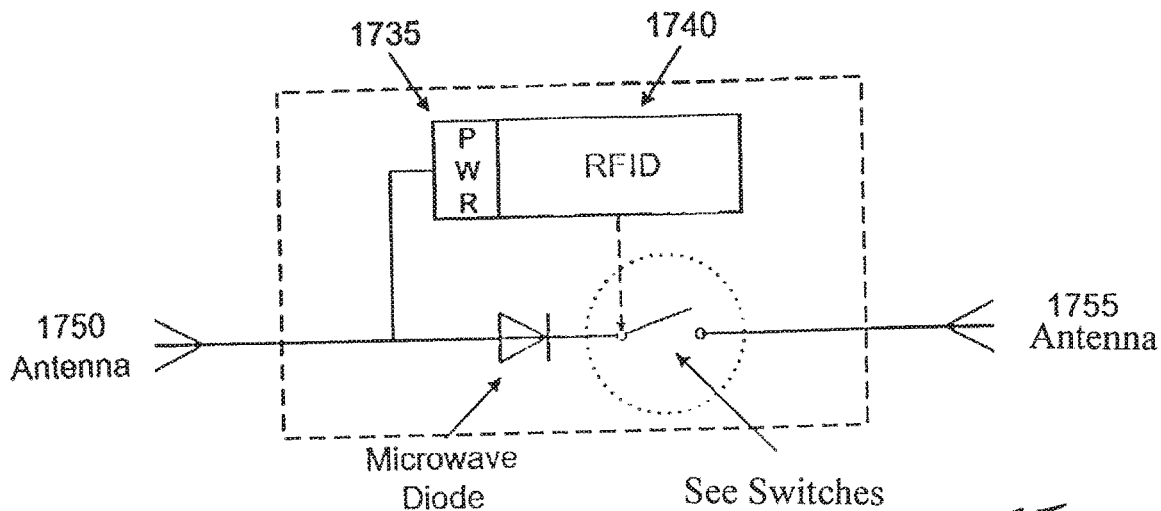
FIG. 17B shows an internal system structure for an RFID tag which employs a "switch" to modulate the harmonic radar diode output by "ON-OFF" keying.

FIGS. 17A, 17B show an embodiment of a series version tag. SERIES VERSION TAG 1700 is simply another version of an RFID plus harmonic radar tag.

DIODE 1705 is in series with RFID circuit 1710. It is assumed that the RFID circuit presents a "switch closed" circuit at least until it is activated by the increasing DC voltage developed across its terminals by the increasing signal to the diode through ANTENNA 1715 and ANTENNA 1720 to develop a DC voltage across the terminals of 1710. These antennas may be two quarter-wave sections of a half-wave dipole antenna, or alternatively any other configuration that is capable of absorbing and emitting RF energy at the transmission frequency and its second harmonic (twice the transmission frequency) or a higher harmonic, or a harmonic series.

SERIES SWITCH MODEL TAG 1725 depicts a typical embodiment of an RFID circuit that might be used with either the serial connected tag 1700 or with the parallel tag shown in FIG. 16B.

Figure 17C:
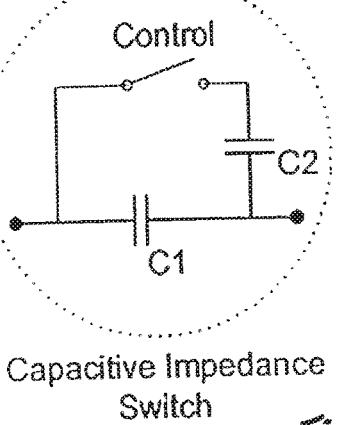
FIGS. 17C-17G depict various switching configurations that may also be used to enhance transmission and stability properties of the tag.
Figure 17D:
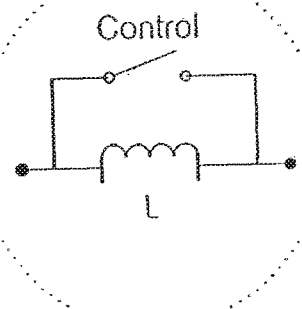
Figure 17E:
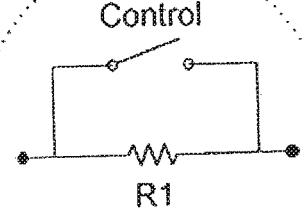
Figure 17F:
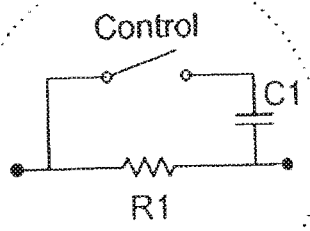
Figure 17G:
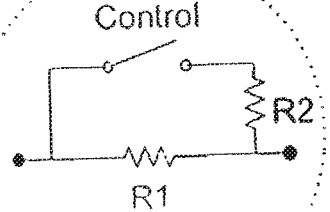
Figure 18A:
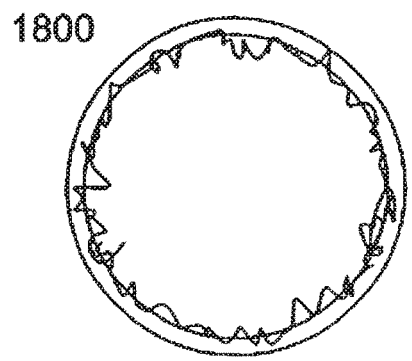
FIGS. 18A to 18E are diagrams of "RING" tags in alternative versions of type and complexity from "resonant rings" to semi-active harmonic RFID radar tags.
Figure 18B:
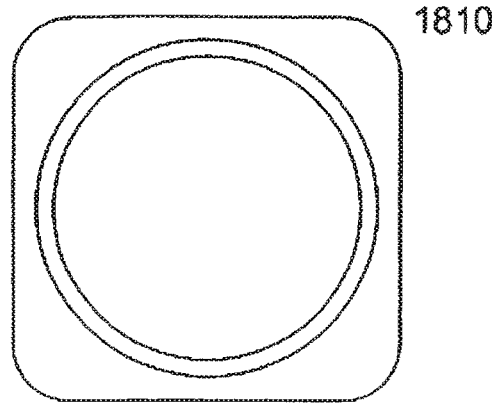
Figure 18C:
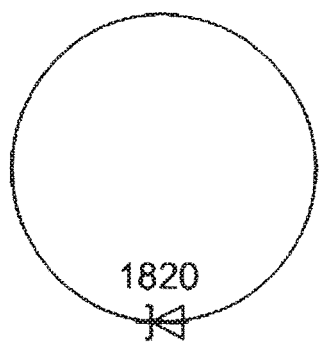
Figure 18D:
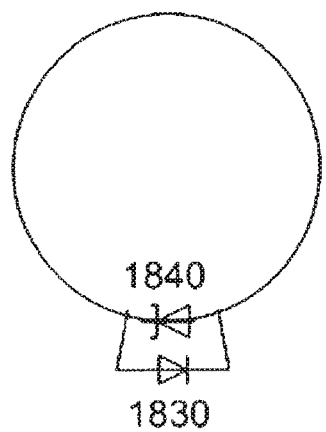
Figure 18E:
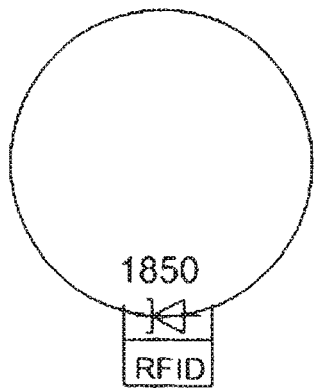

DIODE 1730 is connected between the two parts of a halfwave antenna (ANTENNA 1750, ANTENNA 1755). The SWITCH 1745 in series (or alternatively in parallel as in FIG. 16) with the diode is actually the "Modulating element" of the RFID circuit, and can take numerous alternative forms. The RFID element depicted here essentially consists of three parts: power supply 1735, RFID circuitry 1740 and modulation switch 1745. The power supply is developed from DC voltage stored from the rectified AC voltage, in this case rectified by the microwave diode Likely the RFID tag may have an additional diode or diode bridge or equivalent, and capacitor in the power supply so that at low level signal inputs it does not load the microwave diode (because its own diodes have a higher threshold voltage) and in that way does not diminish the range of communication for the harmonic radar localizing circuit. The RFID circuitry consists of at least a clock signal extractor or generator, a counter, a memory circuit and an output to the modulating circuit (being controlled by the code in the memory as accessed by the counter). The modulating circuit is simply a switch (with some intrinsic switch resistance). Other more complex modulation circuits employ a switch and some other components. For example, FIG. 17C shows a switch "control" and a capacitor C1 in parallel with another capacitor C2, functioning to change the effective series capacitance according to the RFID signal. FIG. 17D Contains a switch "control" 1770 in parallel with an inductor circuit L, providing a shorting of the inductor in accordance with the RFID circuit. FIG. 17E likewise provides an incremental resistance change by switching "control" to short resistor R1 in series with the diode. Thus, FIG. 17E simply shorts a resistor by the incremental resistance of the switch. FIG. 17F switches "control" a capacitive reactance C1 in parallel with a resistor R1. FIG. 17G switches "control" a resistor R1 in parallel with another resistor R2. These and other circuits combing solid state switches with other electronic components may be used to optimize a particular RFID tag circuit for the most appropriate modulation of a reflective tag impedance at a given frequency and for particular types of RFID reader signal acquisition and analysis circuits.

FIG. 18 and its counterparts make use of a circular "ring" type antenna, generally used at microwave wavelengths. In FIG. 18A a simple conductive ring 1800, will resonate at an RF wavelength corresponding to its circumference and can produce a damped exponential waveform in response to a strong pulse waveform from a reader antenna. The diameter could be varied by definite steps to provide a small amount of frequency differentiation for identification of a small population of objects or animals. In FIG. 18A, conductive ring 1800 might be adhered to or deposited on a passive substrate 1830, or alternatively a piezo ceramic substrate 1820, or piezo film flexible 1810 to provide additional reaction to an input pulse. This is achieved by the resonance of the ring providing mechanical deformation of the piezo substrate or the current/voltage around the ring providing piezo electric deformation on the substrate and thus generating additional voltage as a result of the interaction. In FIG. 18C, a diode 1820 inserted within a break in the conductive ring 1815 may produce a second harmonic ringing output in response to a pulse input at the ring's fundamental resonant frequency. FIG. 18D uses two diodes, 1830 and 1840, in opposite directions to maintain AC conductivity of the main ring antenna while still producing harmonics due to the diode nonlinear characteristics. FIG. 18E utilizes a diode-harmonic reflector "ring" antenna 1815 and passive or active RFID circuit 1850 in the same manner as the circuits of FIG. 17, but in the context of a ring antenna.

Figure 19:
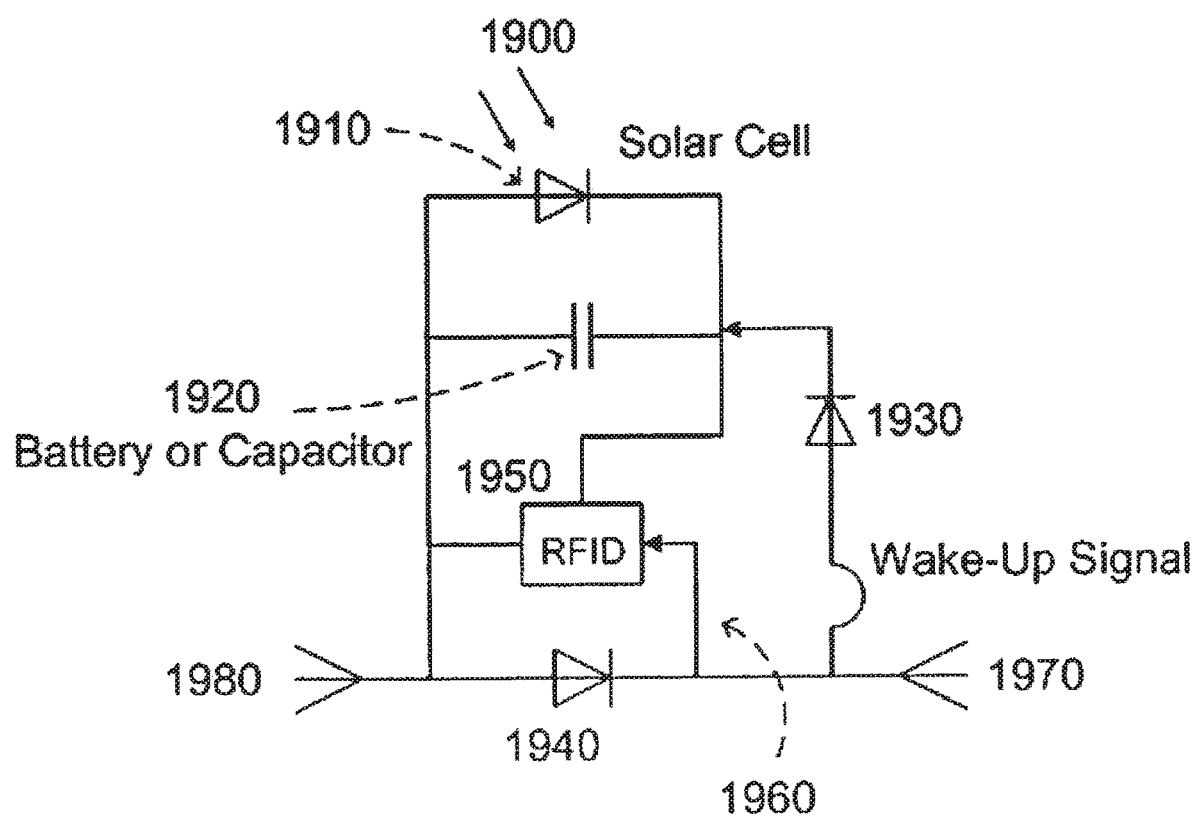
FIG. 19 is a diagram of an energy harvesting Harmonic Radar/Semi passive RFID tag with wake up signal circuitry.

FIG. 19 depicts a semi-passive, semi-active or active RFID tag in connection with a harmonic radar tag. Antennas 1970 and 1980 provide resonant response at a fundamental frequency and the second harmonic of the fundamental frequency. Microwave diode 1940 provides harmonic output at the second harmonic when activated. The remaining components provide various methods of delivering power to an RFID circuit 1850, which may operate in a "reflective" manner as described in FIG. 17 either "passive" if the RFID tag derives all its energy from the externally induced signal, or "semi-passive" if the tag has its own separate energy supply, but still operates by load switching across the diode. 1960. Additionally, the RFID section may operate in various "active modes" that may add energy to the resonant circuit according to the RFID information, and/or also through terminals (s) 1960.

For powering the RFID tag, the energy from the diode circuit may be used as in the purely passive RFID case, but in addition the RFID circuit may be powered for example by a solar cell charging a capacitor or a battery. A strong field at resonant frequency may also charge the capacitor or battery through diode for extended useful operating life 1930. When sufficient input signal is detected, a wake-up signal 1960 activates the RFID tag (without drawing any power from or limiting the effectiveness of the harmonic radar tag). The existence of the signal allows the self-powered RFID tag to produce an RFID function. It may modulate the second harmonic generated by the diode, or in addition may add a powered signal to the terminals across the diode, transmitting an RFID signal with much greater range than would a passive RFID tag, and possibly greater range than would the harmonic radar tag.

In such a case, the signal generated by the microwave diode would allow for a much wider range of RFID detection once the tag is activated by a microwave signal. The power for the semi-active or semi-passive circuitry may come from a SOLAR CELL 1910 charging a capacitor or secondary battery 1920. In addition, a strong RF signal received at the antenna 1970 may flow through charging diode 1930 to re-charge the battery. This is only likely in a situation in which strong RF energy is beamed to the antenna AFTER detection of the tag by harmonic radar output, or after the tag has been located and accessed to charge the battery from a short distance with a strong local RF field.

SAW Tags and SAW Tag Combinations

Harmonic radar devices have been explained in some detail above, however another class of devices exist that need to be mentioned. These are SAW ID tags. SAW or Surface Acoustic Wave tags are based on the properties of piezo electric crystals (and likely other piezoelectric materials. If a piezoelectric crystal is stimulated with an electrical pulse signal, the dimensional deformity produced by this travels down the surface of the crystal as an acoustic wave. Upon meeting an electrode spaced along the crystal, an electrical impulse is generated with a time delay corresponding to the speed of sound on the material and the distance traveled. A pattern of electrodes at different lengths along the crystal would yield a pattern of electrical pulses at time delays corresponding to the arrangement of the electrodes. This phenomenon may be used in an identification/location device by adding a resonant antenna to contact with the exciting terminal and the responding terminals along the piezo crystal. This provides an interesting kind of ID/location tag since there is really not an electronic circuit (in conventional terms) to be powered by a minimum power level transferred to the device. Essentially this means that the range of activation and response of a piezoelectric tag is only dependent on the signal-to noise ratio of the antenna and amplifier of the receiving antenna and/or the magnitude of pulsed fluid allowed by regulations or attainable by power input into the transmitting antenna. The transmitting and receiving antennas may be the same antenna, and the lack of interference between an outgoing pulse and the incoming pulse (delayed by distance traveled to and from the tag) incoming pulse allows for single antenna operation as well as very accurate radar-like distance estimation. Combinations of Harmonic radar and SAW tags in combination, in much the same way as harmonic radar and RFID tags in combination. And even combinations of all three technologies (Harmonic, SAW, RFID) on a single tag are contemplated.

Figure 20C:
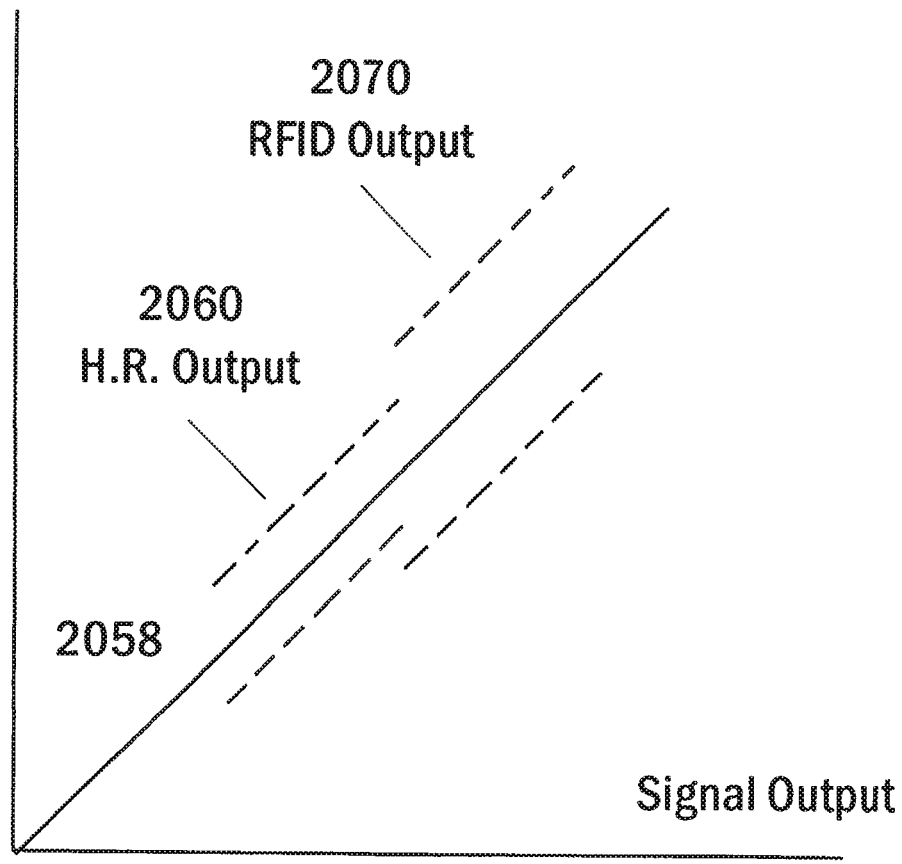
FIG. 20C shows a diagram of tag signal output vs. activating field input.

FIGS. 20A-20C show an embodiment of a harmonic RFID radar tag which uses transformer coupling to achieve the RFID effect.

Shown in FIG. 20A is a HARMONIC RADAR RFID AT UHF OR ABOVE which consists of: HARMONIC RADAR TAG 2000, made with microwave diode 2005 and possibly an additional tuning impedance at the midpoint (NOT NUMBERED), and a half-wave 2006 antenna at microwave or UHF fundamental frequency functioning as described earlier in this disclosure. Additionally, FIRST INDUCTOR 2010 has two terminals connected across the diode terminals where the antenna joins the two terminals of the diode. Inductor 2010 may have the combined function of providing resonant tuning of the antenna (in connection with the intrinsic capacitance of the microwave diode, but which also has a second function as the primary of a transformer operating at the fundamental frequency or alternatively at the second harmonic frequency. The SECOND INDUCTOR 2015 provides the secondary inductor of a transformer made up of 2010, 2015 and their mutual inductance and turns ratio. This provides an electrically decoupled, but reactively coupled, source of energy or signal for RFID tag 2020. RFID tag 2020 may be either active having its own power (solar cell, battery, etc.) or passive (i.e. it may or may not have a source of electrical power separate from the energy transmitted to it through the transformer formed by 2010 and 2015). The harmonic radar tag is designed to transmit a harmonic signal when activated by a UHF or microwave incoming signal, and provide a detection signal (without identification) at maximum distance dictated by the optimized design of the harmonic tag 2020. The RFID tag, if passive, may function at a closer range when supplied with excess energy from the microwave diode, either at the fundamental frequency or the second harmonic or both, as design options. This extra energy may be in the form of a DC polarization across the diode terminals or excess AC voltage across the diode, or both. A passive RFID tag would in the schematic shown, be powered by AC signal received at the transformer secondary 2015 through terminals 2021 and 2022. Additionally the RFID tag, if active, may begin transmitting an RFID signal and/or modulating the second harmonic from the microwave diode as soon as sufficient signal is detected through the transformer to "wake up" the active tag. In the case of a "step-up" transformer where the turns ratio of coil 2015 to 2010 is significantly greater than one, it is possible that the RFID tag (especially if it's active) may function as soon as the microwave diode produces enough signal to "wake up" the active tag. Other design options are also possible as may be obvious to one skilled in the art.

FIG. 20B shows an example embodiment of an RFID tag 2050. Terminals 2021 and 2022 are connected to the terminals of the secondary coil of the UHF or microwave transformer 2020. Alternatively, in a non-inductively coupled version, the terminals 2021 and 2022 may be connected directly across the microwave diode terminals 2005 directly or for some embodiments, or through one or more capacitors (not shown). Within the RFID tag 2050 (which may be an example of RFID 2020 of FIG. 20A), for example, a bridge rectifier made of diodes 2025, 2026, 2027, 2028 (or other rectifier circuits used in prior art RFID tag circuits which involve FETS connected as rectifiers in place of two or more of the diodes) provide a rectified full-wave DC output derived from the signal input.

It should be noted that the design of the rectifier circuit can be utilized differently for an active or a passive tag. For example, in a passive tag the sum of the voltage drops for activation of the full wave rectifier circuit will be significantly higher than the voltage necessary to create second harmonic radiation by the microwave diode 2005. This voltage margin will allow the RFID tag circuitry to be negligible as a load on the microwave harmonic radar tag until the signal strength has risen to a point where the diode bridge turn-on voltage is activated. For this reason the harmonic radar tag retains its greater range of operation and detectability and the RFID function turns on at a higher signal input (closer range). A similar function may be provided by a single diode RFID rectifier, in which the harmonic radar tag diode is a schottky diode and the RFID tag diode is a silicon diode, with a significantly higher turn-on voltage than the schottky diode. The identification function of the RFID tag begins to operate when the tracking antenna has come closer to the harmonic tag. The signal level transmitted to the tag by the external reader/locater may be increased upon detection of the locating second harmonic signal from the microwave diode, in order to activate the RFID function at a further distance then if the transmitted signal were held constant.

In the passive RFID tag, charge is accumulated across capacitor 2035, or in an active tag the excess energy from the diode bridge may be used to charge 2035 if a rechargeable battery is used instead of a capacitor (BATTERY 2035). In either case the terminals of 2035 are connected to supply power to the RFID circuit. One of the lines connecting terminal 2021 or 2022 to the RFID circuitry may supply the RF signal as a clock signal, or the RFID circuitry may develop its own clock signal as known in prior art. Likewise, the voltages output of the diode bridge or other rectifier circuit may provide a threshold signal to wake up or turn on the modulation function of the ACTIVE RFID circuit, rather then just supplying power (to a passive RFID circuit.
RFID CIRCUITRY 2040:
RFID 2050 is an EXEMPLARY CONFIGURATION OF RFID 2020. Through terminals 2042 and 2041 the RFID circuit may either switch a load in and out across terminals 2021 and 2022, or, in an active tag, an RFID circuit may also provide an active RF modulated signal to terminals 2021 and 2022, and thus through to the antenna 2006 to achieve greater operating range for reception of the RFID signal.

FIG. 20C depicts a graph of one possible mode of operation of a combined harmonic radar/RFID tag. The vertical axis depicts the ACTIVATING electromagnetic field input from a reader to the tag antenna or in the region of the tag, while horizontal axis depicts, qualitatively, the type of signal output from the tag. At very low signal input levels, region 2058, the tag is basically inactive. It might backscatter an incoming radar signal at its fundamental frequency as an ordinary radar reflector. As the field intensity increases, the microwave diode is activated to its nonlinear conductive region and the second harmonic signal is transmitted along with the reflected fundamental frequency signal giving the harmonic radar tag function range (2060). As the input field strength becomes stronger, the RFID section of the tag begins to operate either passively (or actively. This may dramatically change the relationship between the start of harmonic radar tag function and RFID function.) Then the RFID tag signal output region 2070 is achieved, and the tag may provide both identification and location information by modulated backscatter of the second harmonic or an actively transmitted RFID signal at the same or different frequency.

Figure 21A:
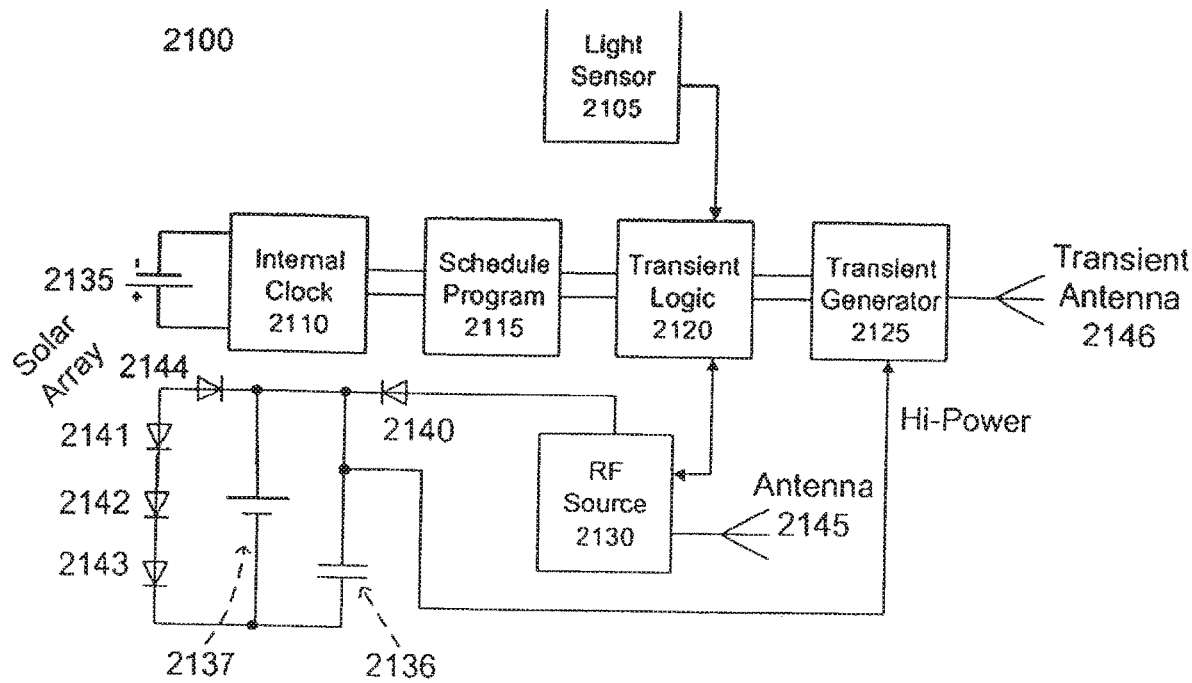
FIG. 21A is a diagram of a "scheduled" transmitter tag.
Figure 21B:
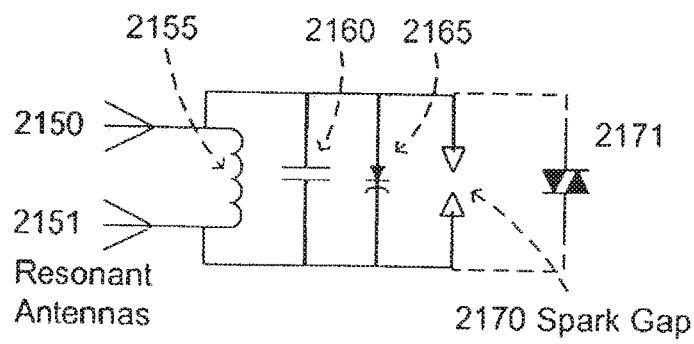
FIGS. 21B and 21C are diagrams of energy harvesting passive "flashbulb" tags.
Figure 21C:
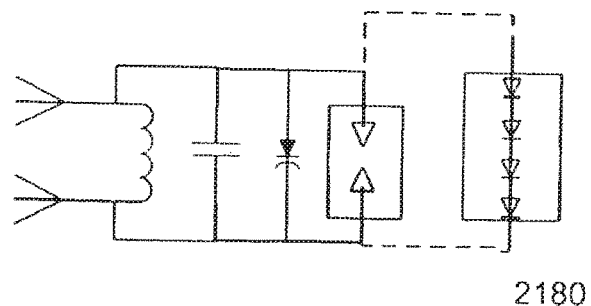

FIGS. 21A-21C shows an example embodiment of a scheduled transmitter tag. Many options for design embodiments exist for this architecture, and it is noted that the embodiments of FIG. 21 represent only three examples.

In FIG. 21A, the general architecture for a scheduled tag is depicted.

Scheduled transmitting tag 2100 is a tag that contains an internal clock circuit, or perhaps another type of sensing or timing circuit, that defines a calendar and/or clock function for the possibility of operation of the tag. The term possibility is stressed since the "schedule" may only define calendar or clock schedules when the tag MIGHT be operational. In one embodiment, the tag would function whenever the schedule allows operation, in another embodiment, the tag might function when the schedule allows operation and an activating signal is sensed by the tag. In yet another embodiment the tag might function when the schedule allows operation and there is sufficient sunlight or other ambient power available to activate self-powered operation without power drain on the clock/calendar battery. In this case, the tag might transmit a BEACON signal periodically (independent of receiving any activating signal from a reader) as long as the sunlight allows self-powered functioning. In another embodiment the tag may work as in the first three descriptions but may also be forced into operation by an "emergency wake-up" signal even if operation is not scheduled and even if internal clock/calendar battery is used.

The main idea of the schedule is to save tag energy for time periods when it is known that a survey of tags may be conducted, or to prevent operation when it is known that animals such as tortoises would be in places inaccessible to light for powering solar cells and in bad locations for location and ID transmission, etc., i.e., that a successful communication would not be possible.

The primary elements of a scheduled-operation tag are primarily a clock/calendar self-powered by an ultra miniature (and/or flexible thin), long lived battery. The power consumption of the clock/calendar must be minimized to the extent possible by numerous techniques known in the art. The battery must likewise have as high a charge capacity as possible for the size allowable in the tag design. Simple LCD watches have been known to last many years on a single battery, and this includes (at least) driving a small LCD display. The calendar circuitry mentioned here would not even have to expend display power, it would simply count time and turn a CMOS switch "on or "off" at specified times of the day, week, month and/or year. The programming or reprogramming of the calendar schedule memory could be done electrically or electromagnetically from close proximity at deployment, or upon a re-capture-release cycle during census periods in a scientific study. The clock 2110 uses a low-frequency crystal 2134 for timing accuracy, though other clock-signal elements might also be used, and the clock supplies time/date to schedule program memory 21151. Assuming the schedule has been set appropriately, when scheduled operation is indicated, the conditional operations of the tag are then activated by environmental sensors to further validate the option of expending energy from any of the tag energy use systems. Light sensor 2105, which could be either a solar power cell or a conductive light sensor, might enable a "transient logic" section 2120 if the sensing of light indicates the tortoise is above the ground, on a sunny day, and not under a deep cover of bushes. Is the transient logic is enabled by both the light sensor and the schedule program, then the tag is "armed" to transmit a "beacon signal." In this example the tag is also equipped with an RF receiving antenna 2145 which might also function as a transmitting antenna.

A secondary power source in the tag may be either a re-chargeable battery 2137 and/or a capacitor or supercapacitor 2136. This power source may be charged possibly by a Solar Array 2141, 2142, 2143 through a rectifier diode 2144, or by DC energy RF field through RF antenna 2145 and RF-to-DC converter 2130. When sufficient power is accumulated within power storage elements 2137 and 2136, the tag is then switched into a "signal transmit" mode. Power supplied to the TRANSIENT GENERATOR 2125 is enabled by the TRANSIENT LOGIC to be switched as a high-current pulse into the TRANSIENT ANTENNA 2146. The transient antenna is a high-Q resonant antenna which emits a "ringing waveform" exponentially decaying electromagnetic field into space at the antenna's resonant frequency. This might be in response to an interrogating signal received by the ANTENNA 2145 from a reader searching for tags; or it may be generated independently as soon as sufficient energy is available. Additionally, a succession of pairs of transient pulses with definite programmed time-delays between each pulse of the pair (generated by the transient logic) may enable an identification of the tag by the time-delay between the pair of pulses, differently coded for each tag in the population. The time length between each pair of pulses would be long in comparison to the time length of each pulse of the pair, thus creating a series of self-identifying "ringing" transient wave forms for the tag when it is scheduled, activated by favorable external conditions, and interrogated by a reader within operating range of the tag.

FIG. 21B
2150 RESONANT ANTENNA
2151 RESONANT ANTENNA
2155 INDUCTOR
2160 CAPACITOR
2165 RCSE
2170 SPARK GAP
2175 DIAC
FIG. 21C
2180 PV CELLS

Figure 22:
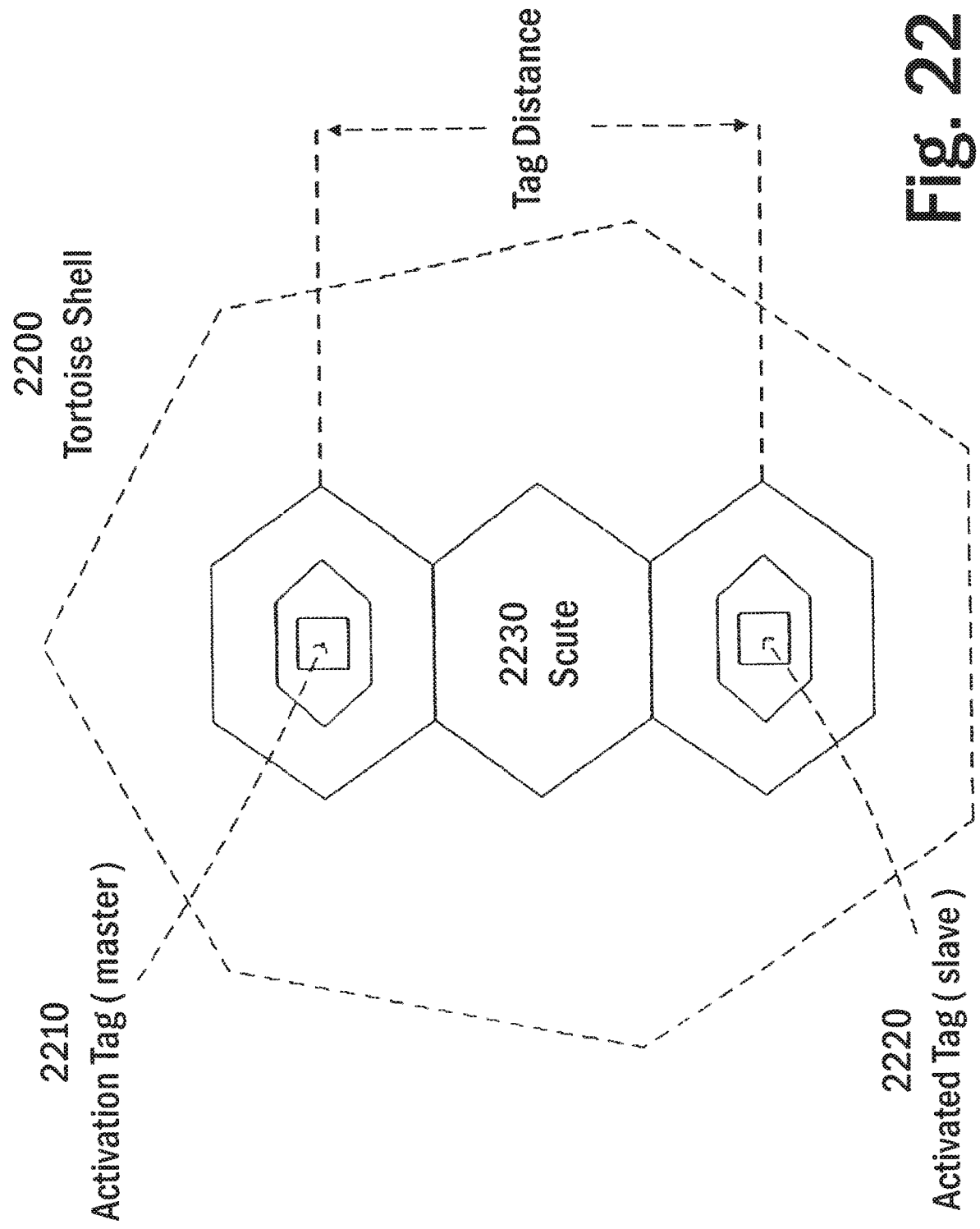
FIG. 22 is a diagram of two patch transmitter tags on a tortoise shell showing a synchronized resonant antenna system with transmitters on different scutes.

FIG. 22 shows a synchronized resonant antenna with transmitters on different scutes. Two or more tags are mounted on the tortoise shell 2200. Of these tags, the 2210 ACTIVATION TAG may be a scheduled tag as mentioned earlier, or simply a tag that can sense and respond to an interrogation of "wake-up" signal from a reader or interrogation device. This activation tag may be passive, semi-active or active, and may be powered by signal from the reader, or external energy such as sunlight or an internal battery or a combination. The Activation tag outputs a signal which may be a beacon signal, a "flashbulb" type signal, and may or may not have ID information encoded in it.

The activated tag 2220 responds only to the signal generated by the Activation tag, in determining the frequency and timing of its output signal. It may, like the activation tag, be passive, powered by sunlight etc, or battery powered. The purpose for having an activator tag and an activated tag is to increase the signal level and the directional coverage of the ID signal emitted by the tags on the tortoise. Each tag is mounted on a different scute 2230 on the tortoise, and assuming that the wavelength of the RF frequency emitted by the tag set is significantly larger than the distance between the two tags, the signal will have more omnidirectional coverage and power than would the signal from a single tag. The activated tag derives its clock frequency and transmission timing merely by picking up the signal transmitted by the activation tag and "repeating" it by any appropriate circuit/system means.

FIG. 23A-23D show example embodiments of a scute tag, i.e. an RF tag that is appropriately sized and shaped to fit on a scute of a juvenile desert tortoise. Other tags of similar design that different in size, shape, height or other aspects may be assumed to be obvious to use on other animals, objects or assets.

FIG. 23A depicts a scute tag which has numerous components and radiating elements mounted on it and attached to it. RFID CHIP 2300 is mounted on 2310, a conductive radiating element of a patch antenna. Cover 2305 for chip 2300 protects the chip from the outside environment, and may be opaque or clear. If it is clear, it may function as a solar concentrator focusing light on a solar cell integral to or mounted upon the chip. The chip is assumed to be a functional RFID chip of an appropriate type as described already or subsequently. The antenna radiator element is made up of an appropriate combination of a conductive patch 2310 and a smaller "radiating" patch separated by a dielectric material from another conductive patch 2311 of a greater surface area. Conductive patch 2311 is generally defined as the "ground" terminal of a patch antenna. In addition, and taking advantage of the biological construction of the shell of a desert tortoise, a wire antenna 2315 may be attached to the top patch antenna 2310 and possibly another wire antenna 2316 may be attached to the larger "ground" element of the patch antenna 2311. This hybrid antenna can be designed so that the radiated signal would be greater than either the patch antenna or the two wires, dipole antenna(s) alone, by presently available modeling and design techniques. The wire antennas can be draped along the tortoise shell as shown in later diagrams.

Antenna 2317 is also possible as an additional radiating surface, directly inherent to the RFID chip or mounted upon it. This would make a complex antenna with three radiating surfaces as opposed to the two usual radiating surfaces of a conventional patch antenna, as well as additional wire radiators attached to terminals on the patch antenna surfaces.

FIG. 23B is essentially a side-view of the device of FIG. 23A with some additional detail. Dielectric insulation 2320 is shown between conductive surfaces 2310 and 2311 of the patch antenna. The thickness and the dielectric constant of the insulation, as well as the conductivities and facing surface areas of the two conductive surfaces bounded by the dielectric insulation are factors that determine the frequency of resonance and the "Q" or radiation gain of the patch antenna.

The tag device is attached to the shell 2325 of tortoise by an adhesive 2330. Various types of epoxy, cyanoacrilate and other types of adhesives have proved successful for long-term mounting to tortoise shells. The adhesive also has electromagnetic properties. Adhesive 2330 may be insulating with a particular dielectric constant, or conductive to a greater or lesser extent. In any case, the coupling by the adhesive of the tag, the tortoise shell scute, the body of the tortoise within the shell, and the electromagnetic "connection" between the body of the tortoise and the "ground" upon which the tortoise rests or moves; are all relevant to some extent in determining the electromagnetic coupling between the "patch" antenna (or more complex patch plus wire antenna) and the ground and surrounding near space. Consideration of the likely relation between the tortoise and this near electromagnetic environment when a transmission or data transfer takes place can be used to optimize the antenna and tags electronic design so that it performs best when the tortoise is in the most likely position to facilitate the best transmission of the signal transfer, as opposed to other possible positions of the tortoise with respect to its "near" environment.

Figure 23C:
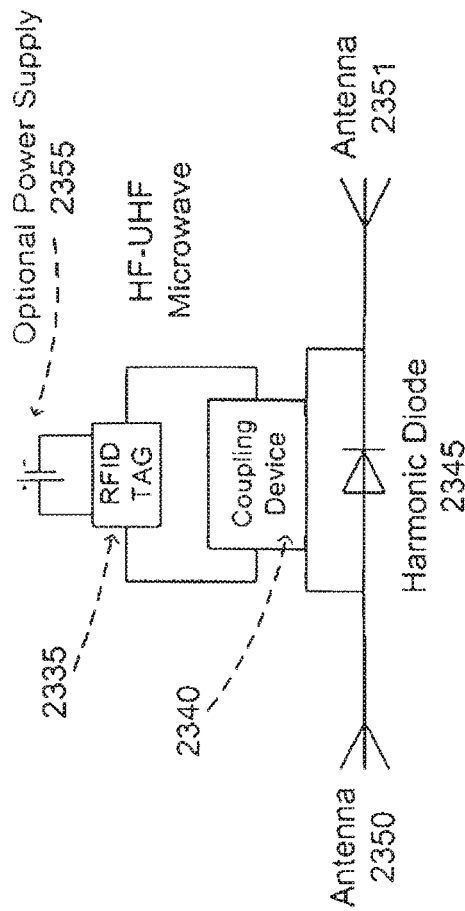
FIG. 23C is a diagram of a "patch" tag showing an example schematic diagram.

In FIG. 23C, RFID TAG 2335 is coupled by COUPLING DEVICE 2340 to be in parallel connection or coupling with HARMONIC DIODE 2345. Harmonic Diode 2345 is coupled on both sides to generally resonant antennas 2350 and 2351. The antenna structure in general is resonant at a fundamental frequency and also at twice or an integer multiple of the fundamental resonant frequency. When a signal received at the antennas the resonant frequency is sufficient to power the harmonic diode into nonlinear operation, allowing the re-radiation of outgoing signal at twice or "n" integral number of times the resonant frequency from the incoming signal. The tag then functions as harmonic radar reflector.

If the signal re-radiated from the tag is of sufficient strength to provide extra power signal to either activate or operate a passive or active RFID tag, then the tag may either send out its own separate RFID signal through either or both antennas, or modulate the harmonic signal from the harmonic diode with an RFID code across the diode to transmit a binary 0 bit or not shorting the diode to transmit a binary 1 bit, to convey the tag ID message. If the RFID tag is active or semi-active, then it is also connected independently to power supply 2355 for RFID tag. In this case the RF tag only requires the presence of an activating signal from the circuit comprised of the antennas and the diode, and may operate at, above or even below the threshold of activation of the harmonic radar tag as long as its power supply provides power for independent operation. In that case the ID tag may be assumed as simply "sharing" the antenna structure with the harmonic radar tag. To some extent the tag of FIG. 23C is similar to FIGS. 16-17 and 19-20.

Figure 23D:
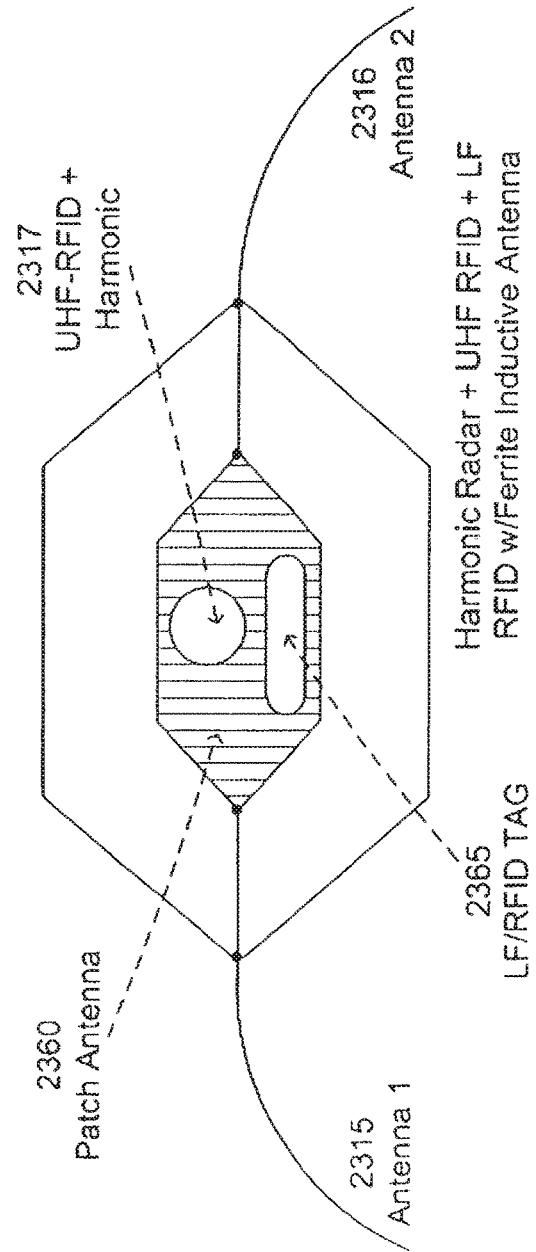
FIG. 23D is a diagram of a "patch" tag in a "triple technology" embodiment.

FIG. 23D depicts a number of identification and/or location device tags sharing the same physical package, and/or the same antenna(s). In a preferred embodiment, three tag functions share common elements of package, antenna, and electronics.

Patch antenna 2360 as described previously, may provide either or both an absorbing or radiating antenna (either or both) of a harmonic radar tags, possibly including half or quarter wave wire antennas 2315 and 2316. Antennas 2315 and 2316 may be attached to the patch antenna or may be independent of the patch antenna. The UHF RFID tag might be passive or active, and might use antennas independent of the harmonic radar tag or in common with it. In addition a LF/RFID tag 2365, a separate IC chip attached to an inductive antenna wound on a ferrite core and operating at a frequency of 125-150 KHz, may be packaged within the same scute-sized tag but be entirely independent electromagnetically and physically, in terms of ID code, of the other combined or independent UHF tag and harmonic radar tag). All, essentially, comprising a single packaged unit but up to three independent functional circuits. This synergy and redundancy can serve any number of useful purposes for long, medium and short range location/identification to increased reliability and operational lifetime. In addition, for example, the LF passive tag might be independent of the other tags, hermetically sealed and implanted within the body cavity of the tortoise to assure lifelong close range identification independent of the operation and attachment of the other tag to the scute of the juvenile tortoise.

Figure 24A:
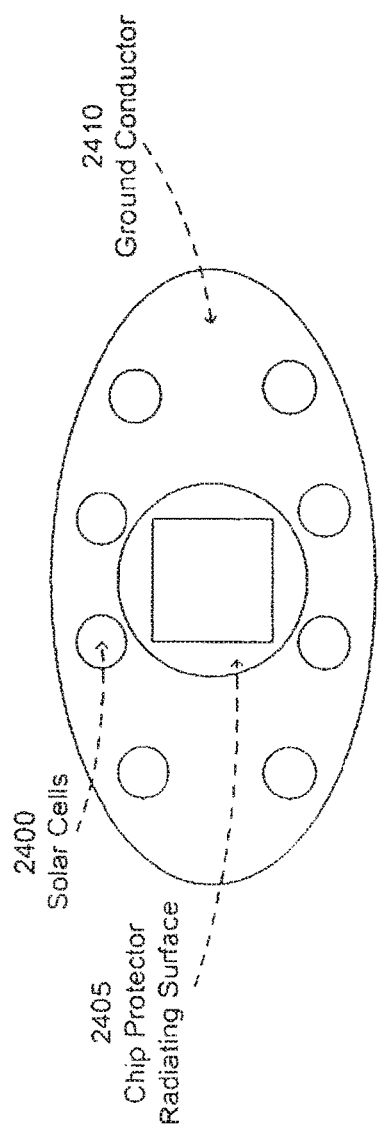
FIGS. 24A to 24B are diagrams of the solar power components mounted on a patch transmitter tag, including the tortoise as a "bio-electrical" component.
Figure 24B:
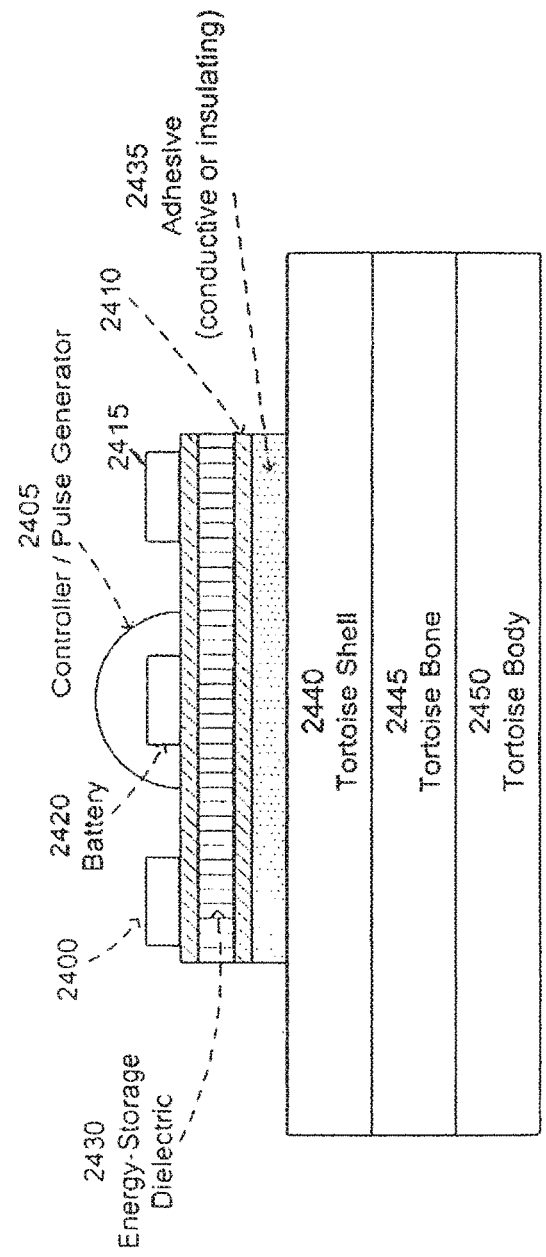

FIGS. 24A-24B show top and side views of an embodiment of an encapsulated oval shaped tag, appropriate for use with this system. The oval shape is for example only.

In FIG. 24A the oval-shaped tag has an oval shaped ground conductor 2410, an array of chip-type solar cells 2400 for solar power generation, chip protector 2405, and a radiating surface. A hemi-spherical protective cover is placed or formed over the main control/communications chip 2415, located nominally in the center of the tag structure and positioned on top of alternative energy storage and other layers of the vertical structure of the tag. This chip optionally has RFID active and/or passive function. It may have an antenna surface integral to the chip. It may also have photoelectric and or infrared sensing/power generating surface. The Chip protector/radiating surface may be transparent, translucent or opaque, or may admit infrared light but not visible light. The surface may be an insulating dielectric or may have an insulating inner section and a conductive surface layer for radiating signal energy. For any tag design, the safety of the tortoise is preserved by having the heat absorbing properties of the tag surface roughly equivalent to the area of the scute that it covers.

FIG. 24B is a horizontal view, showing the stacking of various components, substrates, etc. Controller/pulse generator chip 2415 can be multifunctional in any number of ways described in this disclosure or known to present art of RFID chips and/or radio transceiver chips. Chip 2415 may receive electrical power from the solar cells 2400, which may or may not charge a BATTERY 2420, a primary or rechargeable battery mounted underneath the controller chip. Miniaturized thin batteries are known to present art.

Multi-resonant patch antenna 2425 may be a combination of a number of conductive, insulating dielectric, energy storing dielectric, and antenna structures on the control chip. Thus the combination of conductive surface 2410 may serve as the ground plane. An energy-storing dielectric layer 2430 separates conductive surface 2405 from the ground plane. The energy storing dielectric may be a super capacitor or secondary battery with internal resistance that can support an RF signal across it, and may receive DC energy from the solar cells 2400 or rectification of RF signals received by the resonant antenna via a diode rectifier (not shown), and still be used as a dielectric to space apart the two conductive layers to form a patch antenna. The patch antenna may therefore be resonant at a frequency defined by conductive layers 2410 and 2405, and in addition be resonant at a different frequency with relation to the antenna formed on chip. The different resonant frequencies may be utilized for power derivation from one resonant section and signal generation from the other section. The signal from the chip section may be a short but energetic impulse, which will cause the lower resonant structure to ring at its resonant frequency and harmonics.

Adhesive layer 2435 attaches the tag to the tortoise shell, and may be conductive or insulating. If conductive, it will electrically couple the tag to the outer shell. The outer shell 2440 is relatively insulating, however in a live tortoise the underlying bone 2445 and internal body organs 2450 are conductive. The legs or bottom shell of the tortoise will likely contact the desert substrate. By including all the electromagnetic properties of the tag, the shell, the internal organs and the contact to substrate ground, and by using sophisticated present art modeling techniques, the entire tortoise is modeled as a component of the electromagnetic system. Optimization of the RF transmitting/receiving system thus formed will be more effective than merely modeling the tag design independent of what is attached to it (a tortoise or another animal or an object, possibly in relation to or contact with a substrate or ground).

FIG. 25A-25B show an embodiment of a combined active VHF millimeter wave/light wave tag. In these tags it is assumed that a highly directed beam of energy is incident upon the tag. As opposed to tag architectures in which the PRESENCE of an RF field of sufficient intensity to activate or power the tag is assumed, for these directed energy type tags the assumption is that a focused beam of energy is "aimed" such that the energy is directly incident on the tag. This might occur in situations where tag location is already approximately known and energy can be scanned in the general direction so as to cover all possible locations within a relatively narrow angle of search, or that a broad search would involve a considerable amount of time or a very efficient method of sweeping a directed beam over a wide angle of scan. Also of importance is the attenuation of obstruction or foliage with respect to the relatively short wavelengths likely to be used (with a reasonable sized directed beam antenna) in the "beam" approach. Over the range of short wavelengths likely to be used (likely 2.4 GHZ to over 300 GHz, the attenuation properties of obstructions foliage and even air can vary greatly, and the possibility for narrow frequency ranges which have much higher penetration rates of foliage, obstructions, or atmosphere can be chosen to give greatly enhanced results for reception of a beam-like signal by a tag. The choice of reader (or activator) locations which minimize the amount of attenuation due to foliage or obstructions is important. Generally a HIGHER location of the beam-forming emitting antenna (from the reader or activator) will result in less distance to be traveled through attenuating materials on or near the ground, so a high mast or an airborne reader/activator might be best for a situation in which desert tortoises are the asset of interest, in a desert environment with low-growing foliage, for example.

FIG. 25A depicts a tag that has VHF or UHF RFID passive or active function, and in addition has light or millimeter wave function including reception, reflection, directed reflection and emission. The activation of the tag might be either the VHF/UHF system or the millimeter/lightwave system, and the response might be either, or the activation by one and the response by the other, depending on the application.

COMBINED ACTIVE VHF AND MILLIMETER/LIGHTWAVE TAG 2500 is potentially activated by INCOMING RADAR BEAM 2505 or INCOMING SUNLIGHT OR MM WAVES 2510. In addition it may be activated by RF WIRE ANTENNA 2515. The RF tag may be active or passive, consisting of 2535 IC, BATTERY.

For the beamed incoming signal (millimeter or lightwave, LIGHT-CONCENTRATOR, AMPLIFIER, EMITTER 2520 is a dome shaped apparatus enclosing a LIGHT SENSOR, PHOTOCELL 2525 or the like on the surface of the tag, and its distinguishing features will be explained in the next figure. In response to a stimulating (interrogating) signal from either the UHF/VHF or the lightwave inputs, the RFID IC 2535 may respond with an outgoing signal (either having ID information or only location information) either through the VHF-UHF antenna or by OUTGOING STIMULATED EMISSION 2530 such as by an LED or laser diode located on or intrinsic to the ID chip, and radiated out through the optical assembly 2520 covering the chip.

The tag of FIG. 25B may be a tag similar to the one in FIG. 25A, with the addition of a special construction of the OPTICAL COVER 2520.

FIG. 25B shows the detail of elements 2540 and 2550 indicating that it is a semi-circular or a dome made up of a collection of micro-spheres of some material that is optically active or responsive. An integrated circuit 2545 or a photo cell or an integrated circuit with a photo cell is shown. The photo cell might be a photo sensing, photo emitting, or photo voltaic power generating cell as any one of the number of components of integrated circuit 2545 which could also be an integrated circuit having a whole computer and communication system on it as well as a radio transmitter as well as possibly an opto-transmitter and a receiver.

At the high end of the microwave and the low end of the optical range we find an area where waves behave optically and we find an area where for a small device which is a quarter of an inch in diameter approximately. A dome a quarter of inch in diameter and out of spheres that are anywhere from a millimeter in diameter more or less, the dome assembly is a continuous "bug eye" of spheres. These spheres can act as a retro reflective element for incoming beamed wave forms. A beam of light or it might be a beam of terahertz or a very high gigahertz waves would have the property that if the wave came in at a certain angle and it hits the spheres that it would be reflected back at the same angle by at least some of the spheres. In that way either identification or at least location or determination of the existence of a device that reflected an incoming wave of a very high frequency could be confirmed by the receiver location. That by itself is something that has utility since it can a similar function as to that which harmonic radar performs at a lower frequency to provide detection from a beamed source just due to the reflective action of a hemisphere that is made out several micro-spheres of an optical character. They might be made of glass or transparent plastic. In addition, because of the development of active materials, the spheres might also be made of a material which has a non-liner response to an incoming wave such that it could receive an incoming wave at a given frequency and emit or reflect a wave at a changed frequency in the same direction that the incoming wave came from.

It is also be possible that element the material that the spheres are made to store energy and upon activation by a light or RF frequency it might release the stored energy reflecting back a wave at a greater intensity than the intensity of the wave it received. This kind of wave intensity amplifying material is disclosed in many of the journals of NANO Technology relating to active optical elements. Therefore, these materials and retroreflective surfaces that are suitable for use with the invention are within the ordinary skill in the art, given the present disclosure and the state of the art.

The state of the art also includes literature on energy storing devices which when stimulated with a certain frequency release energy at a greater intensity either at the same frequency or a different frequency. Most of FIG. 25B is about that concept applied to the surface of the sphere. In addition to reflecting we assume that there is also partial refracted energy coming in and providing a signal or wake-up information. If a beam is beaming in energy and it happens to hit the tag as well as reflecting back it will also refract energy and focus it on the optical sensing or emitting part of element 2545 so in that way it can activate the integrated circuit (IC), i.e., the IC involved with producing an identification signal or an activated outgoing signal from the circuit itself. In such a case, the power source need not be in the spheres and can be remote therefrom.

For example, an incoming beam of laser light might hit element 2550 and be refracted onto the surface of element 2545. It might activate a wake up signal if element 2545 has a source of energy available to it, either battery powered, solar powered or otherwise powered, and element 2545 reacted to the activating signal. Then the tag would transmit or, reflect, either the optical signal that was received and send out an optical signal which has an ID code in response to the incoming signal that impinged on the hemispherical coating 2550, 2540. Therefore, at least one of sensing, emitting or photo voltaic elements would be preferably contained in element 2545.

The sensing elements can be used to "wake-up" the circuit. Emitting elements then can be used to send out a signal through that dome that would get the signal to go or one of parts of the signals to go in the right direction. The photo voltaic function would mean if this object were simply sitting in the sun then, in essence, the lenses formed by the hemispherical top would focus light on to it and itself could or would be a power generating item which power could be stored in the battery 2535 of FIG. 25A. In this way, the hemispherical "bug eye" element serves an additional purpose of providing harvested ambient light to power an active beacon or response to a signal source.

The devices in 26B,C,D,E are essentially patch antennas which have a ground plane 2640 and a dielectric insulator 2640, and the ground plane is 2650. On the top of the dielectric insulator may be placed a variety of structures that could be optimized for transmitting various frequencies or wave forms including pulse wave forms is also known as ultra-wideband wave forms. The first implementation 2630 is like a point and that could be optimized for transmitting a high energy pulse wave form which could couple to the atmosphere by ionizing the air at the point. In that way a pulse of significant energy, that could also be resonated by the total structure of the antenna at a certain frequency, could be transmitted by this very small structure.

Figure 26A:
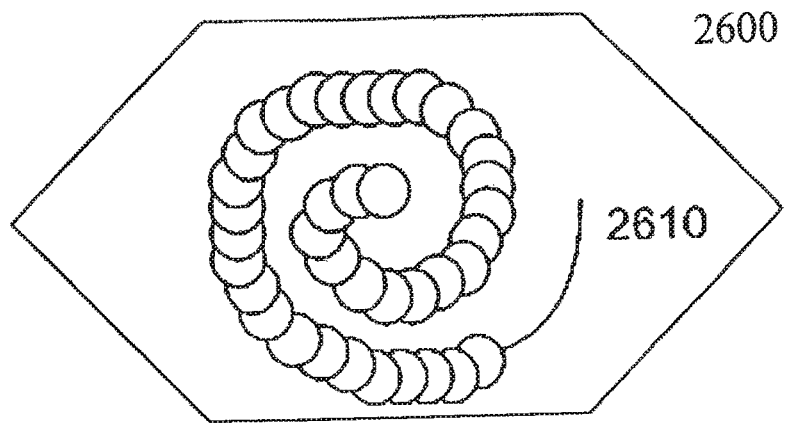
FIG. 26a is a diagram of a multi-spiral antenna attached to a tortoise shell.
Figure 26B:
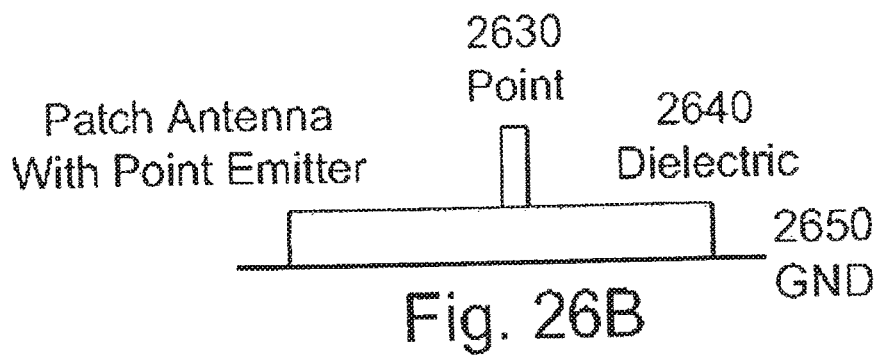
FIG. 26b is a diagram of patch transmitter tag with a pointed emitter.
Figure 26C:
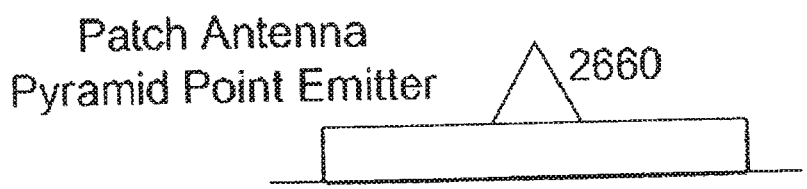
FIG. 26c is a diagram of patch transmitter tag with a pyramid-shaped emitter.

FIG. 26C shows a pyramidal element. Either a conical or pyramidal element might disperse the waves or pulses at a certain polarization which might be a circular polarization or another unusual polarization. Other dispersal patterns could prove beneficial in both reception and transmission of any kind of a wave form at high frequencies. These are mostly intended at the UHF microwave or millimeter wave types of antennas.

Figure 26D:
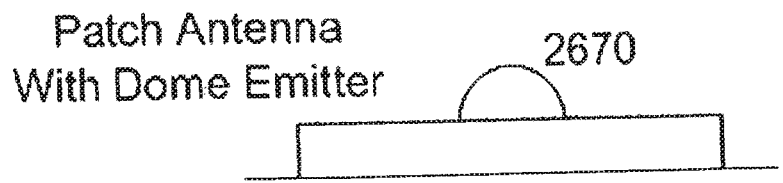
FIG. 26d is a diagram of patch transmitter tag with a dome-shaped emitter.
Figure 26E:
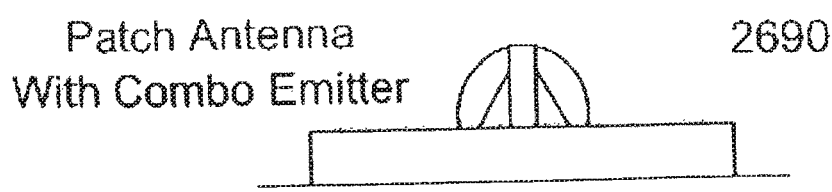
FIG. 26e is a diagram of patch transmitter tag with a combination pyramid/domed-shaped emitter.

FIG. 26D has a hemispherical emitter, antenna emitter and also the antenna polarization with possible combinations of the above three elements which might also be in a combination. For example 2630 might be a good conductor, 2660 might be a medium conductor and 2670 might be a dielectric insulator or any combinations of those which could be energized to optimize the antenna design for emission of a wave form using a small antenna and emission area that would have advantages over simple planar types of areas that are found in most patch antennas.

FIGS. 27A,B,C,D,E,F depict a collection of antenna types and methods. It is in this case specifically directed to a tortoise which has a shell with scutes on it. Different antennas might be placed on the animal. These shapes can be used in general applications also for tracking of other wildlife or things.

FIG. 27A is a basic patch antenna which has a hexagonal shape; however it may represent any kind of a patch antenna structure.

FIG. 27B is a patch antenna, represented by antenna 2710, attached either at the ground plane or at the emitting section to a wire antenna which might be tuned at a quarter wave or a half wave, resonant with the radiated frequency and compensated for the impedance of the patch antenna surface to which it is connected. It is a combination patch plus straight wire dipole antenna.

FIG. 27C is similar except it uses two straight wire antennas, either of which could be connected to the ground, either of which can be connected to the emitter part or one of each part of the wire antenna can be connected to one of each part of the patch antenna depending on what gives the best results for radio transmission and reception in the particular application.

FIG. 27D depicts a synchronized set of different patch antennas to be located on two or more scutes of a tortoise or two or more areas on any object in which the size and shapre of the object is suitable for the location of one or more antennas within a distance up to approximately 10 centimeters of each other. At least one of the antennas is "master" which generates or initiates an outgoing pulse or burst, and the others are "slave" antennas which (since that are very close to the master antenna) when they are activated by its emission, immediately began to also to emit at possibly the same frequency. In this way that amount of radiated power and the angular coverage of the radio signal emitted (or received) can be substantially increased by simply having multiple tags. The simplicity of the slave tags make the system less expensive and more reliable than having master tag for each one.

FIG. 27E is a spiral antenna which can be located either on the shell itself or the scute, or can be located on top of either an insulating conductive or conductive with a insulated spacer kind of an attachment device that would fit on a scute. Note that this growth of tortoise is allowed with wires over multiple scutes by providing tubes (glued to each scute) in such a way that the wire can be pulled through the tubes simply the growth of the tortoise.

FIG. 27F is a ring antenna. 2752 represents a ring which is tunable to a particular, likely a microwave frequency. The ring may be solid or may be "opened" and a harmonic generating diode might be inserted as a coupling element between the two ends of the ring so that an incoming signal might be a fundamental and the outgoing signal might be a harmonic of the fundamental enabling harmonic radar recognition. That would be tuned so that the circular antenna would have a fundamental resonance and would be able to also resonate at harmonic multiples of the resonate frequency.

Figure 29A:
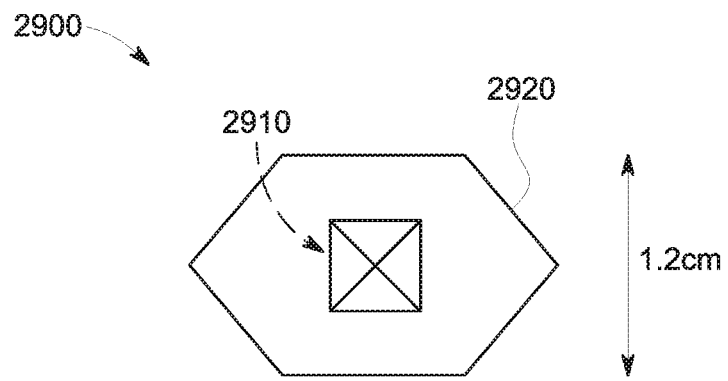
FIGS. 29A, 29B are diagrams of a patch transmitter tag with pyramidal emitting electrodes.
Figure 29B:
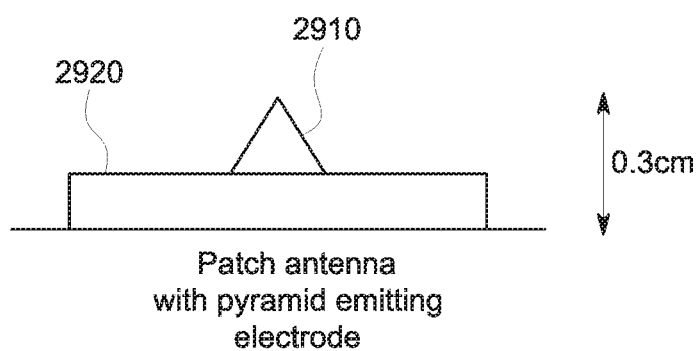

FIG. 29 is a patch antenna in which the emitting electrode is pyramidal in shape for dispersion characteristics that are different and may have a greater angular coverage and possibly greater power dispersion than a flat area as the emitting surface. 2910 is the pyramid and 2920 is the underlying dielectric plus conductive ground surface.

Figure 30:
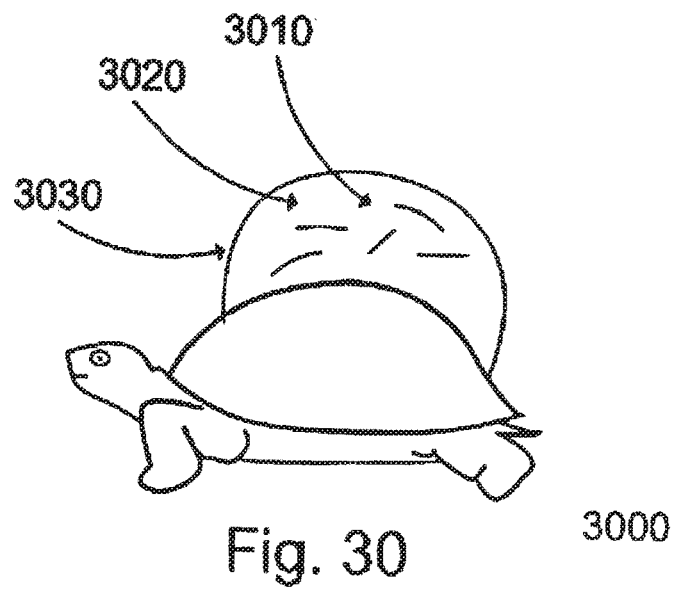
FIG. 30 is a diagram of a synchronized set of patch tags arranged on a tortoise to maximize signal transmission efficiency.

FIG. 30 shows a tortoise or an object in which a plurality of different technology types of ID tags are attached to the same object. For example 3010 might be a low frequency 134.2 kilohertz tag, 3020 might be a UHF tag and 3030 might be a harmonic radar tag. They may be attached as separate tags on different points of the object and in an alternative embodiment of that they might be all packaged together. In other embodiments two or more tag types might share an antenna.

Figure 33A:
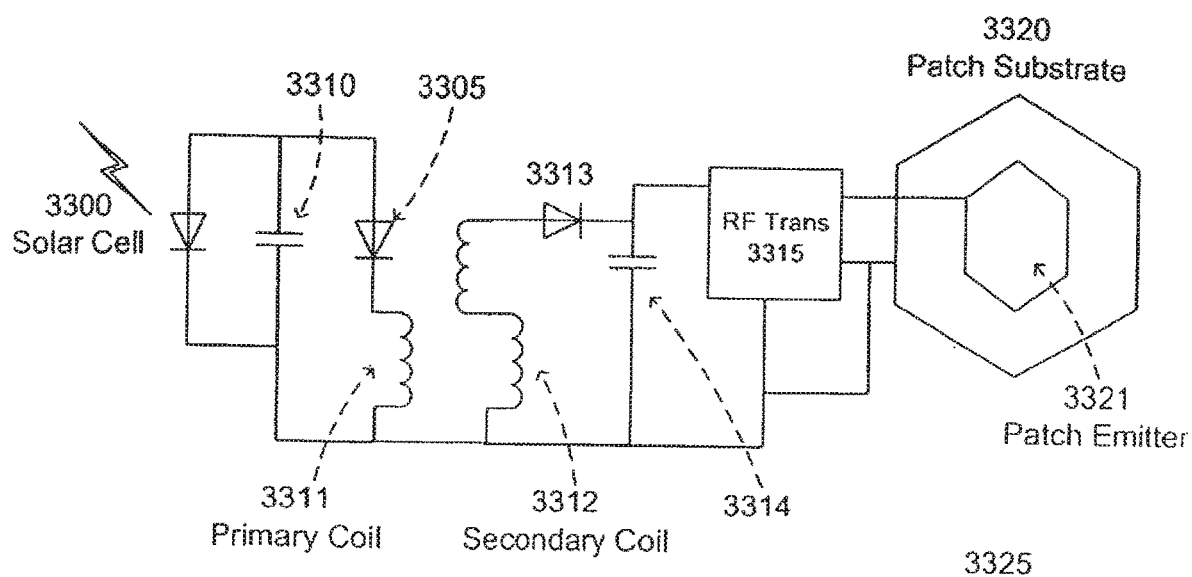
Figure 33B:
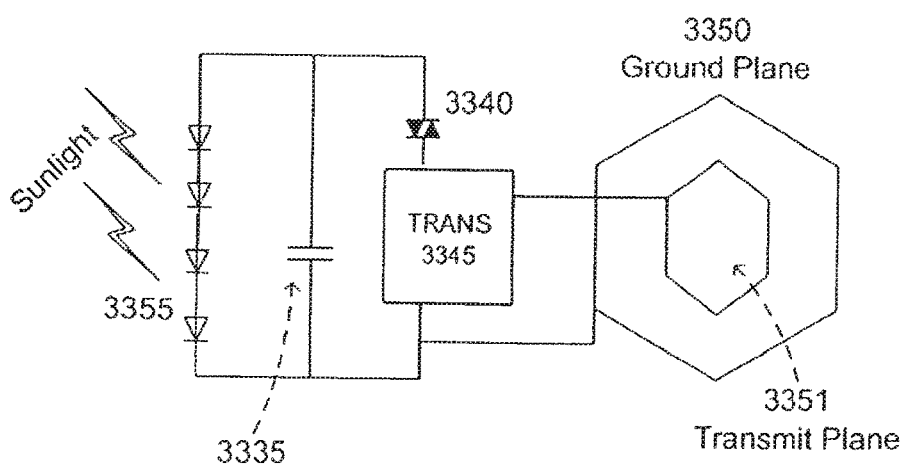
Figure 34A:
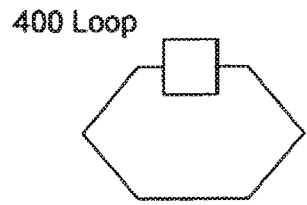
FIGS. 34A to 34H show an embodiment of various tag and antenna shapes that can fit on a "scute" of a desert tortoise.
Figure 34B:
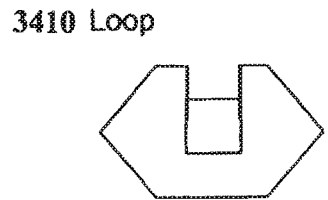
Figure 34C:
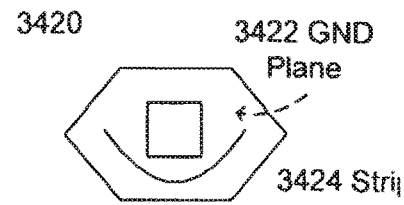
Figure 34D:
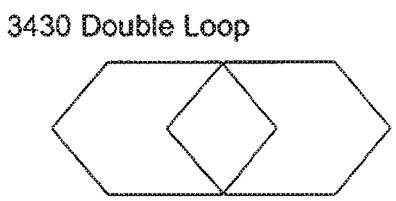
Figure 34E:
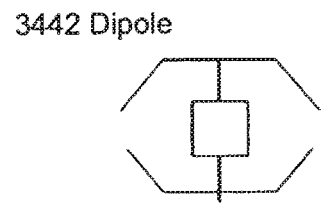
Figure 34F:
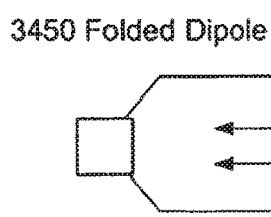
Figure 34G:
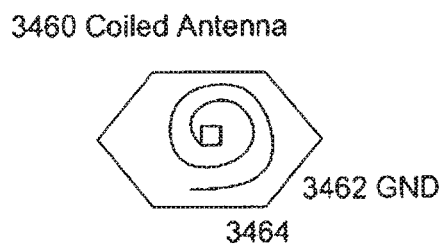
Figure 34H:
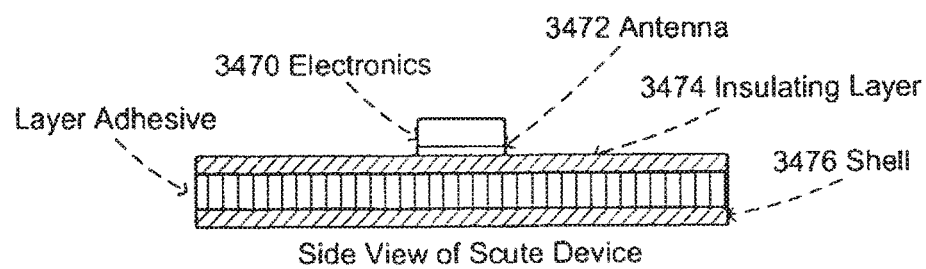

FIG. 33B is one example of a type of solar powered tag. When the animal comes out in the sun, the animal does not have a battery powered transmitter, or if it does have a battery power, it is not using the battery to use its energy for transmission what it is using is the sunlight energy that is gathered and it is using as much as possible of the sunlight energy that is gathered to provide a continuous series of transmissions. So what happens, first of all we can look at that we happen to be using a patch antenna of 3350 and 3351 we can equally well use any other kind of antenna. In this case we also have something labeled a transmitter and we can use many different kind of transmitters including no transmitter, the reason for that will become clear. On the tag outer surface are placed one or more solar cells gathering sunlight energy, turning it into electrical energy, and charging a capacitor 3335. The capacitor accumulates charge and the voltage across it increases.

When the voltage rises above a certain level it triggers, for example, a diac or some other type of a device that immediately goes from a very high resistance to a very low resistance when the voltage across it is above its threshold. Thus it immediately transfers all of the charge energy from the capacitor into the transmitter circuit. In this case if the transmitter circuit were to emit a microwave frequency, it might emit that for as long as the energy from the capacitor permitted, which could be a very short time or long time, depending on the design of the transmit circuit. In one embodiment the transmitter might send out and modulated ID signal.

In a different embodiment the transmitter circuit consists of only a path of electrical discharge to an electrode of the antenna, and the signal transmitted is simply a pulse activating the resonance of the antenna, so the solar energy might cause the tag to emit a series of fairly strong pulses which will become ringing wave forms of the antenna resonant frequency for as long as the animal or object is exposed to the sun. Among the ways this particular system can be used ranges from pulses which are similar to ultra wide band type transmission, to encoded sequences of pulses which ultra wide band plus an ID code if you make a sequence of two pulses with a time spacing between them that is fixed by an ID number a full transmission of a carrier wave modulated by a coded, signal modulation wave.

FIG. 33C shows a tag, e.g., a tag like the tag described in FIG. 33B, and attaches an antenna similar to one of the earlier descriptions of attaching a wire antenna to the patching antenna. But in this case, the wire antenna is further a harmonic tag which has a diode in it and is tuned to be resonant by a combination of tuning the wire antenna with the patch antenna. The harmonic tag might be activated much further away than the other kind of tag which might not be activated if it is not in the sun or it might not be activated if it is not close enough to be activated by a wake up signal from a reader or it might not be activated because it ran out of batteries. The harmonic tag might operate as a fail-safe circuit so that the item could be located and found it all other electronic systems failed. By utilizing the attachment to a part of the patch antenna, the harmonic antenna may have a greater effective antenna size, and a better operational distance from a reader.

FIG. 30 is an embodiment of a radar reflector tag system which includes:
TORTOISE 3000
RADAR REFLECTOR FOR OPEN-RANGE 3010
RFID OR IDENTITY DIFFERENTIATOR 3020
GPR MARKER FOR INTO BURROWS OR PALLETS 3030

Figure 31:
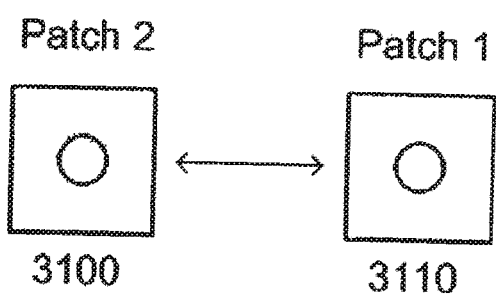
FIG. 31 is a diagram of a synchronized pair of patch tags arranged in space to illustrate maximization of signal transmission efficiency.

FIG. 31 is an embodiment of a radar reflector tag system. FIG. 31 shows:
FIRST PATCH ANTENNA 3100 at a particular one of a plurality of resonant frequencies for re-transmission of swept or stepped interrogation signal, and a
SECOND PATCH ANTENNA 3110, at a different one of plurality of frequencies, for a two-frequency (out of a number up to about 100 frequencies) identification scheme based on swept or stepped interrogation frequencies.

Figure 32:
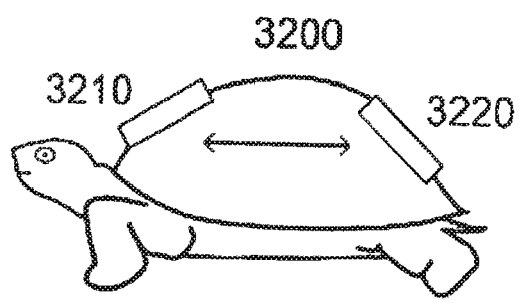
FIG. 32 is a diagram of a synchronized pair of patch tags arranged on tortoise shell to maximize signal transmission efficiency.

FIG. 32 is an embodiment of a radar reflector tag system. FIG. 32 shows:
3200 TORTOISE FIRST TAG 3210 may be resonant at a first frequency and a SECOND TAG 3220 may be resonant at a second frequency, thus identifying the tortoise by the combination of frequencies chosen from a multiplicity of single frequency tag resonances.

FIGS. 33A, 33B show an embodiment of a sun tag. FIG. 33A shows:
DIODE 3300
SCR-DIAC 3305
CAPACITOR 3310

Although the invention has been described using specific terms, devices, and/or methods, such description is for illustrative purposes of the preferred embodiment(s) only. Changes may be made to the preferred embodiment(s) by those of ordinary skill in the art without departing from the scope of the present invention, which is set forth in the following claims. In addition, it should be understood that aspects of the preferred embodiment(s) generally may be interchanged in whole or in part.

What is claimed is:

1. A system for locating and identifying one or more objects in an environment, the system comprising:
   identification tags, wherein at least one identification tag comprises at least a passive device for placement on the one or more objects, wherein the passive device requires no operating power from a battery-powered circuit;
   a first locating device disposed in a mobile locating station for reading an identification tag placed on an object and emitting one or more signals containing a location of the first locating device and information of a direction and a distance to the identification tag; and
   a second locating device for receiving the one or more signals emitted from the first locating device, the second locating device containing a computer for analyzing the location of the first locating device and the information of the direction and the distance to the identification tag, and providing a location of the object on which the identification tag is placed, wherein the object to be located is a moving object, at least one of the first and second locating devices further comprises a probabilistic spatial filter for determining a probable location of the object;
   a power source coupled to the tag, wherein during a sleep mode, the tag is configured to draw power from the power source, and during an awake mode, the tag is configured to transmit the signal using power from the power source;
   wherein the tag further comprises:
     an energy-harvesting element;
     an RFID circuit; and
   an energy storage device comprising at least one of a battery, a capacitor, a super capacitor, and an ultra-capacitor, and the energy-harvesting element including a solar cell, a first antenna, and a second antenna, the first antenna being electrically coupled to the solar cell, the energy storage device, and the RFID circuit, and being electrically coupled to the second antenna through a diode.

2. The system according to claim 1, wherein the first locating device comprises multiple devices for reading the identification tags and emitting the one or more signals.

3. The system according to claim 1, wherein the first locating device is disposed within the mobile locating station.

4. The system according to claim 1, wherein the identification tag comprises said passive device and an active element that includes a battery and sends a signal on receipt of a stimulating signal or at a pre-programmed time interval.

5. The system of claim 4, wherein the passive device requires no operating power from a battery-powered circuit.

6. The system according to claim 1, wherein both of the first and second locating devices further comprise a probabilistic spatial filter for determining a probable location of the object.

7. The system of claim 1, wherein providing the location of the object further comprises:
  computing an initial probability for the location by signal analysis;
  refining the initial probability using a probability map; and
  determining the location of the identification tag placed on the object based on a refinement of the initial probability.

8. A method of locating an object in an environment, comprising the steps of:
  identifying the object to be tracked;
  applying a tag to the object, said tag including a passive element and an energy-harvesting element;
  using a first locating device to detect a location of the object by communicating with the tag;
  further detecting the location of the object by determining a location of the tag using a multi-stage tag locating method used by a second locating device, the multi-stage tag locating method executed by a spatial probabilistic filter resident as executable code in a method associated with the multi-stage tag locating method said spatial probabilistic filter applied at least to said first locating device and a real-time database providing accurate information on the location of the object; and
  coupling a power source to the tag, wherein during a sleep mode, the tag is configured to draw power from the power source, and during an awake mode, the tag is configured to transmit the signal using power from the power source, wherein the tag further comprises an RFID circuit coupled to said energy-harvesting element, the power source including an energy storage device comprising at least one of a battery, a capacitor, a super capacitor, and an ultra-capacitor, and said energy-harvesting element including a solar cell, a first antenna, and a second antenna, said first antenna electrically coupled to said solar cell, said energy storage device, and said RFID circuit, and electrically coupled to said second antenna through a diode.

9. The method according to claim 8, wherein emitting a first signal to activate the tag applied to the object comprises shifting a tag status from a sleep condition in said sleep mode to a receptive condition in said awake mode.

10. The method according to claim 8 further comprising updating a real-time three-dimensional spatial representation database with the location of the object.

11. The method of claim 8, wherein detecting the location of the object further comprises:
  computing an initial probability for the location by signal analysis;
  refining the initial probability using a probability map; and
  determining the location of the tag placed on the object based on a refinement of the initial probability.

12. The method of claim 8, wherein the passive element requires no operating power from a battery-powered circuit.

13. A system, comprising:
  a tag for identifying an object in an environment and configured for placement on the object;
  a locating device comprising a processor and executable code for causing the processor to detect a signal relating to the tag to identify a location of the object, wherein the locating device further comprises:
  a probabilistic-spatial filter for determining a probable location area of the object based on the signal received and on a probable compatibility of a geographic characteristic with the object;
  a first power source and a second power source, each coupled to the tag, wherein during a sleep mode, the tag is configured to draw power from the first power source, and during an awake mode, the tag is configured to transmit the signal using power from the second power source;
    wherein the tag further comprises:
      an energy-harvesting element;
      an RFID circuit; and
      an energy storage device comprising at least one of a battery, a capacitor, a super capacitor, and an ultra-capacitor, and the energy-harvesting element including a solar cell, a first antenna, and a second antenna, the first antenna being electrically coupled to the solar cell, the energy storage device, and the RFID circuit, and being electrically coupled to the second antenna through a diode.

14. The system according to claim 13, wherein the diode is configured to provide an output at a second harmonic of a fundamental frequency of the first antenna and the second antenna.

15. The system according to claim 13, wherein the locating device comprises multiple devices for reading identification tags and emitting signals.

16. The system according to claim 13, wherein the tag has a semi-passive element for location at intermediate range to save energy from a battery to implement more frequent integrations and responses to precisely locate the tag from an intermediate range.

17. The system according to claim 13, wherein the tag comprises at least an active element that includes a battery and sends a signal on receipt of a stimulating signal or at a pre-programmed time interval.

* * * * *